United States Patent
Okamoto et al.

(10) Patent No.: US 10,137,620 B2
(45) Date of Patent: Nov. 27, 2018

(54) METHOD OF MANUFACTURING SANDWICH MOLDED PRODUCT, INJECTION MOLDING MACHINE, AND SANDWICH MOLDED PRODUCT

(71) Applicant: UBE MACHINERY CORPORATION, LTD., Yamaguchi (JP)

(72) Inventors: Akio Okamoto, Yamaguchi (JP); Kazuaki Miyamoto, Yamaguchi (JP); Yuichiro Fukuda, Yamaguchi (JP)

(73) Assignee: UBE MACHINERY CORPORATION, LTD., Yamaguchi (JP)

( * ) Notice: Subject to any disclaimer, the term of this patent is extended or adjusted under 35 U.S.C. 154(b) by 561 days.

(21) Appl. No.: 14/655,673

(22) PCT Filed: Dec. 5, 2013

(86) PCT No.: PCT/JP2013/082741
§ 371 (c)(1),
(2) Date: Jun. 25, 2015

(87) PCT Pub. No.: WO2014/103655
PCT Pub. Date: Jul. 3, 2014

(65) Prior Publication Data
US 2015/0352761 A1    Dec. 10, 2015

(30) Foreign Application Priority Data

| Dec. 25, 2012 | (JP) | 2012-280502 |
| Dec. 25, 2012 | (JP) | 2012-280507 |
| Mar. 1, 2013 | (JP) | 2013-040220 |

(51) Int. Cl.
B29C 45/16 (2006.01)
B29C 45/00 (2006.01)
(Continued)

(52) U.S. Cl.
CPC ...... *B29C 45/1635* (2013.01); *B29C 45/0003* (2013.01); *B29C 45/0408* (2013.01);
(Continued)

(58) Field of Classification Search
CPC ......... B29C 45/03; B29C 45/14; B29C 45/10; B29C 45/16; B29C 45/1635; B29C 45/1642; B29C 45/1657; B29C 45/1675
(Continued)

(56) References Cited

U.S. PATENT DOCUMENTS

| 2009/0121375 A1* | 5/2009 | Okamoto | B29C 44/0461 264/46.4 |
| 2012/0049408 A1* | 3/2012 | Okamoto | B29C 45/045 264/255 |

FOREIGN PATENT DOCUMENTS

| JP | 50-090658 A | 7/1975 |
| JP | 08-001714 A | 1/1996 |

(Continued)

OTHER PUBLICATIONS

International Preliminary Report on Patentability for PCT/JP2013/082741 dated Jul. 9, 2015.
(Continued)

*Primary Examiner* — James Mellott
(74) *Attorney, Agent, or Firm* — Womble Bond Dickinson (US) LLP; Joseph Bach, Esq.

(57) ABSTRACT

The present invention comprises: a base layer molding step that injection-fills a mold cavity with a base layer resin to mold a base layer; a first expansion step that causes the volume of the mold cavity to expand to a specified quantity such that a certain space is formed between an outer surface of the base layer molded by the base layer molding step and an inner surface of the mold; a first injection-filling step that injection-fills the space formed by the first expansion step
(Continued)

with a first resin; a second expansion step that, after the start of the first injection-filling step, causes the mold cavity to expand to a specified quantity such that the space is expanded; and a second injection-filling step that, after completion of the first injection-filling step and after the start of the second expansion step, injection-fills a second resin into the first resin.

13 Claims, 30 Drawing Sheets

(51) Int. Cl.
  *B29C 45/04* (2006.01)
  *B29L 9/00* (2006.01)
(52) U.S. Cl.
  CPC ...... *B29C 45/1643* (2013.01); *B29C 45/1676* (2013.01); *B29C 2045/1654* (2013.01); *B29L 2009/00* (2013.01)
(58) Field of Classification Search
  USPC ....................................................... 264/45.2
  See application file for complete search history.

(56) References Cited

FOREIGN PATENT DOCUMENTS

| | | | | | |
|---|---|---|---|---|---|
| JP | 08-174603 | A | | 7/1996 | |
| JP | 2001-096566 | A | | 4/2001 | |
| JP | 2001-162650 | A | | 6/2001 | |
| JP | 2007-216668 | A | | 8/2007 | |
| JP | 2007216668 | A | * | 8/2007 | |
| JP | 2008012784 | A | | 1/2008 | |
| JP | 2009214498 | A | * | 9/2009 | |
| JP | 2011084016 | A | | 4/2011 | |
| JP | 2012-201082 | A | | 10/2012 | |
| JP | 2014124770 | A | | 7/2014 | |
| JP | 2014124771 | A | | 7/2014 | |
| JP | 2014168848 | A | | 9/2014 | |
| WO | WO-2010137531 | A1 | * | 12/2010 | ........... B29C 45/045 |
| WO | 2012/160952 | A1 | | 11/2012 | |
| WO | 2014103655 | A1 | | 7/2014 | |

OTHER PUBLICATIONS

International Search Report and Written Opinion for PCT/JP2013/082741 dated Mar. 4, 2014.

* cited by examiner

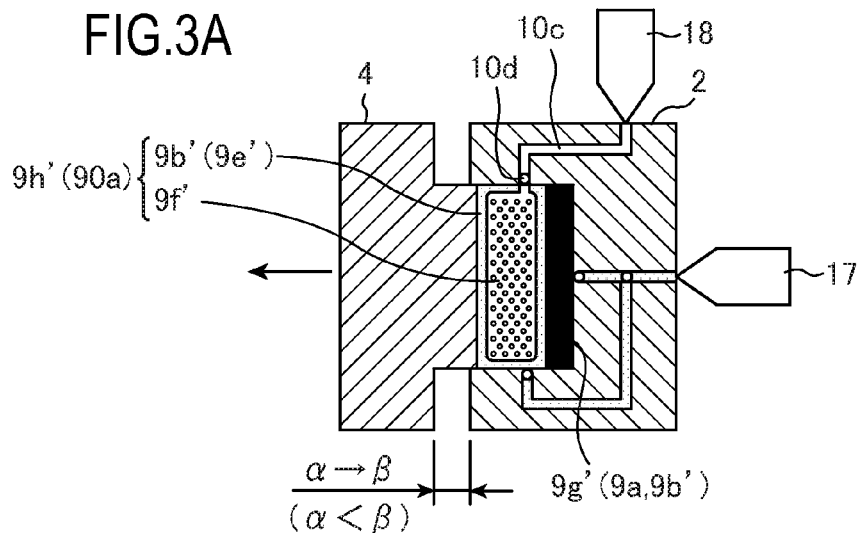
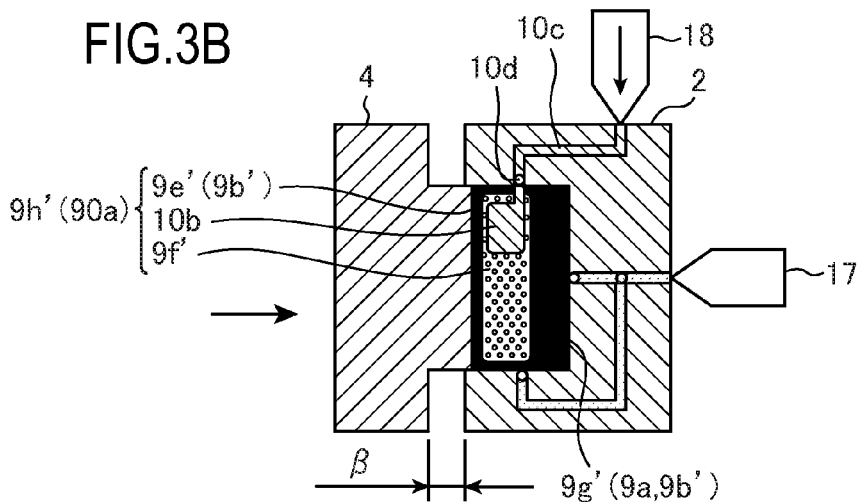
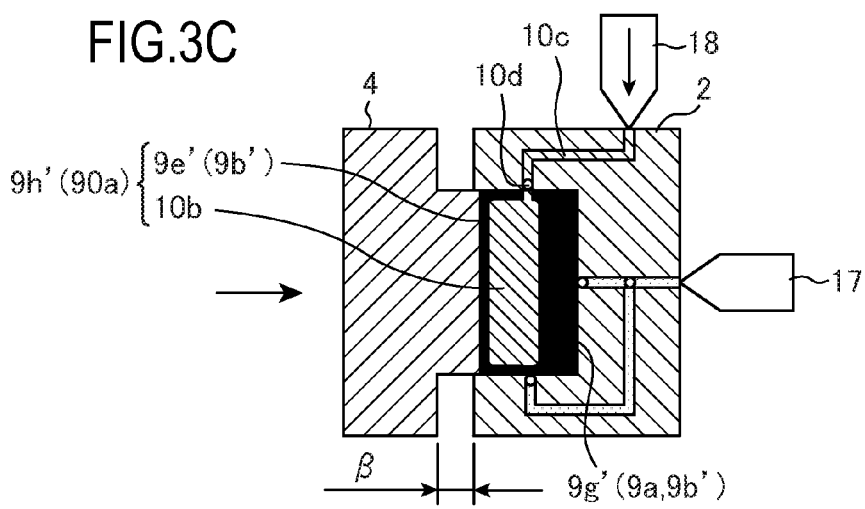

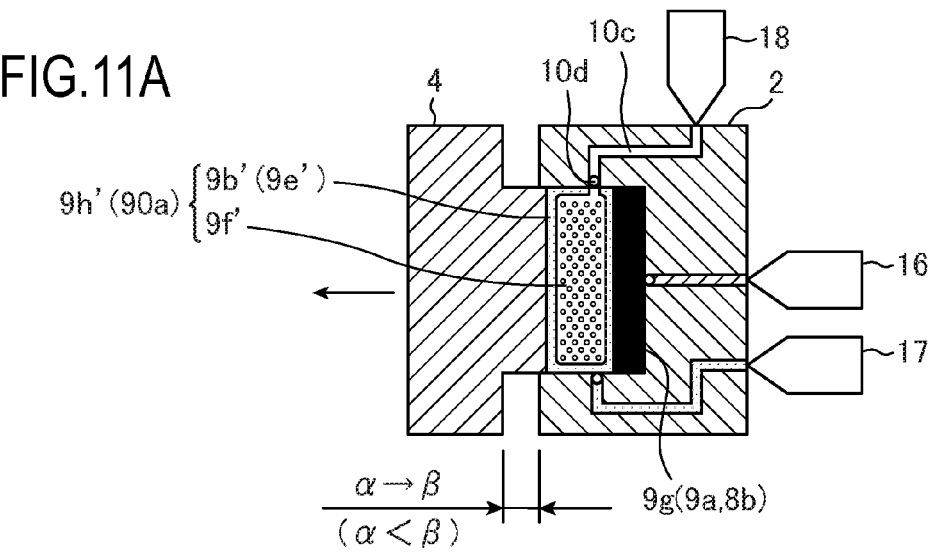
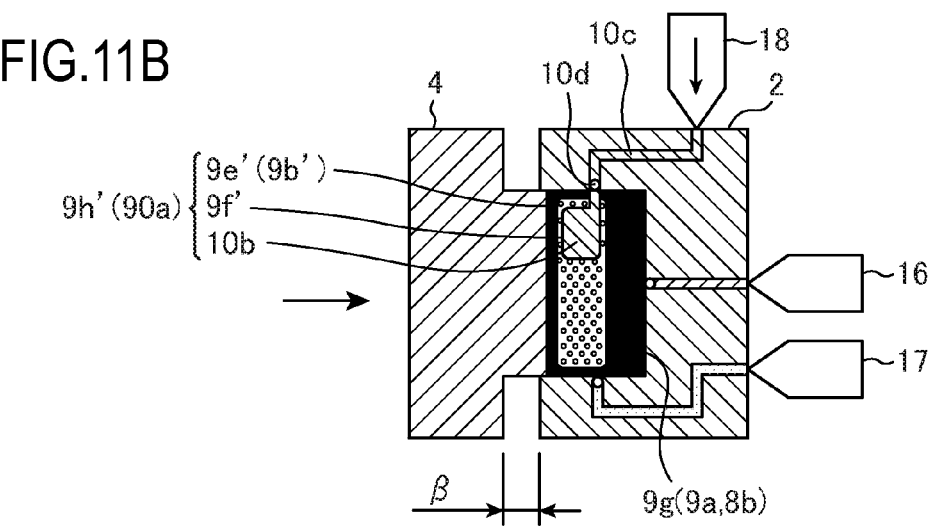
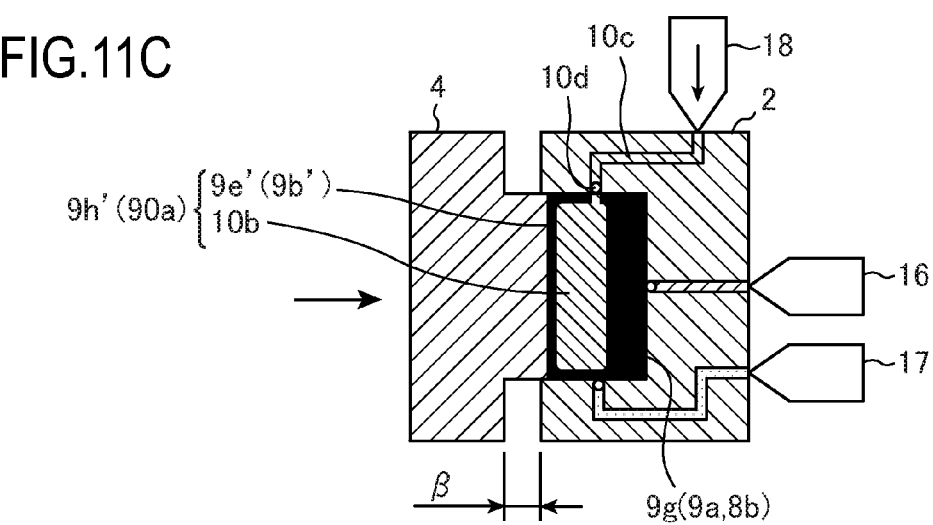

METHOD OF MANUFACTURING SANDWICH MOLDED PRODUCT, INJECTION MOLDING MACHINE, AND SANDWICH MOLDED PRODUCT

RELATED APPLICATIONS

The present application is the national phase of International Application No. PCT/JP2013/082741, filed on Dec. 5, 2013, which claims the benefit of priority to Japanese Patent Application Nos. 2012-280502, filed on Dec. 25, 2012, 2012-280507, filed on Dec. 25, 2012, and 2013-040220, filed on Mar. 1, 2013, and the disclosures of which are hereby incorporated herein by reference in their entireties.

TECHNICAL FIELD

The present invention relates to a method of manufacturing a sandwich molded product, an injection molding machine employed in this method of manufacturing, and a sandwich molded product.

BACKGROUND ART

Conventionally, a sandwich molded product configured from an outer layer and an inner layer contained within this outer layer, is known. As an injection molding method (co-injection method) that molds a sandwich molded product, mainly two methods, that is, a multistage molding method and a simultaneous molding method, are known. The multistage molding method is a method in which an outer layer resin is injection-filled inside a mold cavity and then an inner layer resin is injection-filled inside the outer layer resin, and the inside of the mold cavity is filled by these two resins (refer to Patent Document 1). The simultaneous molding method is a method in which outer layer resin is injection-filled inside a mold cavity and then outer layer resin and inner layer resin are injection-filled inside the previously injected outer layer resin in a laminar flow state such that the outer layer resin is on an outer peripheral side and the inner layer resin is disposed at the center of the outer layer resin, and the inside of the mold cavity is filled by these two resins (refer to Patent Document 2).

CITATION LIST

Patent Literatures

Patent Literature 1: JP H08-174603 A
Patent Literature 2: JP 2001-096566 A

SUMMARY OF INVENTION

Technical Problem

In recent years, a sandwich molded product whose thickness of its outer layer differs partially, has been required. Specifically, it has been required to, for example, mold the outer layer on a front surface side (design surface side) thinly in order to make best use of feel (direct sensation of feeling by directly touching), and so on, of the outer layer resin, and on the other hand, mold the outer layer on a rear surface side (non-design surface side) more thickly than that on the front surface side, for securing of overall rigidity of the sandwich molded product or securing of the likes of attachment rigidity to another component, and so on.

However, in a conventional injection molding method for molding a sandwich molded product, in an injection-filling step of the outer layer resin and the inner layer resin, the mold cavity is filled with resin depending on free flow of each of the resins. Therefore, when a shape of the molded product is simple, the outer layer and the inner layer are formed with a substantially constant ratio of thicknesses (outer layer thickness:inner layer thickness=X:Y) in a direction orthogonal to an inner surface of the mold cavity. As a result, the outer layer is formed with a substantially same thickness on substantially an entire surface of the sandwich molded product. In this way, in the conventional injection molding method for molding a sandwich molded product, there is a problem that it is difficult to mold the thickness of the outer layer of the sandwich molded product so as to differ partially.

The present invention has an object of providing a method of manufacturing a sandwich molded product for manufacturing a sandwich molded product whose thickness of its outer layer differs partially, an injection molding machine that can be suitably employed in this method of manufacturing, and a sandwich molded product whose thickness of its outer layer differs partially.

Solution to Problem

In order to achieve the above object, a method of manufacturing a sandwich molded product according to the present invention is a method employing at least two molds capable of forming a mold cavity to mold the sandwich molded product, the method comprising: a base layer molding step that injection-fills the mold cavity with a base layer resin to mold a base layer; a first expansion step that causes the volume of the mold cavity to expand to a specified quantity such that a certain space is formed between an outer surface of the base layer molded by the base layer molding step and an inner surface of the mold; a first injection-filling step that injection-fills the space formed by the first expansion step with a first resin; a second expansion step that, after the start of the first injection-filling step, causes the mold cavity to expand to a specified quantity such that the space is expanded; and a second injection-filling step that, after completion of the first injection-filling step and after the start of the second expansion step, injection-fills a second resin into the first resin.

In the method of manufacturing a sandwich molded product according to the present invention, the second expansion step may be performed after completion of the first injection-filling step.

In the method of manufacturing a sandwich molded product according to the present invention, the base layer resin and the first resin may be same resins, or may be different resins.

In the method of manufacturing a sandwich molded product according to the present invention, it is preferable that the first resin is a foamable resin, and the second expansion step is a step that causes the mold cavity to expand to a specified quantity such that the space is expanded and the first resin foams inside said expanded space. Moreover, in the method of manufacturing a sandwich molded product according to the present invention, it is preferable that the second resin is a foamable resin, and the method further comprises: a third expansion step that, after the start of the second injection-filling step, causes the space to further expand to a specified quantity and causes the second resin injection-filled inside the first resin to foam.

In the method of manufacturing a sandwich molded product according to the present invention, it is preferable that the first expansion step and the second expansion step are performed by at least one operation of a mold opening/closing operation by a mold opening/closing mechanism of an injection molding machine and a moving operation of a mold internal movable portion.

In the method of manufacturing a sandwich molded product according to the present invention, it is preferable that the mold comprises: a fixed mold; a first movable mold capable of forming a first mold cavity between the first movable mold and said fixed mold; and a second movable mold capable of forming a second mold cavity between the second movable mold and said fixed mold, the second mold cavity having a volume which is larger than that of the first mold cavity, the base layer molding step is a step that injection-fills the first mold cavity formed by the fixed mold and the first movable mold with the base layer resin to mold the base layer, the first expansion step is a step that forms the space between the outer surface of the base layer molded by the base layer molding step and an inner surface of the second movable mold, by changing a mold paired with the fixed mold from the first movable mold to the second movable mold, and the second expansion step is a step that causes the second mold cavity to expand to a specified quantity such that the space is expanded, by at least one operation of a mold opening/closing operation by a mold opening/closing mechanism of an injection molding machine and a moving operation of a mold internal movable portion.

A first injection molding machine according to the present invention is an injection molding machine used in the above-mentioned method of manufacturing a sandwich molded product, the injection molding machine comprising: a fixed platen capable of having the fixed mold attached thereto; and a movable platen capable of having the first movable mold and the second movable mold attached thereto and provided capable of moving closer to or moving away from the fixed platen along a mold opening/closing direction, the movable platen including a mold sliding means that causes the first movable mold and the second movable mold to move in a direction orthogonal to the mold opening/closing direction, and the movable platen being configured such that a change from the first movable mold to the second movable mold is performed by said mold sliding means.

A second injection molding machine according to the present invention is an injection molding machine used in the above-mentioned method of manufacturing a sandwich molded product, the injection molding machine comprising: a fixed platen capable of having the fixed mold attached thereto; and a movable platen capable of having the first movable mold and the second movable mold attached thereto and provided capable of moving closer to or moving away from the fixed platen along a mold opening/closing direction, the movable platen including a mold rotating means that causes the first movable mold and the second movable mold to move rotationally around a rotation axis parallel to the mold opening/closing direction, and the movable platen being configured such that a change from the first movable mold to the second movable mold is performed by said mold rotating means.

A third injection molding machine according to the present invention is an injection molding machine used in the above-mentioned method of manufacturing a sandwich molded product, the injection molding machine comprising: a fixed platen capable of having the fixed mold attached thereto; and a rotating platen that includes a first mold attachment surface capable of having the first movable mold attached thereto and a second mold attachment surface capable of having the second movable mold attached thereto, the rotating platen being capable of rotation around a rotation axis orthogonal to a mold opening/closing direction and being provided capable of moving closer to or moving away from the fixed platen along the mold opening/closing direction, the rotating platen being configured such that a change from the first movable mold to the second movable mold is performed by switching between a mode where the first movable mold faces the fixed mold and a mode where the second movable mold faces the fixed mold, by rotating the rotating platen.

Moreover, a sandwich molded product according to the present invention includes: a base layer; and a sandwich molded portion having an inner layer formed in an outer layer, the outer layer being configured from a first resin and the inner layer being configured from a second resin, the base layer being provided partially on an outer surface of the outer layer of the sandwich molded portion, and along with the outer layer of said sandwich molded portion, forming an outer layer of the sandwich molded product.

In the sandwich molded product according to the present invention, the base layer may be made of the first resin, or may be made of a resin which is different from the first resin.

Advantageous Effects of Invention

The present invention makes it possible to provide a method of manufacturing a sandwich molded product for manufacturing a sandwich molded product whose thickness of its outer layer differs partially, an injection molding machine that can be suitably employed in this method of manufacturing, and a sandwich molded product whose thickness of its outer layer differs partially.

BRIEF DESCRIPTION OF DRAWINGS

FIG. 3A is a schematic cross-sectional view showing a second expansion step of manufacturing steps according to example 2 performed employing the injection molding machine according to the first embodiment.

FIG. 3B is a schematic cross-sectional view showing a start time of a second injection-filling step of the manufacturing steps according to example 2.

FIG. 3C is a schematic cross-sectional view showing a completion time of the second injection-filling step of the manufacturing steps according to example 2.

FIG. 11A is a schematic cross-sectional view showing a second expansion step of manufacturing steps according to example 6 performed employing the injection molding machine according to the second embodiment.

FIG. 11B is a schematic cross-sectional view showing a start time of a second injection-filling step of the manufacturing steps according to example 6.

FIG. 11C is a schematic cross-sectional view showing a completion time of the second injection-filling step of the manufacturing steps according to example 6.

DESCRIPTION OF EMBODIMENTS

Figure 1A:
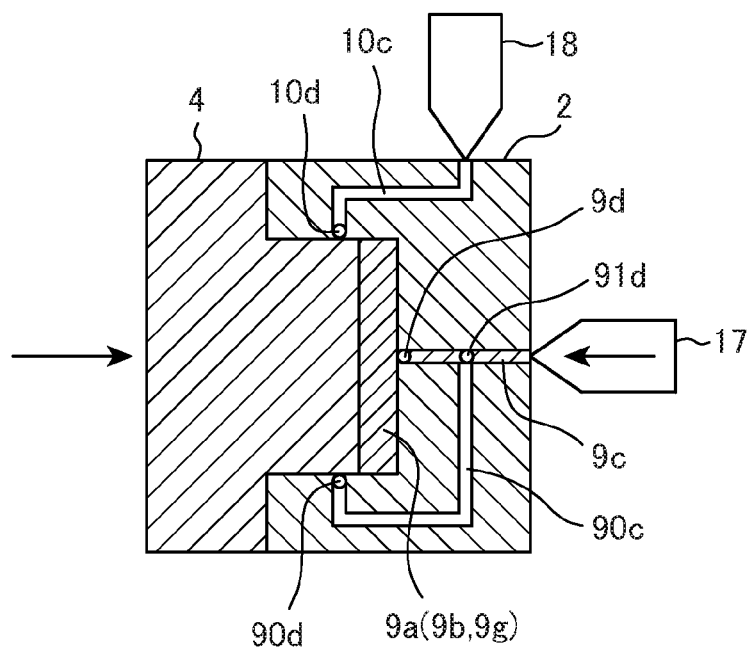
FIG. 1A is a schematic cross-sectional view showing a base layer molding step of manufacturing steps according to example 1 performed employing an injection molding machine according to a first embodiment of the present invention.

Embodiments for carrying out the present invention will be described in detail below with reference to the accompanying drawings.

[Sandwich Molded Product According to Present Embodiment]

As shown in, for example, FIGS. 1F, 2C, 4E, 6C, 10F, 16F, 17C, 18C, 20E, and 27A to 27C, a sandwich molded product 9 (9') according to the present embodiment includes: a sandwich molded portion 9h (9h') in which an inner layer portion configured from a second resin 10b (10b') is formed in an outer layer portion (outer layer main body) configured from a first resin 9b (9b'); and a base layer 9g (9g') provided partially on an outer surface of the outer layer portion of the sandwich molded portion 9h (9h'). This base layer 9g (9g'), along with the outer layer portion of the sandwich molded portion 9h (9h'), forms an outer surface of the sandwich molded product 9 (9'). In this way, the sandwich molded product 9 (9'), by having the base layer 9g (9g') provided partially to the sandwich molded portion 9h (9h'), is configured such that thickness of its outer layer differs partially.

The outer layer portion of the sandwich molded portion 9h (9h'), the inner layer portion of the sandwich molded portion 9h (9h'), and the base layer 9g (9g') are made of same or different resins. That is, the sandwich molded product 9 (9') according to the present embodiment is formed by appropriately combining same or different kinds of resins, or resins of same or different colors, and so on.

A variety of resins may be employed as the resin, for example, a non-foamable resin, a foamable resin, a functional resin, and so on, may be employed as the resin, provided that the resin allows the sandwich molded product 9 (9') to be molded. Now, a functional resin is a resin that has functionality of, for example, an electromagnetic wave shielding property, a vibration-damping property, sound absorbency, incombustibility, and so on. Adopting such a foamable resin or functional resin makes it possible to achieve weight saving or addition of various functions in the sandwich molded product 9 (9').

Specifically, in the sandwich molded product 9 (9') according to the present embodiment, the inner layer portion of the sandwich molded portion 9h (9h') is contained within the outer layer portion, and is basically not exposed, hence may adopt the likes of a recycled resin. This recycled resin is a resin that uses as its raw material the likes of plastic recyclable waste or scrap plastic. Adopting this recycled resin makes it possible to achieve a reduction in costs and to achieve effective use of resources. Such a sandwich molded product employing the likes of recycled resin in its inner layer portion can be suitably adopted as a resin product for a large component using a large amount of resin, such as a bumper of an automobile or a pallet for transport/distribution, or a container box, and so on.

The sandwich molded product 9 (9') according to the present embodiment is configured such that thickness of its outer layer differs partially, hence it is possible to, for example, mold the outer layer on an front surface side (design surface side) thinly, and mold the outer layer on a rear surface side (non-design surface side) more thickly than that on the front surface side. As a result, it is possible to make best use of feel (direct sensation of feeling by directly touching), and so on, of an outer layer resin, and it is possible to secure overall rigidity of the sandwich molded product or attachment rigidity to another component, and so on.

Moreover, the sandwich molded product 9 (9') according to the present embodiment, by having the outer layer on its front surface side molded thinly, can utilize a function of an inner layer resin on an outer layer side. For example, when the inner layer is formed by a soft resin material or is configured as a foam layer by foaming a foamable resin, a soft feeling of the inner layer can be obtained via the thinly molded outer layer. This makes it possible to employ a hard resin material having a scratch resistance function as the outer layer resin. Moreover, since functionality of the inner layer resin can be obtained via the thinly formed outer layer, it becomes possible for the functional resin to be employed only in the inner layer. That is, due to the sandwich molded product 9 (9') according to the present embodiment, a cheap resin material can be adopted as a resin for the outer layer, and an amount of resin used of the comparatively expensive functional resin can be kept to a minimum requirement. Furthermore, the functional resin easily undergoes thermal degradation during molding, whereby there is the possibility of product appearance being spoiled, but the sandwich molded product 9 (9') according to the present embodiment makes it possible for the functional resin to be employed only in the inner layer, hence such a problem can be overcome.

Note that the sandwich molded product 9 (9') according to the present embodiment may be of any mode, provided that the base layer 9g (9g') is provided partially on the outer surface of the outer layer portion of the sandwich molded portion 9h (9h'), and that the sandwich molded product 9 (9') outer layer is formed by these outer layer portion of the sandwich molded portion 9h (9h') and base layer 9g (9g'). For example, as shown in, for example, FIGS. 1F, 2C, 4E, 6C, 10F, 27A, and 27B, the sandwich molded product 9 (9') may be formed by having the base layer 9g (9g') provided on an entire region of one of surfaces of the sandwich molded portion 9h (9h'). In addition, as is clear from, for example, FIGS. 9 and 14, the sandwich molded product 9 (9') may be formed by having the base layer 9g (9g') provided partially on one of surfaces of the sandwich molded portion 9h (9h'). Moreover, the sandwich molded product 9 (9') may be formed by having the sandwich molded portion 9h (9h') provided partially on one of surfaces of the base layer 9g (9g') (not illustrated). In addition, as shown in, for example, FIGS. 16F, 17C, and 20E, the sandwich molded product 9 (9') may be formed by surrounding part of the outer surface of the outer layer portion of the sandwich molded portion 9h (9h') by the base layer 9g (9g'), that is, by, for example, having the base layer 9g (9g') provided on one of surfaces of the sandwich molded portion 9h (9h') and a surface orthogonal to and continuous with this surface. Moreover, as shown in, for example, FIG. 18C, the sandwich molded product 9 (9') may be formed by surrounding part of the outer surface of the base layer 9g (9g') by the sandwich molded portion 9h (9h'), that is, by, for example, having the sandwich molded portion 9h (9h') provided on one of surfaces of the base layer 9g (9g') and a surface orthogonal to and continuous with this surface. In addition, as shown in, for example, FIG. 27C, the sandwich molded product 9 (9') may be formed by having the base layer 9g (9g') provided on part of one of surfaces of the sandwich molded portion 9h (9h') and at least one surface orthogonal to and continuous with this surface. Note that the base layer 9g (9g') may be provided on any surface of the sandwich molded portion 9h (9h'), that is, on any of the front surface (design surface), the rear surface (non-design surface), and side surfaces orthogonal to and continuous with these front surface and rear surface, of the sandwich molded portion 9h (9h').

Moreover, in the sandwich molded product 9 (9') according to the present embodiment, a design (shape) on a mold opening direction (or a mold closing direction) side of the base layer 9g (9g') and a design (shape) on a mold opening direction (or a mold closing direction) side of the sandwich molded portion 9h (9h') may be formed identically as shown in FIGS. 1F, 2C, 4E, 6C, 10F, and 27A, or may be formed so as to differ as shown in FIGS. 16F, 17C, 18C, 20E, 27B, and 27C. Moreover, as shown in FIGS. 16F, 17C, 20E, and 27A to 27C, the sandwich molded portion 9h (9h') and the base layer 9g (9g') may have shapes or thicknesses that differ partially.

[Injection Molding Machine According to First Embodiment]

Figure 7A:
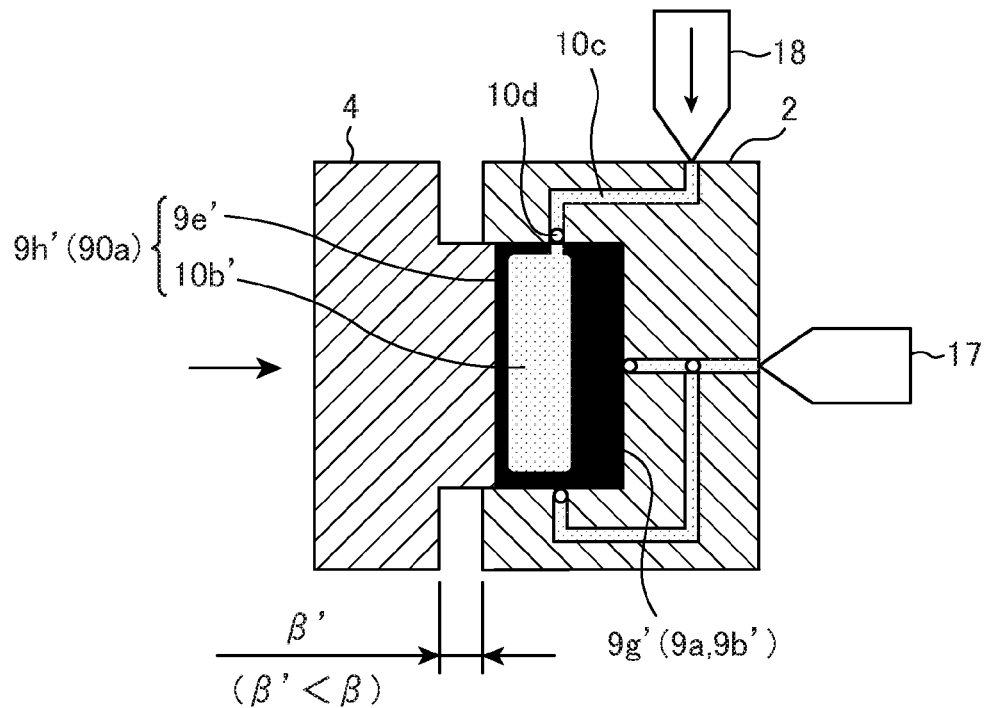
FIG. 7A is a schematic cross-sectional view showing a completion time of a second expansion step and a second injection-filling step, of manufacturing steps according to example 4 performed employing the injection molding machine according to the first embodiment.
Figure 7B:
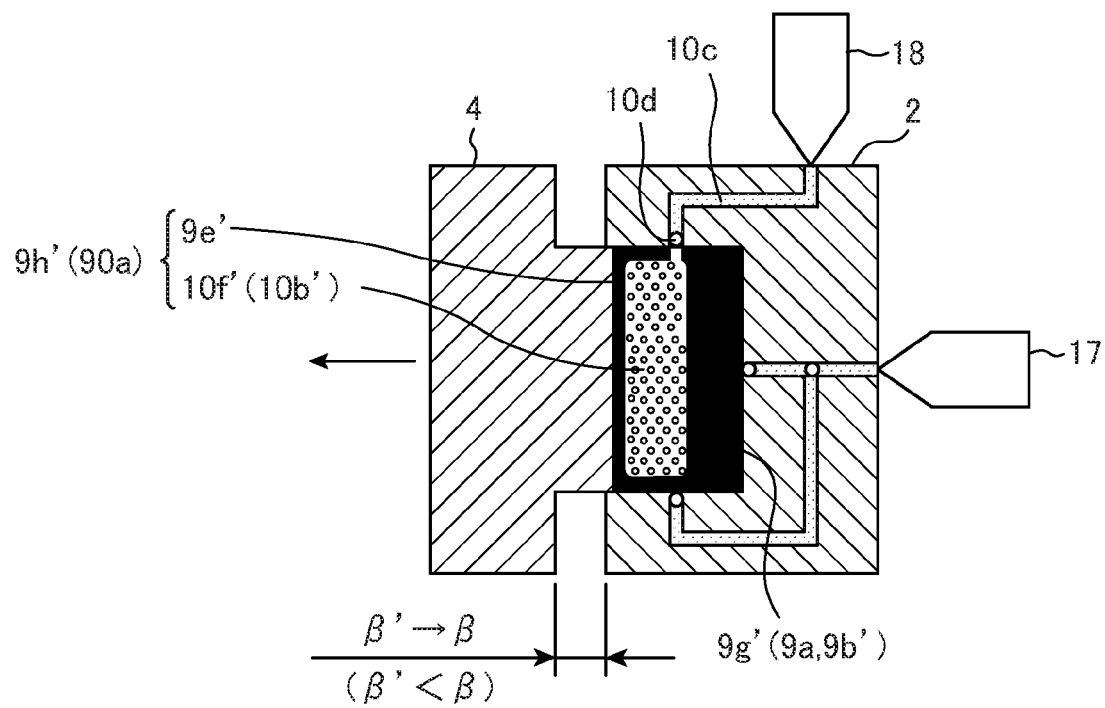
FIG. 7B is a schematic cross-sectional view showing a third expansion step of the manufacturing steps according to example 4.
Figure 8A:
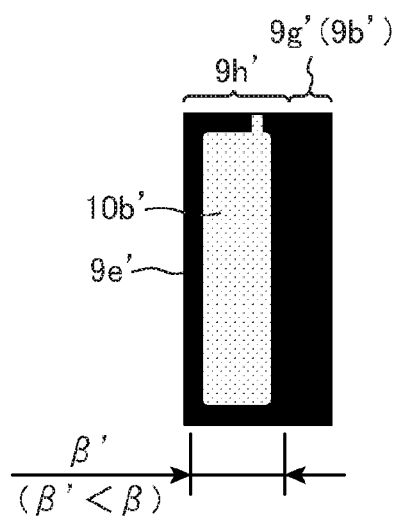
FIG. 8A is a schematic cross-sectional view showing a state of a sandwich molded product at the completion time of the second expansion step and the second injection-filling step.
Figure 8B:
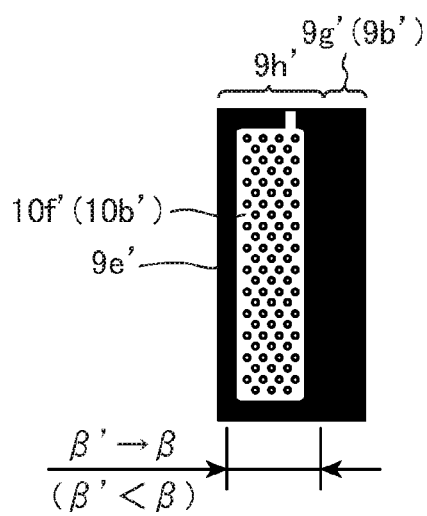
FIG. 8B is a schematic cross-sectional view showing a state of the sandwich molded product during the third expansion step.
Figure 9:
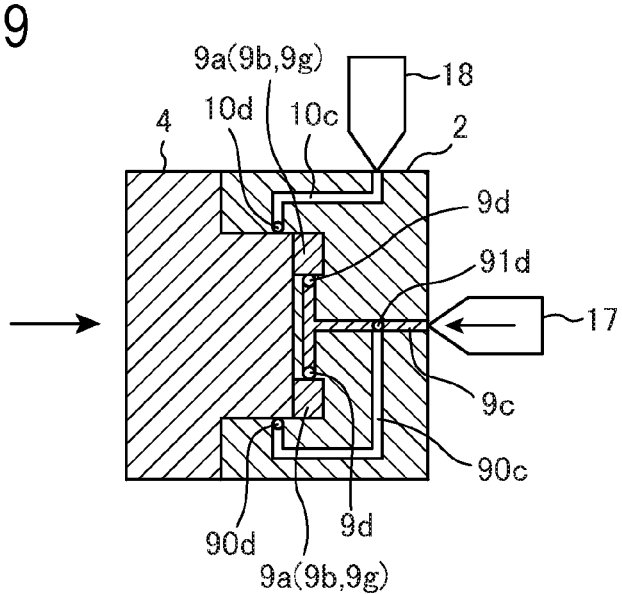
FIG. 9 is a schematic cross-sectional view showing an example of another mold usable in the injection molding machine according to the first embodiment.

Next, a method in which an injection molding machine according to a first embodiment is employed to manufacture a sandwich molded product will be described using FIGS. 1A to 8B. FIGS. 1A to 2C are views showing manufacturing steps according to example 1 performed employing the injection molding machine according to the first embodiment. FIGS. 3A to 4E are views showing manufacturing steps according to example 2 performed employing the injection molding machine according to the first embodiment. FIGS. 5A to 6C are views showing manufacturing steps according to example 3 performed employing the injection molding machine according to the first embodiment. FIGS. 7A to 8B are views showing manufacturing steps according to example 4 performed employing the injection molding machine according to the first embodiment. FIG. 9 is a view showing an example of another mold usable in the injection molding machine according to the first embodiment.

Note that in the description of the first embodiment, a mold cavity 9a is assumed to refer to a space formed between an inner surface of a fixed mold 2 and an inner surface of a movable mold 4 by the fixed mold 2 and the movable mold 4 being mold-clamped. Moreover, a mold cavity expansion portion 90a is assumed to refer to a space between the outer surface of the base layer 9g (9g') and the inner surface of the movable mold 4 newly caused by the movable mold 4 being mold-opened with respect to the fixed mold 2. Furthermore, the sandwich molded portion 9h (9h') is assumed to refer to a molded body molded inside the mold cavity expansion portion 90a.

The injection molding machine according to the first embodiment is an injection molding machine for forming the base layer 9g (9g') and the outer layer portion of the sandwich molded portion 9h (9h') by an same resin, and forming an inner layer portion of the sandwich molded portion 9h (9h') by a resin which is same to or different from that of the outer layer portion and the base layer 9g (9g'). Specifically, as shown in, for example, FIGS. 1A to 1F, the injection molding machine according to the first embodiment comprises: the fixed mold 2 and movable mold 4 capable of forming the mold cavity 9a; a first injection unit 17 capable of plasticizing (melting) the first resin 9b (9b') (base layer resin and first resin) for forming the base layer and the outer layer portion to injection-fill the first resin 9b (9b') inside the mold cavity 9a or the mold cavity expansion portion 90a; and a second injection unit 18 capable of plasticizing the second resin 10b (10b') for forming the inner layer portion to injection-fill the second resin 10b (10b') inside the mold cavity expansion portion 90a of the mold cavity 9a.

The fixed mold 2 is attached to a fixed platen (not illustrated) standing on a base (not illustrated). Formed in the fixed mold 2 are: a first resin channel 9c in which the first resin 9b (9b') injected from the first injection unit 17 flows toward the inside of the mold cavity 9a; a first resin branch channel 90c formed branching from the first resin channel 9c and in which the first resin 9b (9b') injected from the first injection unit 17 flows toward the inside of the mold cavity expansion portion 90a; and a second resin channel 10c in which the second resin 10b (10b') injected from the second injection unit 18 flows toward the inside of the mold cavity expansion portion 90a. Moreover, the fixed mold 2 includes: a gate valve (resin shutoff release switching valve) 9d provided at a gate portion communicating with the inside of the mold cavity 9a of the first resin channel 9c; a first resin channel switching valve 91d provided at a branch of the first resin channel 9c and switching a channel of the first resin 9b (9b'); a gate valve 90d provided at a gate portion communicating with the inside of the mold cavity expansion portion 90a of the first resin branch channel 90c; and a gate valve 10d provided at a gate portion communicating with the inside of the mold cavity expansion portion 90a of the second resin channel 10c. Note that in the injection molding machine according to the first embodiment, the first resin channel 9c, the first resin branch channel 90c, and the second resin channel 10c are configured by a hot runner.

The movable mold 4 is attached to a movable platen (not illustrated) so as to face the fixed mold 2, and is disposed movably in a direction of moving closer to or moving away from the fixed mold 2 (referred to below as a mold opening/closing direction), by a mold opening/closing mechanism not illustrated.

The fixed mold 2 and the movable mold 4 each have a dividing surface (sometimes also referred to as a mold dividing surface, a parting surface, and a cut surface) of the mold which has a share edge structure, and are configured such that volume of the mold cavity can be varied by a mold opening/closing operation by the mold opening/closing mechanism of the injection molding machine. A share edge structure, sometimes referred to also as a pincer structure or spigot joint structure, and so on, is a structure which is generally known as a structure of an engaging portion forming a dividing surface of a mold, and is a structure in which by forming between the fixed mold and the movable mold an engaging portion extending in the mold opening/closing direction to allow these to be inserted/withdrawn while sliding along each other, the molten resin injection-filled inside the mold cavity can be prevented from leaking to the outside of the mold, even if the mold is mold-opened to a specified quantity.

The first injection unit 17 is disposed on a rear surface side of the fixed mold 2 so as to be parallel to the mold opening/closing direction. The second injection unit 18 is disposed on a side surface side (upward side in FIG. 1A) of the fixed mold 2 so as to orthogonally intersect the mold opening/closing direction. Note that an arrangement of the first injection unit 17 and the second injection unit 18 need only be an arrangement enabling resin to be injection-filled inside the mold cavity 9a or the mold cavity expansion portion 90a, and is not limited to the arrangement illustrated. For example, a variety of arrangements of the first injection unit 17 and the second injection unit 18, such as a parallel type arrangement, a V-shaped type arrangement, an oblique type arrangement, an L-shaped type arrangement, and so on, may be adopted. Now, the parallel type arrangement is a mode where the first injection unit 17 and the second injection unit 18 are both disposed on the rear surface side of the fixed mold 2 so as to be parallel to the mold opening/closing direction. The V-shaped type arrangement is a mode where the first injection unit 17 and the second injection unit 18 are both disposed on the rear surface side of the fixed mold 2 at a certain angle to the mold opening/closing direction. The oblique type arrangement is a mode where a main injection unit is disposed on the rear surface side of the fixed mold 2 so as to be parallel to the mold opening/closing direction, and a sub injection unit is disposed on the rear surface side of the fixed mold 2 obliquely to the main injection unit. These arrangements should be appropriately selected according to an injection-filling specification such as a kind of molten resin used or an injection-filling amount, and so on. Moreover, even in the case of commercially available retrofitting-type injection units, the arrangement may be a form in which those retrofitting-type injection units are added to a general purpose injection molding machine, provided that they enable a required injection-filling amount to be secured.

Method of Manufacturing According to Example 1

Figure 1B:
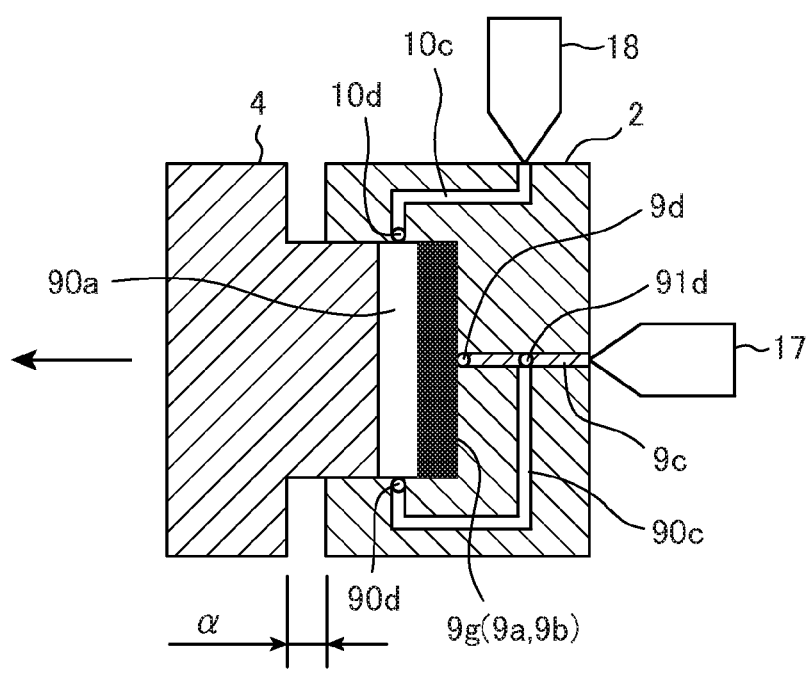
FIG. 1B is a schematic cross-sectional view showing a first expansion step of the manufacturing steps according to example 1.
Figure 1C:
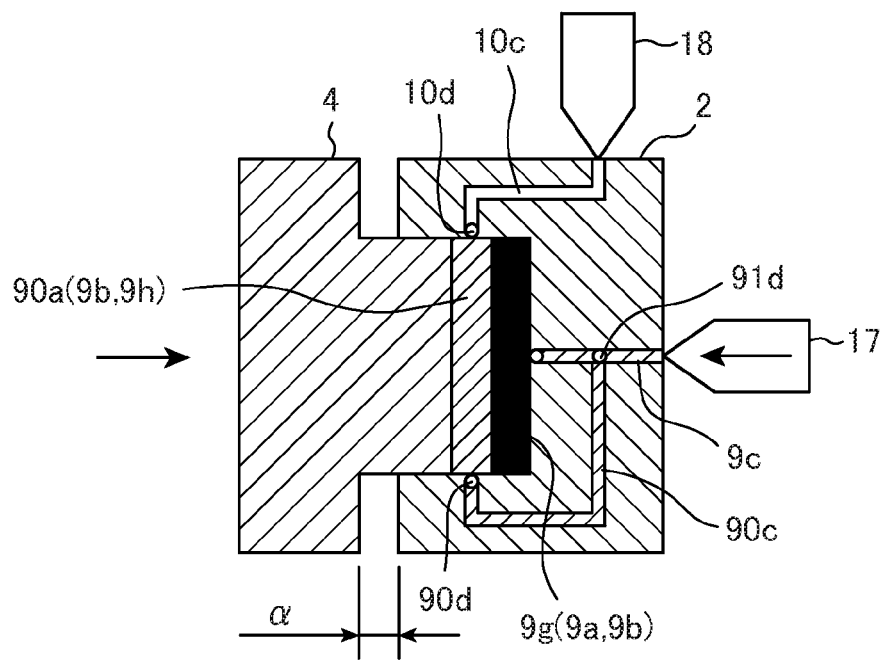
FIG. 1C is a schematic cross-sectional view showing a first injection-filling step of the manufacturing steps according to example 1.
Figure 1D:
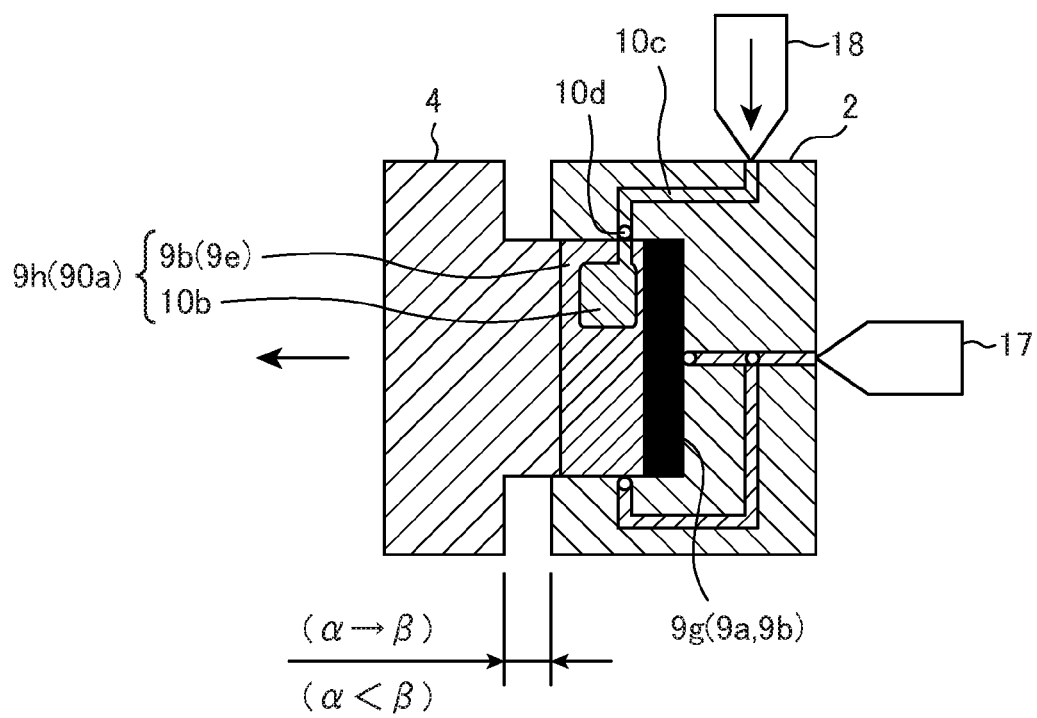
FIG. 1D is a schematic cross-sectional view showing a start time of a second expansion step and a second injection-filling step, of the manufacturing steps according to example 1.
Figure 1E:
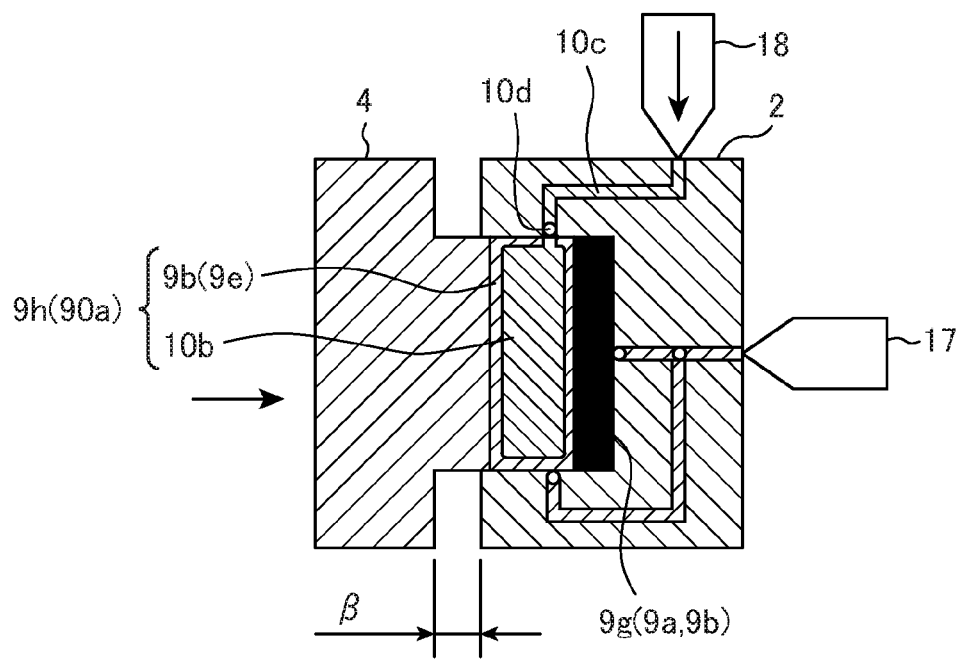
FIG. 1E is a schematic cross-sectional view showing a completion time of the second expansion step and the second injection-filling step, of the manufacturing steps according to example 1.
Figure 1F:
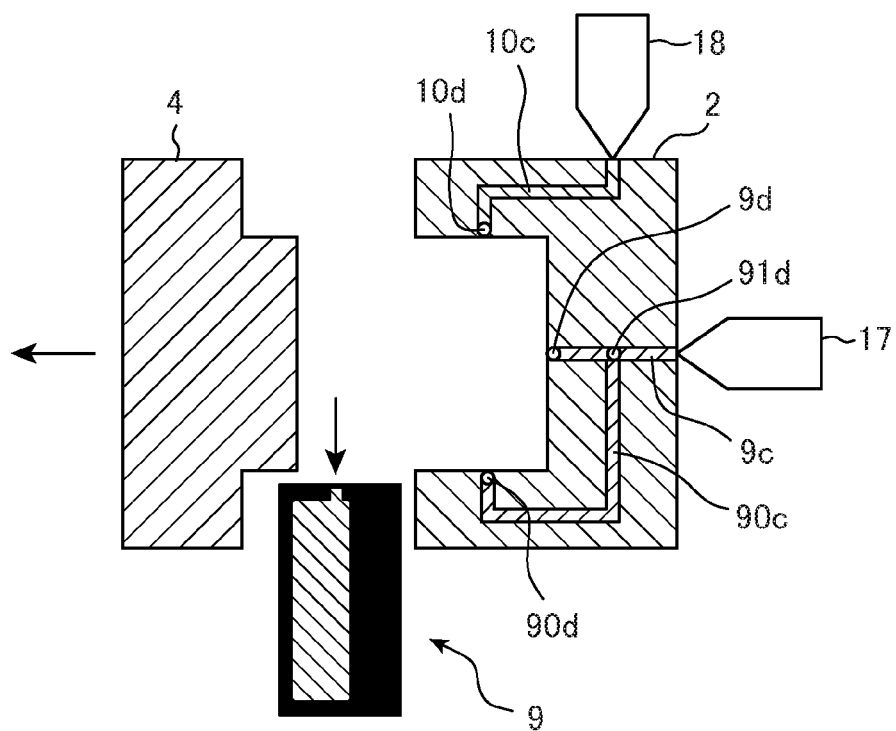
FIG. 1F is a schematic cross-sectional view showing a product removing step of the manufacturing steps according to example 1.
Figure 2A:
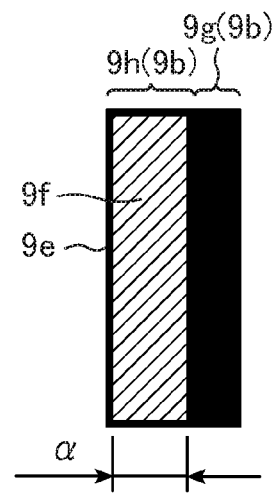
FIG. 2A is a schematic cross-sectional view showing a state of a sandwich molded product after completion of the first injection-filling step.
Figure 2B:
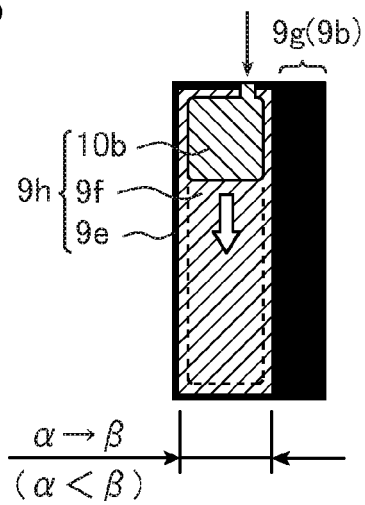
FIG. 2B is a schematic cross-sectional view showing a state of the sandwich molded product at the start time of the second expansion step and the second injection-filling step.
Figure 2C:
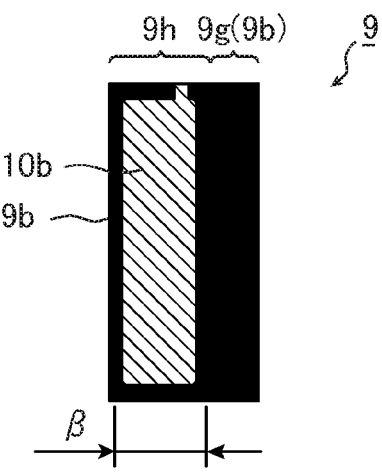
FIG. 2C is a schematic cross-sectional view showing a state of the sandwich molded product after completion of a product cooling step.

Next, a method of manufacturing according to example 1 performed employing the injection molding machine according to the first embodiment will be described using FIGS. 1A to 2C. FIGS. 1A to 1F are schematic cross-sectional views of a mold showing molding steps of the method of manufacturing (injection molding method) according to example 1. FIG. 1A shows a base layer molding step. FIG. 1B shows a first expansion step. FIG. 1C shows a first injection-filling step. FIG. 1D shows a start time of a second expansion step and a second injection-filling step. FIG. 1E shows a completion time of the second expansion step and the second injection-filling step. FIG. 1F shows a product removing step. In addition, FIGS. 2A to 2C are schematic cross-sectional views showing the sandwich molded product during each of the molding steps. FIG. 2A shows the sandwich molded product after completion of the first injection-filling step. FIG. 2B shows the sandwich molded product at the start time of the second expansion step and the second injection-filling step. FIG. 2C shows the sandwich molded product after completion of a product cooling step.

The method of manufacturing according to example 1 is, roughly, a method in which the outer layer portion of the sandwich molded portion 9h and the base layer 9g are made of the non-foamable first resin 9b, and the inner layer portion of the sandwich molded portion 9h is made of the non-foamable second resin 10b.

In the method of manufacturing according to example 1, first, as shown in FIG. 1A, the inside of the mold cavity 9a formed by mold-clamping the fixed mold 2 and the movable mold 4 is injection-filled with the outer layer first resin 9b to mold the base layer 9g (base layer molding step). Specifically, the movable mold 4 is mold-closed on the fixed mold 2 by the mold opening/closing mechanism not illustrated, and then a mold clamping force is applied. Next, in a state where the mold clamping force has been applied, the first resin channel switching valve 91d is switched to a first resin channel 9c side, the gate valve 9d provided in the first resin channel 9c is opened, and the mold cavity 9a is injection-filled with the non-foamable first resin 9b, from the first injection unit 17, via the first resin channel 9c. As it is, the first resin 9b inside the mold cavity 9a is cooled and solidified, and the base layer 9g is molded inside the mold cavity 9a. Molding of the base layer 9g by the base layer molding step is performed in a so-called fully-packed state where the inside of the mold cavity 9a is substantially 100% filled by the first resin 9b. Note that molding of the base layer 9g by the base layer molding step is due to a general injection molding method, hence a detailed description thereof will be omitted.

As shown in FIG. 1B, after the base layer molding step, the movable mold 4 is mold-opened from the fixed mold 2 by an extent of a distance α by the mold opening/closing mechanism not illustrated, and the mold cavity expansion portion 90a (certain space) is formed between the outer surface of the base layer 9g held on a fixed mold 2 side and the inner surface of the movable mold 4. In this step (first expansion step), the gate valve 90d provided in the first resin branch channel 90c and the gate valve 10d provided in the second resin channel 10c attain a state of being openable to the inside of the mold cavity expansion portion 90a.

Note that in present example 1, it has been assumed that after the base layer molding step, the first expansion step is performed in a state where the base layer 9g is held to the fixed mold 2, but the first expansion step may be performed in a state where the base layer 9g is held to the movable mold 4. In this case, the mold cavity expansion portion 90a gets formed between the outer surface of the base layer 9g held on a movable mold 4 side and the inner surface of the fixed mold 2. Moreover, in this case, the gate valve 90d provided in the first resin branch channel 90c and the gate valve 10d provided in the second resin channel 10c are disposed capable of opening to the inside of the mold cavity expansion portion 90a. In addition, if these gate valves are disposed at an overlap position of the mold cavity 9a and the mold cavity expansion portion 90a, then during injection-filling of the first resin 9b to the inside of the mold cavity 9a in the base layer molding step, these gate valves are closed and a back flow of the first resin 9b to each of the resin channels is prevented.

As shown in FIG. 1C, after the first expansion step, the first resin channel switching valve 91d provided in the first resin channel 9c is switched to a first resin branch channel 90c side, and the gate valve 90d provided in the first resin branch channel 90c is opened. Then, the inside of the mold cavity expansion portion 90a is injection-filled with the first resin 9b, from the first injection unit 17, via the first resin channel 9c and the first resin branch channel 90c (first injection-filling step). This first injection-filling step is a step that injection-fills the first resin 9b which is to be the previously mentioned outer layer portion of the sandwich molded portion 9h. At this time, the gate valve 10d provided in the second resin channel 10c is closed, and the first resin 9b injection-filled inside the mold cavity expansion portion 90a never flows back into the second resin channel 10c. Note that this first injection-filling step may be performed not after the first expansion step, but in conjunction with volume expansion of the mold cavity expansion portion 90a due to the first expansion step. Moreover, in the course of the first injection-filling step during and after this first expansion step, a mold clamping force opposing an injection pressure due to the first injection-filling step is maintained in the movable mold 4.

Now, the distance α which is a mold-opening amount in the first expansion step is set to a value at which the mold cavity expansion portion 90a formed in a mold opening operation of the distance α of this first expansion operation is substantially 100% filled by the first resin 9b injection-filled in the mold cavity expansion portion 90a, by the first injection-filling step. That is, the first injection-filling step is also performed in a fully-packed state where the inside of the mold cavity expansion portion 90a is substantially 100% filled by the first resin 9b. As a result, as shown in FIG. 2A, the first resin 9b injection-filled in the mold cavity expansion portion 90a (sandwich molded portion 9h) attains a state of being configured by: a skin layer 9e formed on a contact surface (outer peripheral surface) with a design (mold inner surface) of the mold cavity expansion portion 90a and a contact surface with the base layer 9g; and a molten layer 9f where the inside of the first resin 9b is still in a molten state.

Moreover, in the first injection-filling step continuing from the base layer molding step, the mold cavity expansion portion 90a continuing from the base layer 9g is injection-filled with the same first resin 9b as that of the base layer 9g as the outer layer resin of the sandwich molded portion 9h, hence there is no problem with fusibility (adhesiveness) between the base layer 9g and the sandwich molded portion 9h. Furthermore, in view of cooling solidification contraction of the sandwich molded portion 9h after the first injection-filling step, it is more preferable that in the first injection-filling step, an amount of the first resin 9b greater than the volume of the mold cavity expansion portion 90a by at least an extent of a cooling solidification contraction portion is injection-filled, in terms of securing fusibility (adhesiveness) strength between the base layer 9g and the skin layer 9e of the sandwich molded portion 9h, and a high transferability to the skin layer 9e of the sandwich molded portion 9h.

Next, as shown in FIG. 1D, after completion of the first injection-filling step, the volume of the mold cavity expansion portion 90a is expanded until it attains a product volume in conjunction with the volume of the mold cavity 9a (second expansion step). Specifically, the movable mold 4 is mold-opened by the mold opening/closing mechanism not illustrated, from a state shown in FIG. 1C (mold-opening amount: distance α) to a position separated from the fixed mold 2 by an extent of a distance β (mold-opening amount: distance β). Then, after the start of this second expansion step, the gate valve 10d provided in the second resin channel 10c is opened, and the inside of the sandwich molded portion 9h is injection-filled with the non-foamable second resin 10b forming the inner layer, from the second injection unit 18, via the second resin channel 10c (second injection-filling step). A flow state of the inner layer second resin 10b at a start time of this second injection-filling step is shown in FIG. 2B.

In the second expansion step and the second injection-filling step, injection-filling of the second resin 10b by the second injection-filling step should be performed in a fully-packed state. That is, an injection-filling amount of the inner layer second resin 10b injection-filled in the second injection-filling step may be controlled in coordination with volume expansion rate of the mold cavity expansion portion 90a (in coordination with the second expansion step). Moreover, volume expansion rate of the mold cavity expansion portion 90a in the second expansion step may be controlled in coordination with the injection-filling amount of the inner layer second resin 10b (in coordination with the second injection-filling step). Furthermore, both may be controlled to be coordinated. In the course of the second injection-filling step during and after this second expansion step, a mold clamping force opposing an injection pressure due to the second injection-filling step is maintained in the movable mold 4.

By having the second expansion step and the second injection-filling step controlled in coordination in this way, a close-contact state between the gate valve 10d provided in the second resin channel 10c and the skin layer 9e of the sandwich molded portion 9h can be maintained. As a result, the skin layer 9e of the outer layer first resin 9b can be penetrated by injection pressure of the inner layer second resin 10b to injection-fill the inner layer second resin 10b inside the first resin 9b, while preventing occurrence of a resin inversion defect in a gate valve 10d portion and the skin layer 9e of the sandwich molded portion 9h. Furthermore, volume expansion of the mold cavity expansion portion 90a makes it possible for injection-filling resistance of the second resin 10b to inside of the first resin 9b to be reduced to the same degree as free flow of molten resin inside the mold cavity, and makes it possible to achieve an improvement in filling ratio of the inner layer second resin 10b with respect to volume of the sandwich molded portion 9h.

Moreover, the skin layer 9e formed on the outer peripheral surface of the sandwich molded portion 9h is a thin layer cooled and solidified instantaneously by contact with the design (mold inner surface) of the mold cavity expansion portion 90a or a surface on a movable mold 4 side of the cooled and solidified base layer 9g. This skin layer 9e, although having a strength capable of preventing a resin inversion defect of the second resin 10b injection-filled inside the sandwich molded portion 9h, is not a completely solidified layer, and is a thin film kind of layer whose temperature is greater than or equal to a resin softening point temperature or a glass solidification temperature, is in the process of cooling and solidification, and shows rubbery elastic behavior in a layer direction. Therefore, it is capable of tracking volume expansion of the mold cavity expansion portion 90a (volume expansion of the sandwich molded portion 9h) in the second expansion step. On the other hand, a first resin 9b portion including a molten resin portion continuous with the skin layer 9e of the sandwich molded portion 9h eventually becomes the outer layer portion of the sandwich molded portion 9h due to cooling and solidification proceeding from the skin layer 9e.

Now, similarly to in the first injection-filling step, in view of cooling solidification contraction of the sandwich molded portion 9h, it is preferable that in coordinated control of the second expansion step and the second injection-filling step, both steps are completed substantially simultaneously, or the second injection-filling step is completed after completion of the mold cavity second expansion step. Moreover, in the second injection-filling step also, it is more preferable that an amount of the second resin 10b greater than the volume of the mold cavity expansion portion 90a after the second expansion step by at least an extent of a cooling solidification contraction portion is injection-filled, in terms of securing fusibility (adhesiveness) strength between the base layer 9g and the skin layer 9e of the sandwich molded portion 9h, and a high transferability to the skin layer 9e of the sandwich molded portion 9h and the base layer 9g.

As shown in FIG. 1E, after completion of the second expansion step and the second injection-filling step, when the gate valve 10d provided in the second resin channel 10c is closed and the base layer 9g and sandwich molded portion 9h inside the mold cavity 9a and mold cavity expansion portion 90a are cooled and solidified in a state of being applied with a certain mold clamping force, the sandwich molded product 9 having different thicknesses of the outer layer on a fixed mold 2 side (base layer 9g+outer layer portion of sandwich molded portion 9h) and the outer layer on a movable mold 4 side (outer layer portion of sandwich molded portion 9h), is molded (product cooling and solidification step). The sandwich molded product 9 after completion of this product cooling and solidification step is shown in FIG. 2C. In relation to FIG. 2C, the inner layer second resin 10b in a cooled and solidified state is shown by the same slanting lines as that in a molten state.

As shown in FIG. 1F, after cooling and solidification of the sandwich molded product 9 has been completed, the movable mold 4 is mold-opened from the fixed mold 2 by the mold opening/closing mechanism not illustrated, the sandwich molded product 9 is carried out to outside of the injection molding machine by a product removing means not illustrated, and a molding cycle finishes.

The method of manufacturing according to example 1 enables the sandwich molded product 9 having different thicknesses of the outer layer on a fixed mold 2 side (base layer 9g+outer layer portion of sandwich molded portion 9h) and the outer layer on a movable mold 4 side (outer layer portion of sandwich molded portion 9h), to be molded successively by repeating the above steps. That is, the sandwich molded product 9 is formed by having the sandwich molded portion 9h stacked on the initially molded base layer 9g configured from the first resin 9b. This base layer 9g, along with the outer layer portion of the sandwich molded portion 9h, configures the outer layer of the sandwich molded product 9. In such a way, by stacking this base layer 9g on either surface of the front surface or the rear surface of the sandwich molded portion 9h and configuring the base layer 9g as part of the outer layer of the sandwich molded product 9, the thickness of the outer surface of the sandwich molded product 9 can be molded such that the thickness differs partially, in the present embodiment, such that the thickness differs between the front surface and the rear surface.

The method of manufacturing according to example 1 makes it possible to achieve an improvement in filling ratio of the inner layer second resin $10b$ with respect to volume of the sandwich molded portion $9h$, hence is suitable for controlling the outer layer to be thin. In terms of configuration of the sandwich molded product 9, example 1 results in a sandwich molded product in which the outer layer on the fixed mold 2 side configured by the base layer $9g$+the outer layer portion of the sandwich molded portion $9h$ is thicker than the outer layer on the movable mold 4 side configured by the single outer layer portion of the sandwich molded portion $9h$, that is, example 1 results in a sandwich molded product in which the inner layer configured from the second resin $10b$ is decentered to a movable mold 4 side in the mold opening/closing direction.

Moreover, the method of manufacturing according to example 1 has injection-filling in the base layer molding step, the first injection-filling step, and the second injection-filling step performed in a fully-packed state, hence for both front and rear surfaces (the fixed mold 2 side and the movable mold 4 side) of the outer surface of this sandwich molded product 9, a high transferability of design of the mold cavity $9a$ can be secured, and it is possible to prevent occurrence of a resin inversion defect when the inner layer second resin $10b$ is injection-filled to the inside of the outer layer first resin $9b$. Furthermore, the outer layer first resin $9b$ and the inner layer second resin $10b$ are each injection-filled to the inside of the mold cavity $9a$ or mold cavity expansion portion $90a$ from independent gates (gate valves), hence there is no need for the likes of a mixing nozzle that makes two kinds of resins into a laminar flow. Moreover, the skin layer $9e$ of the outer layer first resin $9b$ is penetrated by injection pressure of the inner layer second resin $10b$, hence there is also no need for the likes of a special gate structure or gate valve, and so on, for the inner layer second resin $10b$. Therefore, there are few restrictions on arrangement of these gate portions or resin channels communicating with the gate portions, and design of the mold is made easy.

Method of Manufacturing According to Example 2

Figure 4A:
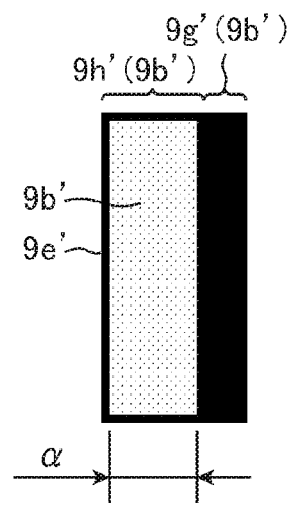
FIG. 4A is a schematic cross-sectional view showing a state of a sandwich molded product after completion of a first injection-filling step.
Figure 4B:
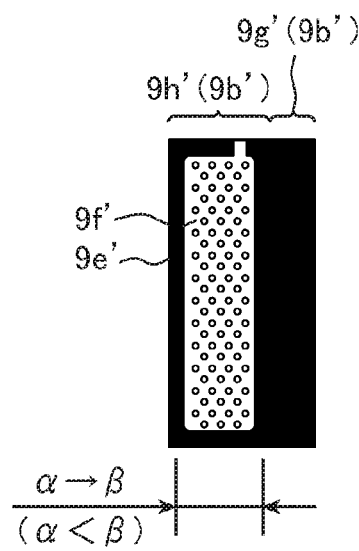
FIG. 4B is a schematic cross-sectional view showing a state of the sandwich molded product during the second expansion step.
Figure 4C:
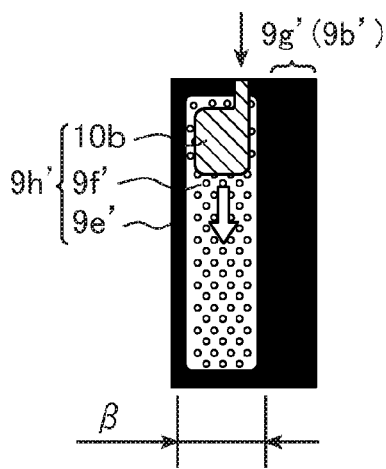
FIG. 4C is a schematic cross-sectional view showing a state of the sandwich molded product at the start time of the second injection-filling step.
Figure 4D:
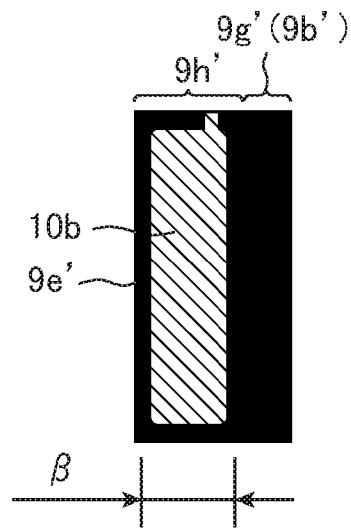
FIG. 4D is a schematic cross-sectional view showing a state of the sandwich molded product at the completion time of the second injection-filling step.
Figure 4E:
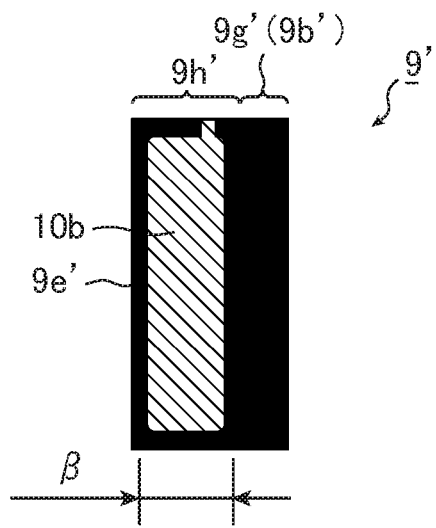
FIG. 4E is a schematic cross-sectional view showing a state of the sandwich molded product after completion of a product cooling step.

Next, a method of manufacturing according to example 2 performed employing the injection molding machine according to the first embodiment will be described using FIGS. 3A to 4E. FIGS. 3A to 3C are schematic cross-sectional views of a mold showing a second expansion step and a second injection-filling step of the method of manufacturing (injection molding method) according to example 2. FIG. 3A shows the second expansion step. FIG. 3B shows a start time of the second injection-filling step. FIG. 3C shows a completion time of the second injection-filling step. FIGS. 4A to 4E are schematic cross-sectional views showing the sandwich molded product during each of the molding steps. FIG. 4A shows the sandwich molded product after completion of a first injection-filling step. FIG. 4B shows the sandwich molded product during the second expansion step. FIG. 4C shows the sandwich molded product at the start time of the second injection-filling step. FIG. 4D shows the sandwich molded product at the time of completion of the second injection-filling step. FIG. 4E shows the sandwich molded product after completion of a product cooling step.

The method of manufacturing according to example 2 is, roughly, a method in which the outer layer portion of the sandwich molded portion $9h'$ and the base layer $9g'$ are made of the foamable first resin $9b'$, and the inner layer portion of the sandwich molded portion $9h'$ is made of the non-foamable second resin $10b$.

Points in which the method of manufacturing according to example 2 differs from the method of manufacturing according to example 1 are that the first resin is a foamable resin, and that due to this, an implementation timing of the second expansion step and the second injection-filling step are slightly different. Besides these points, the method of manufacturing according to example 2 is basically the same as the method of manufacturing according to example 1, hence a detailed description thereof will be omitted, or description will be made citing example 1 and only differences will be described in detail. Moreover, it is possible to employ also for the mold and injection molding machine basically the same ones as those described in example 1 besides the non-foamable first resin $9b$ being changed to the foamable first resin $9b'$, hence descriptions thereof will be omitted. Note that objects distinguished from those in the description of example 1 due to this difference between the non-foamable first resin $9b$ and the foamable first resin $9b'$ are assumed to be distinguished by assigning ' (an apostrophe) to the same reference symbol as in example 1.

Present example 2 is described on the assumption that the first resin $9b'$ is a foamable resin including a chemical foaming agent. It is also possible for the first resin $9b'$ to be a foamable resin including a physical foaming agent, but in that case, configuration requirements for appropriately mixing the physical foaming agent into the outer layer first resin $9b'$ become necessary in the mold or the injection molding machine. However, these configuration requirements are not directly related to the present invention, hence descriptions thereof will be omitted.

In the method of manufacturing according to example 2, first, a base layer molding step is performed and the base layer $9g'$ is molded inside the mold cavity $9a$, by a method similar to in the method of manufacturing according to example 1. Moreover, in the same way, by methods similar to those in example 1, a first expansion step and the first injection-filling step are performed, the mold cavity expansion portion $90a$ is formed between the outer surface of the base layer $9g'$ held on the fixed mold 2 side and the inner surface of the movable mold 4, and the inside of the mold cavity expansion portion $90a$ is again injection-filled with the foamable first resin $9b'$, from the first injection unit 17 (first injection-filling step). Descriptions and illustration of these steps will be omitted, but an understanding thereof is easy if the description of the method of manufacturing according to example 1 and FIGS. 1A to 1C and 2A and 2B are read replacing the non-foamable first resin $9b$ by the foamable first resin $9b'$.

In a general injection molding method of a sandwich molded product, there are problems such as there being a risk that foam cells end up being expressed to the skin layer, hence a foamable resin material is seldom adopted for the surface layer. Moreover, there is no necessity to go as far as adopting a foamable resin. However, by having injection-filling of the foamable first resin $9b'$ in the base layer molding step performed in a fully-packed state similarly to in example 1, a mold clamping force can be applied substantially uniformly to substantially an entire surface of the first resin $9b'$ (base layer $9g'$) injection-filled inside the mold cavity $9a$, whereby generation of foam cells inside the first resin $9b'$ and expression of foam cells to a skin layer $9e'$ during skin layer $9e'$ formation can be suppressed. Moreover, in the base layer molding step, if cooling and solidification are performed in a state where a certain mold clamping force has been applied, foam gas is sealed in a compressed state inside the base layer 9g', and there is no risk that foam gas or foam cells are expressed from the base layer 9g' after molding (that is, cooling and solidification are performed unchanged in an unfoamed state). Therefore, in the method of manufacturing according to example 2, even a foamable resin can be adopted as the outer layer resin, similarly to a non-foamable resin. Note that in present example 2, the base layer 9g' has been assumed to be a molded body (outer layer) having no foam layer, but it is also possible that in the base layer molding step, an expansion foaming molding method that foams the first resin 9b' is performed to configure the base layer 9g' as a foam molded body (outer layer) containing a foam layer inside.

Moreover, in the first injection-filling step also, injection-filling of the foamable first resin 9b' into the mold cavity expansion portion 90a is performed in a fully-packed state, hence generation of foam cells inside the first resin 9b' (sandwich molded portion 9h') inside the mold cavity expansion portion 90a and expression of foam cells to the skin layer 9e' during skin layer 9e' formation can be suppressed. Therefore, as shown in FIG. 4A, the sandwich molded portion 9h' after completion of the first injection-filling step is configured by: the skin layer 9e' in which foam cells are not expressed; and the first resin 9b' in a molten state in which generation of foam cells has been suppressed.

In order to more reliably suppress generation of foam cells inside the first resin 9b' and expression of foam cells to the skin layer 9e' in the base layer molding step and the first injection-filling step of example 2, a so-called gas counter pressure method may be adopted and used concomitantly. This gas counter pressure method is, roughly, a method in which the inside of the mold cavity 9a or the mold cavity expansion portion 90a is pre-pressurized by a pressure greater than or equal to a foam expansion pressure of the foamable first resin 9b' by being injected with a pressurized gas of air, nitrogen, and so on, and is then injection-filled with the foamable first resin 9b'.

Next, as shown in FIG. 3A, after the start of the first injection-filling step (that is, in the middle of the first injection-filling step or after completion of the first injection-filling step), the volume of the mold cavity expansion portion 90a is expanded until it attains a product volume in conjunction with the volume of the mold cavity 9a, and the first resin 9b' (sandwich molded portion 9h') in a molten state inside the mold cavity expansion portion 90a is foamed (second expansion step). Specifically, the movable mold 4 is mold-opened by the mold opening/closing mechanism not illustrated, from the state shown in FIG. 1C of example 1 (mold-opening amount: distance α) to a position separated from the fixed mold 2 by an extent of the distance β (mold-opening amount: distance β).

By this second expansion step, the skin layer 9e' of the sandwich molded portion 9h' has cooling and solidification thereof proceed to a side of the first resin 9b' still in a molten state, continuous with the skin layer 9e', and having generation of foam cells therein suppressed, a thickness of the skin layer 9e' increasing slightly (about 0.1 to 0.5 mm) so that the skin layer 9e' eventually becomes the outer layer of the sandwich molded portion 9h' (unfoamed state). In the description, this outer layer portion of the sandwich molded portion 9h' will hereafter also be referred to as the skin layer 9e'. On the other hand, in substantially all of the first resin 9b' still in a molten state and having generation of foam cells therein suppressed, of the skin layer 9e' inner portion of the sandwich molded portion 9h', foam cells are generated and grow. As a result, as shown in FIG. 4B, the sandwich molded portion 9h' attains a state of being configured by: the skin layer 9e' (outer layer) formed on a contact surface with a design (mold inner surface) of the mold cavity expansion portion 90a and with the base layer 9g'; and a foam layer 9f including foam cells which is continuous with the skin layer 9e'.

Next, as shown in FIG. 3B, after completion of the first injection-filling step and after the start of the second expansion step (that is, in the middle of the second expansion step or after completion of the second expansion step), the gate valve 10d provided in the second resin channel 10c is opened, and the inside of the outer layer foamable first resin 9b' (sandwich molded portion 9h') is injection-filled with the non-foamable second resin 10b forming the inner layer, from the second injection unit 18, via the second resin channel 10c (second injection-filling step). A flow state of the inner layer second resin 10b at a start time of this second injection-filling step is shown in FIG. 4C.

Now, the foam layer 9f inside the sandwich molded portion 9h' molded in the first injection-filling step and the second expansion step of the method of manufacturing according to present example 2 has a strength and density which are low with respect to the non-foamable first resin 9b injection-filled in a fully-packed state to the inside of the mold cavity expansion portion 90a. Therefore, as shown in FIG. 4C, the inner layer second resin 10b that has penetrated the skin layer 9e' of the sandwich molded portion 9h' by its injection pressure, is filled to the inside of the foam cells while compressing the foam gas inside the foam cells inside the foam layer 9f, or is substituted in place of the first resin 9b' while destroying the foam cells, unchanged, by its injection pressure and resin flow. On the other hand, the fact that the skin layer 9e' of the sandwich molded portion 9h' has its thickness increase slightly to become the outer layer of the sandwich molded portion 9h' (unfoamed state) is as described previously.

This step in which the foam layer 9f is substituted by the inner layer second resin 10b will be described in a little more detail. In the case where a chemical foaming agent is used, a foam gas pressure inside the foam cells inside the formed foam layer differs according to kind or molding conditions of the chemical foaming agent, but is generally set to 0.3 to 0.5 MPa (resin temperature 200° C.). In contrast, the injection-filling resin pressure (injection pressure) differs according to kind or molding conditions of the resin, but is generally set to 30 MPa to 50 MPa, or higher.

In the previously described second injection-filling step, such a large pressure difference between the foam gas pressure inside the foam cells inside the foam layer 9f and the injection-filling pressure of the inner layer second resin 10b results in almost all of the foam gas inside the foam cells being easily compressed to a volume of a degree having absolutely no effect on product quality and being left inside the inner layer second resin 10b, during injection-filling to the inside of the sandwich molded portion 9h' of the second resin 10b, without the foam gas inside the foam cells being a factor increasing resistance to that injection-filling. Moreover, a small fraction, along with a residue of the destroyed foam cells, is remelted in the second resin 10b, cooled and solidified in a state of being incorporated in the second resin 10b, and ceases to exist as the foam gas.

As a result, as shown in FIG. 4D, although it depends also on the likes of a combination of resins used or product shape and molding conditions, it becomes possible for the volume of the foam layer 9f of the sandwich molded portion 9h' (density reduction portion or expansion ratio portion due to the foam cells of the foam layer 9f with respect to the case where the foam layer 9f is a molten layer which is not a foam layer) to be substantially completely substituted by the inner layer second resin 10b. Therefore, it becomes possible to control with a certain precision the volume of the unfoamed portion of the sandwich molded portion 9h', that is, thickness of the outer layer of the sandwich molded portion 9h', from the volume of the foam layer 9f (density reduction portion or expansion ratio portion). On the other hand, the base layer 9g' which becomes any one of outer layers of the front surface and the rear surface of the sandwich molded product 9' can be molded with any shape and with any thickness on the fixed mold 2 side in the mold opening/closing direction, hence in the method of manufacturing according to present example 2, not only can the sandwich molded product have its thickness of the outer layer molded so as to differ partially, but it is also possible for thicknesses of each of the outer layers to be controlled with a certain precision.

Moreover, even when it is difficult for the volume of the foam layer 9f of the sandwich molded portion 9h' to be substantially completely substituted by the inner layer second resin 10b, and the unfoamed first resin 9b' and part of an outer peripheral surface portion of the foam layer 9f are mixed in the outer layer of the sandwich molded portion 9h', it is possible to infer thickness of the outer layer of the sandwich molded portion 9h' with a certain precision from the volume of the foam layer 9f.

As shown in FIG. 3C, after completion of the second expansion step and the second injection-filling step, the base layer 9g' and sandwich molded portion 9h' inside the mold cavity 9a and mold cavity expansion portion 90a are cooled and solidified in a state of being applied with a certain mold clamping force, whereby the sandwich molded product 9' is molded (product cooling and solidification step). The sandwich molded product 9' after completion of this product cooling and solidification step is shown in FIG. 4E. In relation to FIG. 4E, the inner layer second resin 10b in a cooled and solidified state is shown by the same slanting lines as that in a molten state.

After cooling and solidification of the sandwich molded product 9' has been completed, the movable mold 4 is mold-opened from the fixed mold 2 by the mold opening/closing mechanism not illustrated, the sandwich molded product 9' is carried out to outside of the injection molding machine by a product removing means not illustrated, and a molding cycle finishes.

The method of manufacturing according to example 2 enables the sandwich molded product 9' having different thicknesses of the outer layer on a fixed mold 2 side (base layer 9g'+outer layer portion of sandwich molded portion 9h') and the outer layer on a movable mold 4 side (outer layer portion of sandwich molded portion 9h'), to be molded successively by repeating the above steps.

In this way, the method of manufacturing according to example 2, by having the foam layer 9f of the sandwich molded portion 9h' whose strength and density are low injection-filled with the inner layer second resin 10b in the second injection-filling step, makes it possible for injection-filling resistance of the inner layer second resin 10b to be lowered even more than when a non-foamable resin has been adopted in the first resin 9b as in example 1. As a result, the method of manufacturing according to example 2 makes it possible to achieve a further improvement in filling ratio of the inner layer second resin 10b with respect to volume of the sandwich molded portion 9h' while preventing a resin inversion defect due to the inner layer second resin 10b, hence is even more suitable for controlling the outer layer to be thin. Moreover, not only can thickness of the outer layer be molded so as to differ respectively between the front surface and the rear surface of the sandwich molded product, but it is also possible for thicknesses of each of the outer layers to be controlled with a certain precision.

Method of Manufacturing According to Example 3

Figure 5A:
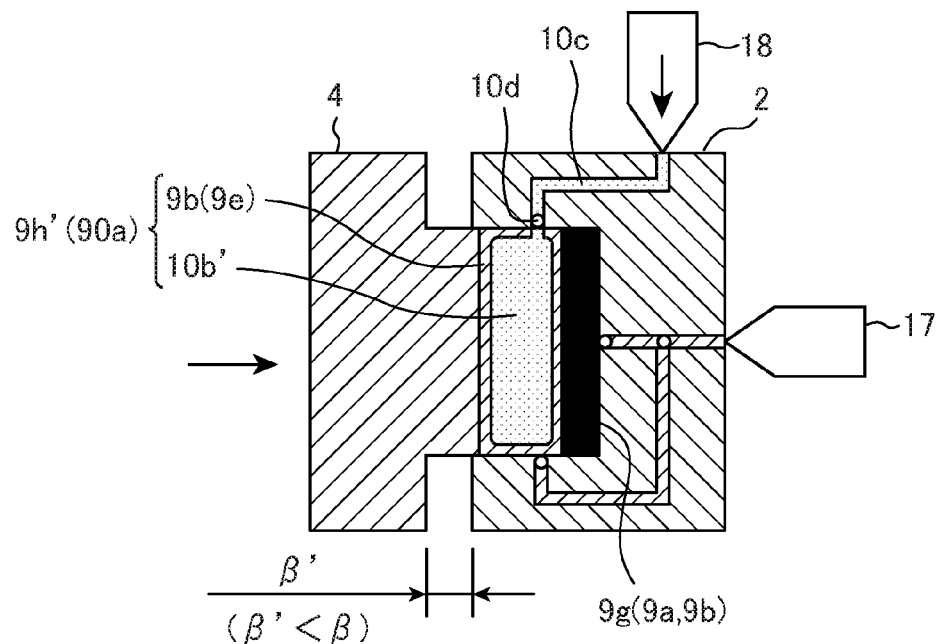
FIG. 5A is a schematic cross-sectional view showing a completion time of a second expansion step and a second injection-filling step, of manufacturing steps according to example 3 performed employing the injection molding machine according to the first embodiment.
Figure 5B:
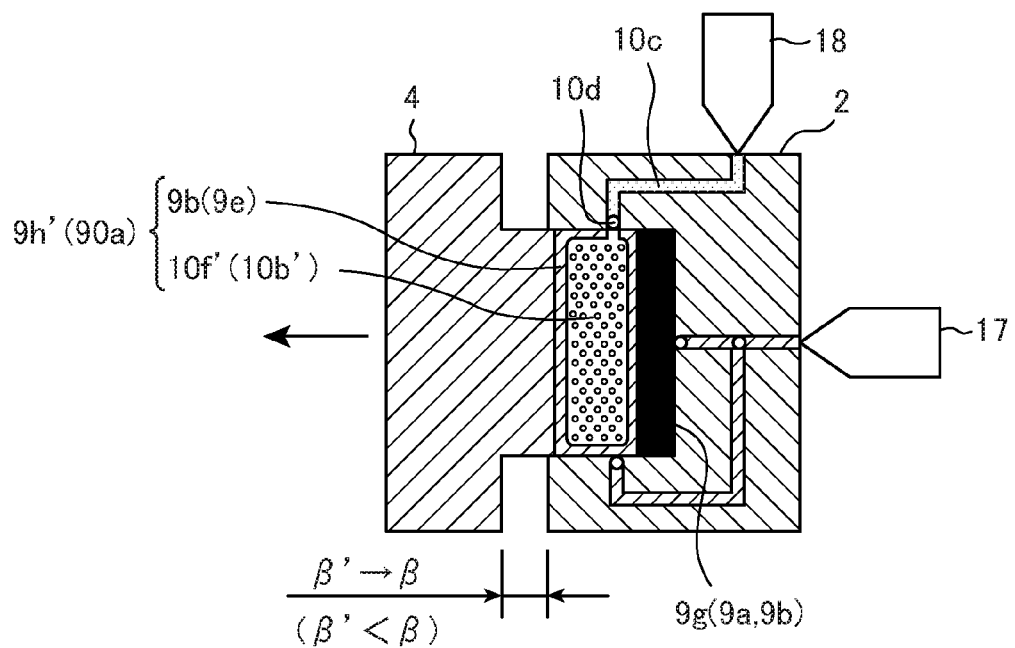
FIG. 5B is a schematic cross-sectional view showing a third expansion step of the manufacturing steps according to example 3.
Figure 6A:
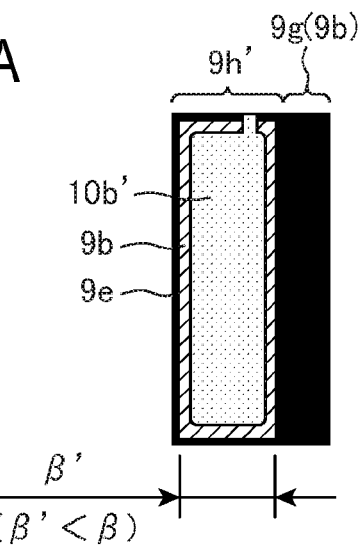
FIG. 6A is a schematic cross-sectional view showing a state of a sandwich molded product at the completion time of the second expansion step and the second injection-filling step.
Figure 6B:
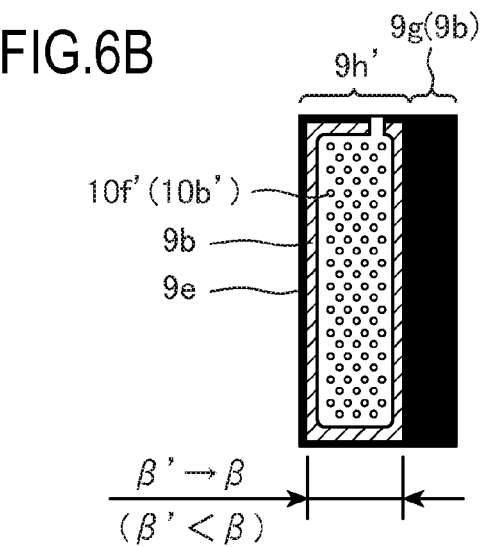
FIG. 6B is a schematic cross-sectional view showing a state of the sandwich molded product during the third expansion step.
Figure 6C:
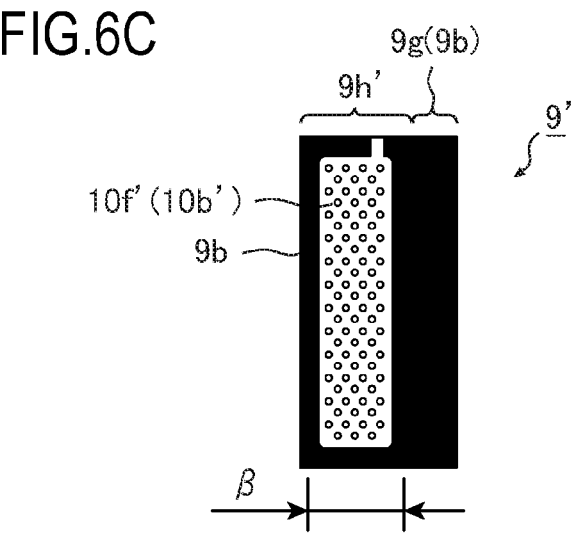
FIG. 6C is a schematic cross-sectional view showing a state of the sandwich molded product after completion of a product cooling step.

Next, a method of manufacturing according to example 3 performed employing the injection molding machine according to the first embodiment will be described using FIGS. 5A to 6C. FIGS. 5A and 5B are schematic cross-sectional views of a mold showing a second expansion step, a second injection-filling step, and a third expansion step of the method of manufacturing (injection molding method) according to example 3. FIG. 5A shows a completion time of the second expansion step and the second injection-filling step. FIG. 5B shows the third expansion step. FIGS. 6A to 6C are schematic cross-sectional views showing the sandwich molded product during each of the molding steps. FIG. 6A shows the sandwich molded product at the completion time of the second expansion step and the second injection-filling step. FIG. 6B shows the sandwich molded product during the third expansion step. FIG. 6C shows the sandwich molded product after completion of a product cooling step.

The method of manufacturing according to example 3 is, roughly, a method in which the outer layer portion of the sandwich molded portion 9h' and the base layer 9g are made of the non-foamable first resin 9b, and the inner layer portion of the sandwich molded portion 9h' is made of the foamable second resin 10b'.

Points in which the method of manufacturing according to example 3 differs from the method of manufacturing according to example 1 are that the second resin is a foamable resin, and that due to this, the method of manufacturing according to example 3 comprises the third expansion step in which, after the start of the second injection-filling step, the mold cavity expansion portion is caused to further expand to an extent of a specified quantity. Besides these points, the method of manufacturing according to example 3 is basically the same as the method of manufacturing according to example 1, hence a detailed description thereof will be omitted, or description will be made citing example 1 and only differences will be described in detail. Moreover, it is possible to employ also for the mold and injection molding machine basically the same ones as those described in example 1 besides the non-foamable second resin 10b being changed to the foamable second resin 10b', hence descriptions thereof will be omitted. Note that objects distinguished from those in the description of example 1 due to this difference between the non-foamable second resin 10b and the foamable second resin 10b' are assumed to be distinguished by assigning ' (an apostrophe) to the same reference symbol as in example 1.

Present example 3 is described on the assumption that the second resin 10b' is a foamable resin including a chemical foaming agent. It is also possible for the second resin 10b' to be a foamable resin including a physical foaming agent, but in that case, configuration requirements for appropriately mixing the physical foaming agent into the inner layer second resin 10b' become necessary in the mold or the injection molding machine. However, these configuration requirements are not directly related to the present invention, hence descriptions thereof will be omitted.

In the method of manufacturing according to example 3, first, a base layer molding step is performed and the base layer 9g is molded inside the mold cavity 9a, by a method similar to in the method of manufacturing according to example 1. Moreover, in the same way, by methods similar to those in example 1, a first expansion step and a first injection-filling step are performed, the mold cavity expansion portion 90a is formed between the base layer 9g held on the fixed mold 2 side and the movable mold 4, and the inside of the mold cavity expansion portion 90a is again injection-filled with the non-foamable first resin 9b, from the first injection unit 17 (first injection-filling step). Descriptions and illustration of these steps will be omitted.

Next, the second expansion step and the second injection-filling step are performed by coordinated control, by a method similar to that in example 1. Now, in the second expansion step of present example 3, the volume of the mold cavity expansion portion 90a is not expanded until it attains a product volume in conjunction with the volume of the mold cavity 9a, and is kept to an expansion to less than the product volume. A mold-opening amount at this time is set to β' (β'<β). In this way, as shown in FIG. 5A, the second expansion step and the second injection-filling step are completed. In present example 3, FIG. 5A is a state corresponding to FIG. 1E of example 1.

Note that similarly to in example 1, the second expansion step and the second injection-filling step are coordination-controlled and injection-filling of the second resin 10b' by the second injection-filling step is performed in a fully-packed state, hence the inner layer second resin 10b' injection-filled inside the sandwich molded portion 9h' is in an unfoamed state at this stage. The sandwich molded product 9' (base layer 9g+sandwich molded portion 9h') at the completion time of the second expansion step and the second injection-filling step is shown in FIG. 6A. FIG. 6A corresponds to a state in present example 3 where a start state of the second injection-filling step in which the inside of the sandwich molded portion is injection-filled with the inner layer second resin 10b, shown in FIG. 2B of example 1, has progressed and the same step has been completed.

Next, as shown in FIG. 5B, after the start of the second injection-filling step (that is, in the middle of the second injection-filling step or after completion of the second injection-filling step), the volume of the mold cavity expansion portion 90a is expanded until it attains the product volume in conjunction with the volume of the mold cavity 9a, and the foamable second resin 10b' inside the sandwich molded portion 9h' is foamed (third expansion step). Specifically, the movable mold 4 is mold-opened by the mold opening/closing mechanism not illustrated, from the state shown in FIG. 5A (mold-opening amount: distance β') to a position separated from the fixed mold 2 by an extent of the distance β (beta) (mold-opening amount: distance β). As a result, as shown in FIG. 6B, the sandwich molded portion 9h' attains a state of being configured by: the skin layer 9e formed on a contact surface with a design (mold inner surface) of the mold cavity expansion portion 90a and with the base layer 9g; the first resin 9b continuous with the skin layer 9e and including a molten state portion whose cooling and solidification is in progress; and a foam layer 10f' including foam cells.

After completion of the third expansion step, the base layer 9g and sandwich molded portion 9h' inside the mold cavity 9a and mold cavity expansion portion 90a are cooled and solidified in a state of being applied with a certain mold clamping force, whereby the sandwich molded product 9' is molded (product cooling and solidification step). The sandwich molded product 9' after completion of this product cooling and solidification step is shown in FIG. 6C. In relation to FIG. 6C, the foam layer 10f' of the inner layer second resin 10b' in a cooled and solidified state is shown by the same notation as when foamed.

After cooling and solidification of the sandwich molded product 9' has been completed, the movable mold 4 is mold-opened from the fixed mold 2 by the mold opening/closing mechanism not illustrated, the sandwich molded product 9' is carried out to outside of the injection molding machine by a product removing means not illustrated, and a molding cycle finishes.

The method of manufacturing according to example 3 enables the sandwich molded product 9' having different thicknesses of the outer layer on a fixed mold 2 side (base layer 9g+outer layer portion of sandwich molded portion 9h') and the outer layer on a movable mold 4 side (outer layer portion of sandwich molded portion 9h') and whose inner layer is configured from the foam layer 10f' (second resin 10b'), to be molded successively by repeating the above steps.

In this way, the method of manufacturing according to example 3, by adopting a foamable resin for the inner layer second resin and performing the third expansion step after the start of the second injection-filling step, makes it possible not only for thickness of the outer layer to be molded so as to differ respectively between the front surface and the rear surface of the sandwich molded product, but also for the inner layer to be configured as a foam layer. Such a sandwich molded product is suitable when there is a requirement for a function of including a foam layer and for further weight reduction, and so on, over the sandwich molded products molded by the methods of manufacturing according to examples 1 and 2.

Method of Manufacturing According to Example 4

Next, a method of manufacturing according to example 4 performed employing the injection molding machine according to the first embodiment will be described using FIGS. 7A to 8B. FIGS. 7A and 7B are schematic cross-sectional views of a mold showing a second expansion step, a second injection-filling step, and a third expansion step of the method of manufacturing (injection molding method) according to example 4. FIG. 7A shows a completion time of the second expansion step and the second injection-filling step. FIG. 7B shows the third expansion step. FIGS. 8A and 8B are schematic cross-sectional views showing the sandwich molded product during each of the molding steps. FIG. 8A shows the sandwich molded product at the completion time of the second expansion step and the second injection-filling step. FIG. 8B shows the sandwich molded product during the third expansion step.

The method of manufacturing according to example 4 is, roughly, a method in which the outer layer portion of the sandwich molded portion 9h' and the base layer 9g' are made of the foamable first resin 9b', and the inner layer portion of the sandwich molded portion 9h' is made of the foamable second resin 10b'.

Points in which the method of manufacturing according to example 4 differs from the method of manufacturing according to example 1 are that the first resin and the second resin are both a foamable resin, and that due to this, the method of manufacturing according to example 4 comprises the third expansion step in which, after the start of the second injection-filling step, the mold cavity expansion portion is caused to further expand to an extent of a specified quantity. That is, the method of manufacturing according to example 4 is a method that in the method of manufacturing according to example 2, adopts a foamable resin for the second resin and after the start of the second injection-filling step, performs the third expansion step that further expands the mold cavity expansion portion to an extent of a specified quantity. Besides these points, the method of manufacturing according to example 4 is basically the same as the methods of manufacturing according to examples 1 to 3, hence a detailed description thereof will be omitted, or description will be made citing any one of examples 1 to 3 and only differences will be described in detail. Moreover, it is possible to employ also for the mold and injection molding machine basically the same ones as those described in example 2 besides the non-foamable second resin 10*b* being changed to the foamable second resin 10*b*', hence descriptions thereof will be omitted. Note that objects distinguished from those in the description of example 2 due to this difference between the non-foamable second resin 10*b* and the foamable second resin 10*b*' are assumed to be distinguished by assigning ' (an apostrophe) to the same reference symbol as in example 2.

In the method of manufacturing according to example 4, first, a base layer molding step is performed and the base layer 9*g*' is molded inside the mold cavity 9*a*, by a method similar to in the method of manufacturing according to example 2. Moreover, in the same way, by methods similar to those in example 2, a first expansion step and a first injection-filling step are performed, the mold cavity expansion portion 90*a* is formed between the base layer 9*g*' held on the fixed mold 2 side and the movable mold 4, and the inside of the mold cavity expansion portion 90*a* is again injection-filled with the foamable first resin 9*b*', from the first injection unit 17 (first injection-filling step). Descriptions and illustration of these steps will be omitted.

Next, by a method similar to that in example 2, after the start of the first injection-filling step (that is, in the middle of the first injection-filling step or after completion of the first injection-filling step), the volume of the mold cavity expansion portion 90*a* is expanded and the foamable first resin 9*b*' inside the mold cavity expansion portion 90*a* is foamed (second expansion step). Now, in the second expansion step of present example 4, the volume of the mold cavity expansion portion 90*a* is not expanded until it attains a product volume in conjunction with the volume of the mold cavity 9*a*, and is kept to an expansion to less than the product volume. A mold-opening amount at this time is set to β' (β'<β).

Next, by a method similar to that in example 2, after completion of the first injection-filling step and after the start of the second expansion step (that is, in the middle of the second expansion step or after completion of the second expansion step), the inside of the outer layer first resin 9*b*' (sandwich molded portion 9*h*') is injection-filled with the foamable second resin 10*b*' forming the inner layer, from the second injection unit 18 (second injection-filling step). In this way, as shown in FIG. 7A, the second expansion step and the second injection-filling step are completed. In present example 4, FIG. 7A is a state corresponding to FIG. 3C of example 2.

Note that similarly to in example 2, injection-filling of the second resin 10*b*' by the second injection-filling step is performed in a fully-packed state, hence the inner layer second resin 10*b*' injection-filled inside the sandwich molded portion 9*h*' is in an unfoamed state at this stage. The sandwich molded product 9 (base layer 9*g*'+sandwich molded portion 9*h*') at the completion time of the second expansion step and the second injection-filling step is shown in FIG. 8A.

Next, as shown in FIG. 7B, after the start of the second injection-filling step (that is, in the middle of the second injection-filling step or after completion of the second injection-filling step), the foamable second resin 10*b*' inside the sandwich molded portion 9*h*' is foamed (third expansion step). This third expansion step is basically the same as the third expansion step in example 3, hence a detailed description thereof will be omitted. As shown in FIG. 8B, the sandwich molded portion 9*h*' during the third expansion step attains a state of being configured by: the skin layer 9*e*' formed on a contact surface with a design (mold inner surface) of the mold cavity expansion portion 90*a* and with the base layer 9*g*'; and a foam layer 10*f*' including foam cells. As described in example 2, in the second expansion step, this skin layer 9*e*' slightly increases its thickness to form the outer layer portion of the sandwich molded portion 9*h*' (unfoamed state), but can track the volume expansion of the mold cavity expansion portion 90*a* (volume expansion of the sandwich molded portion 9*h*') in the third expansion step. After completion of this third expansion step, the sandwich molded product 9' is molded by a step similar to that in example 3 (product cooling and solidification step). The sandwich molded product 9' after completion of this product cooling and solidification step is the same as that in FIG. 6C of example 3 read replacing the non-foamable first resin 9*b* by the skin layer 9*e*' configured from the foamable first resin 9*b*' (unfoamed state), hence illustration thereof is omitted.

The method of manufacturing according to example 4 enables the sandwich molded product 9' having different thicknesses of the outer layer on a fixed mold 2 side (base layer 9*g*'+outer layer portion of sandwich molded portion 9*h*') and the outer layer on a movable mold 4 side (outer layer portion of sandwich molded portion 9*h*') and whose inner layer is configured from the foam layer 10*f*' (second resin 10*b*'), to be molded successively by repeating the above steps.

In this way, the method of manufacturing according to example 4, not only, by adopting a foamable resin for the inner layer second resin and performing the third expansion step after the start of the second injection-filling step, makes it possible for thickness of the outer layer to be molded so as to differ respectively between the front surface and the rear surface of the sandwich molded product, but also, by adopting a foamable resin for the outer layer, makes it possible to achieve a further improvement in filling ratio of the inner layer second resin 10*b*' with respect to volume of the sandwich molded portion 9*h*'. Therefore, similarly to in example 3, in the case of adopting a foamable resin for the inner layer, the method of manufacturing according to example 4 is suitable when there is a requirement for a function of including a foam layer and for further weight reduction, and so on, over the sandwich molded product molded by the method of manufacturing according to example 3.

In the above-mentioned examples 1 to 4, in order to simplify description and illustration, the base layer 9*g* (9*g*') was assumed to be a flat plate type and the sandwich molded portion 9*h* (9*h*') was assumed to be stacked on the entirety of one surface of the base layer 9*g* (9*g*'), but the present invention is not limited to these configurations. For example, the base layer 9*g* (9*g*') may be of a certain shape including irregularities on at least one of sides of the fixed mold 2 side and the movable mold 4 side. Moreover, as shown in FIG. 9, the base layer 9*g* (9*g*') may be of a shape such that the base layer 9*g* (9*g*') becomes a partially thick outer layer of any one of surfaces of a front surface side and a rear surface side of the sandwich molded product, for example, an attaching region, or the like. In this way, the sandwich molded portion has no particular restrictions on arrangement or shape of the base layer, and by configuring the base layer as part of the outer layer of the sandwich molded product, it is possible for thickness of the outer layer to be molded so as to differ partially in an arbitrary way, not only between the outer side and the rear side of the sandwich molded product.

[Injection Molding Machine According to Second Embodiment]

Figure 12A:
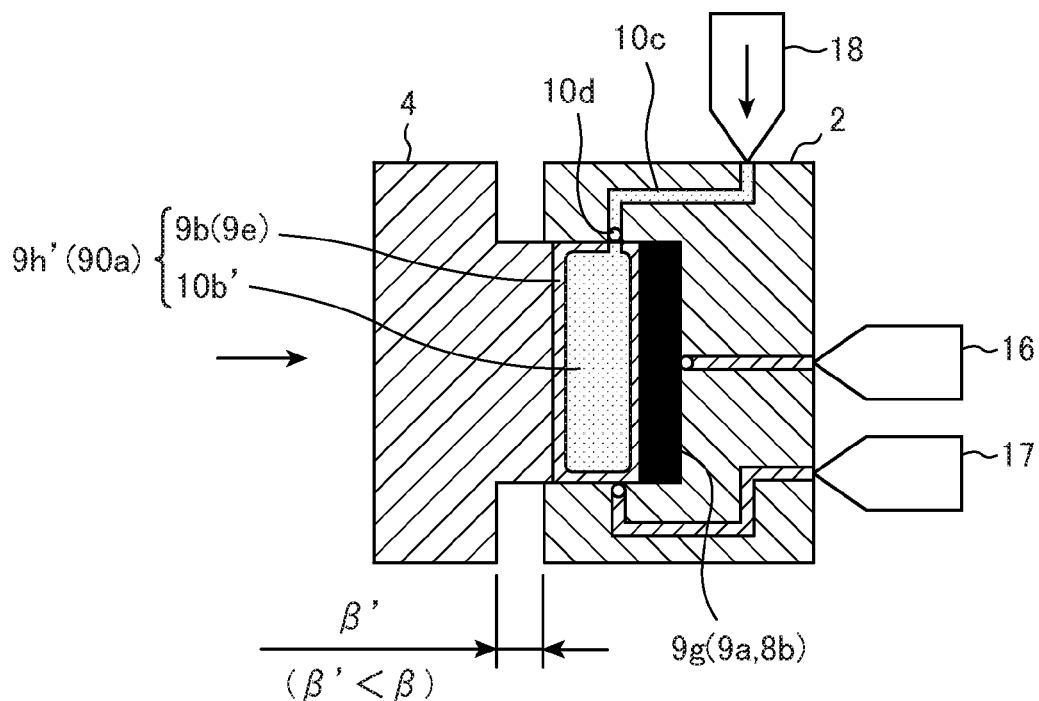
FIG. 12A is a schematic cross-sectional view showing a completion time of a second expansion step and a second injection-filling step, of manufacturing steps according to example 7 performed employing the injection molding machine according to the second embodiment.
Figure 12B:
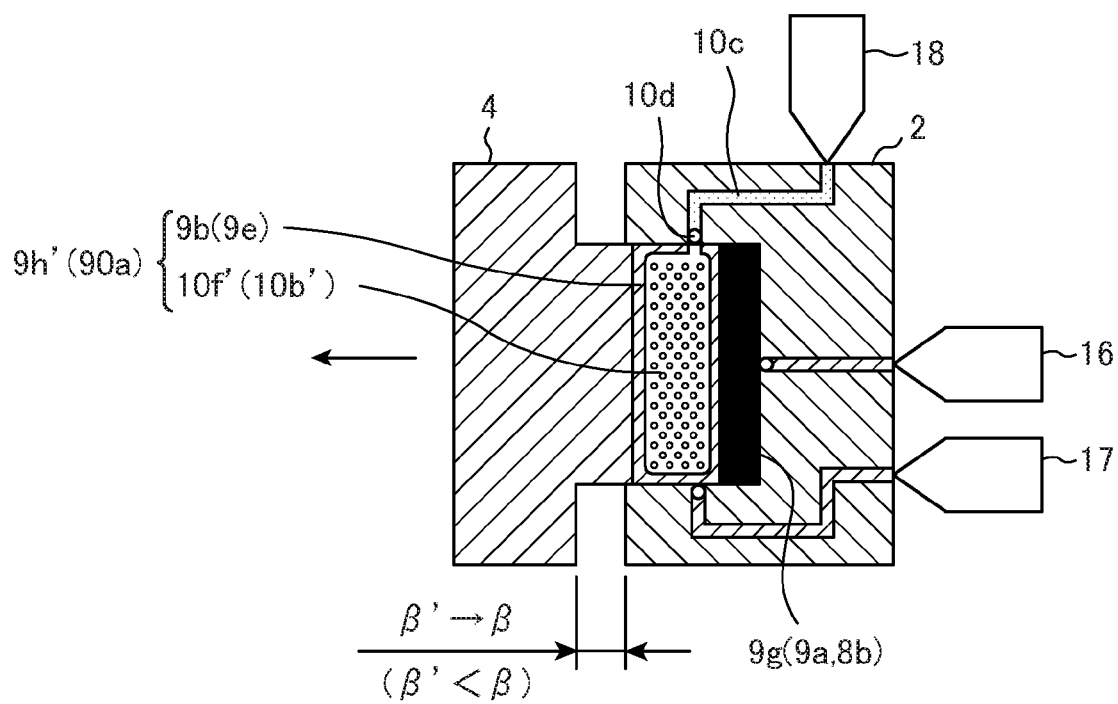
FIG. 12B is a schematic cross-sectional view showing a third expansion step of the manufacturing steps according to example 7.
Figure 13A:
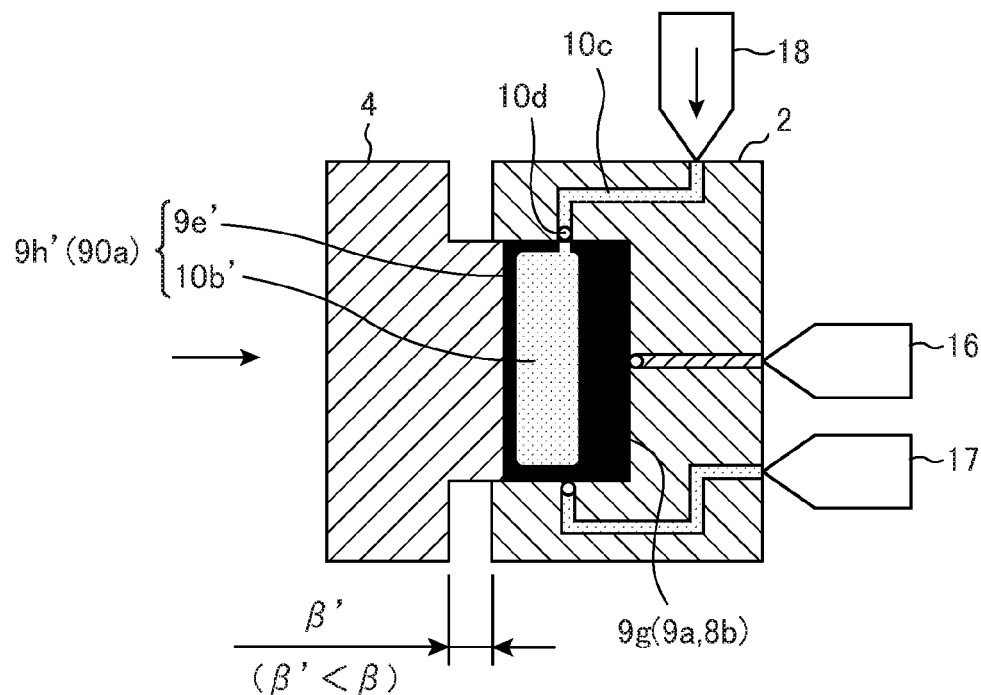
FIG. 13A is a schematic cross-sectional view showing a completion time of a second expansion step and a second injection-filling step, of manufacturing steps according to example 8 performed employing the injection molding machine according to the second embodiment.
Figure 13B:
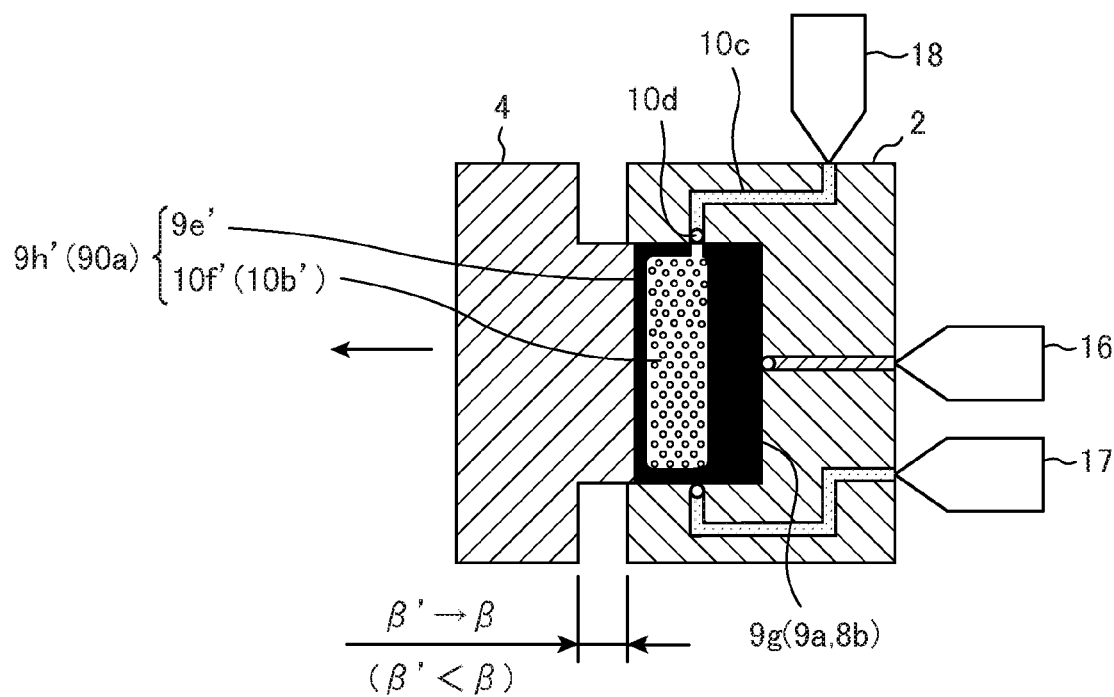
FIG. 13B is a schematic cross-sectional view showing a third expansion step of the manufacturing steps according to example 8.
Figure 14:
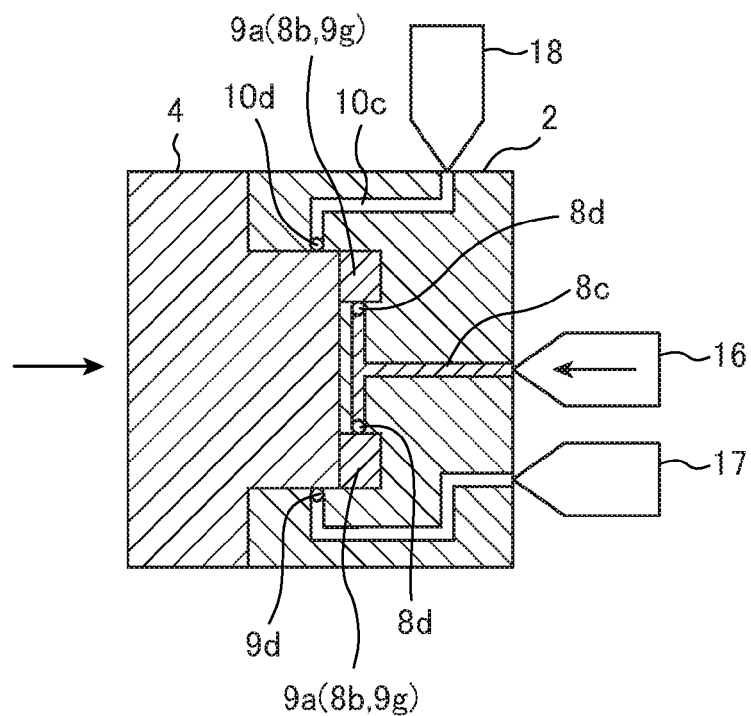
FIG. 14 is a schematic cross-sectional view showing an example of another mold usable in the injection molding machine according to the second embodiment.

Next, a method in which an injection molding machine according to a second embodiment is employed to manufacture a sandwich molded product will be described using FIGS. 10A to 13B. FIGS. 10A to 10F are views showing manufacturing steps according to example 5 performed employing the injection molding machine according to the second embodiment. FIGS. 11A to 11C are views showing manufacturing steps according to example 6 performed employing the injection molding machine according to the second embodiment. FIGS. 12A and 12B are views showing manufacturing steps according to example 7 performed employing the injection molding machine according to the second embodiment. FIGS. 13A and 13B are views showing manufacturing steps according to example 8 performed employing the injection molding machine according to the second embodiment. FIG. 14 is a view showing an example of another mold usable in the injection molding machine according to the second embodiment.

Note that in the description of the second embodiment, a mold cavity $9a$ is assumed to refer to a space formed between an inner surface of a fixed mold $2$ and an inner surface of a movable mold $4$ by the fixed mold $2$ and the movable mold $4$ being mold-clamped. Moreover, a mold cavity expansion portion $90a$ is assumed to refer to a space between an outer surface of a base layer $9g$ and the inner surface of the movable mold $4$ newly caused by the movable mold $4$ being mold-opened with respect to the fixed mold $2$. Furthermore, a sandwich molded portion $9h$ ($9h'$) is assumed to refer to a molded body molded inside the mold cavity expansion portion $90a$.

The injection molding machine according to the second embodiment is an injection molding machine for forming the base layer $9g$, an outer layer portion of the sandwich molded portion $9h$ ($9h'$), and an inner layer portion of the sandwich molded portion $9h$ ($9h'$) by same or different resins. Specifically, as shown in, for example, FIGS. 10A to 10F, the injection molding machine according to the second embodiment comprises: the fixed mold $2$ and movable mold $4$ capable of forming the mold cavity $9a$; a base layer injection unit $16$ capable of plasticizing (melting) a base layer resin $8b$ for forming the base layer to injection-fill the base layer resin $8b$ inside the mold cavity $9a$; a first injection unit $17$ capable of plasticizing a first resin $9b$ ($9b'$) for forming the outer layer portion to injection-fill the first resin $9b$ ($9b'$) inside the mold cavity expansion portion $90a$; and a second injection unit $18$ capable of plasticizing a second resin $10b$ ($10b'$) for forming the inner layer portion to injection-fill the second resin $10b$ ($10b'$) inside the mold cavity expansion portion $90a$.

Points in which the injection molding machine according to the second embodiment differs from the injection molding machine according to the first embodiment are that the injection unit for forming the base layer $9g$ and the injection unit for forming the outer layer portion of the sandwich molded portion $9h$ ($9h'$) are provided separately, and that due to this, configurations of resin channels of the fixed mold $2$ are different. Other configurations are shared with the injection molding machine of the first embodiment, hence descriptions thereof will be omitted.

Formed in the fixed mold $2$ of the injection molding machine of the second embodiment are: a base layer resin channel $8c$ in which the base layer resin $8b$ injected from the base layer injection unit $16$ flows toward the inside of the mold cavity $9a$; a first resin channel $9c$ in which the first resin $9b$ ($9b'$) injected from the first injection unit $17$ flows toward the inside of the mold cavity expansion portion $90a$; and a second resin channel $10c$ in which the second resin $10b$ ($10b'$) injected from the second injection unit $18$ flows toward the inside of the mold cavity expansion portion $90a$. Moreover, the fixed mold $2$ includes: a gate valve (resin shutoff release switching valve) $8d$ provided at a gate portion communicating with the inside of the mold cavity $9a$ of the base layer resin channel $8c$; a gate valve (resin shutoff release switching valve) $9d$ provided at a gate portion communicating with the inside of the mold cavity expansion portion $90a$ of the first resin channel $9c$; and a gate valve $10d$ provided at a gate portion communicating with the inside of the mold cavity expansion portion $90a$ of the second resin channel $10c$. Note that in the injection molding machine according to the second embodiment, the base layer resin channel $8c$, the first resin channel $9c$, and the second resin channel $10c$ are configured by a hot runner.

The base layer injection unit $16$ and the first injection unit $17$ are disposed in parallel on a rear surface side of the fixed mold $2$ so as to be parallel to a mold opening/closing direction. The second injection unit $18$ is disposed on a side surface side (upward side in FIG. 10A) of the fixed mold $2$ so as to orthogonally intersect the mold opening/closing direction. Note that an arrangement of the base layer injection unit $16$, the first injection unit $17$, and the second injection unit $18$ need only be an arrangement enabling resin to be injection-filled inside the mold cavity $9a$ or the mold cavity expansion portion $90a$, and is not limited to the arrangement illustrated. For example, a variety of arrangements of the base layer injection unit $16$, the first injection unit $17$, and the second injection unit $18$, such as a parallel type arrangement, a V-shaped type arrangement, a W-shaped type arrangement, an oblique type arrangement, an L-shaped type arrangement, and so on, may be adopted. Moreover, even in the case of commercially available retrofitting-type injection units, the arrangement may be a form in which those retrofitting-type injection units are added to a general purpose injection molding machine, provided that they enable a required injection-filling amount to be secured.

Method of Manufacturing According to Example 5

Figure 10A:
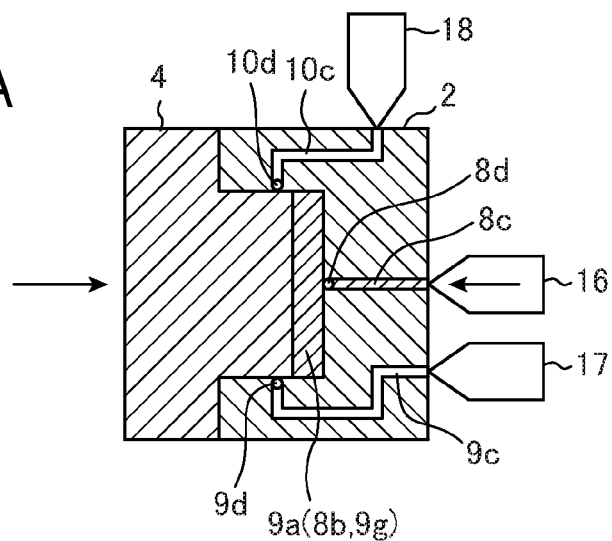
FIG. 10A is a schematic cross-sectional view showing a base layer molding step of manufacturing steps according to example 5 performed employing an injection molding machine according to a second embodiment of the present invention.
Figure 10B:
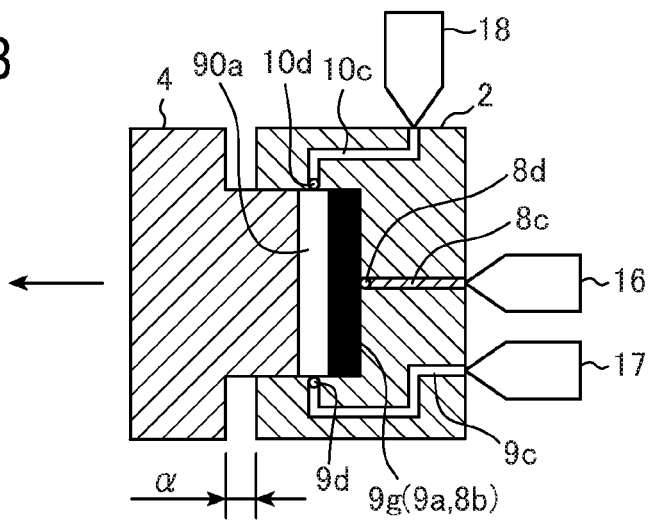
FIG. 10B is a schematic cross-sectional view showing a first expansion step of the manufacturing steps according to example 5.
Figure 10C:
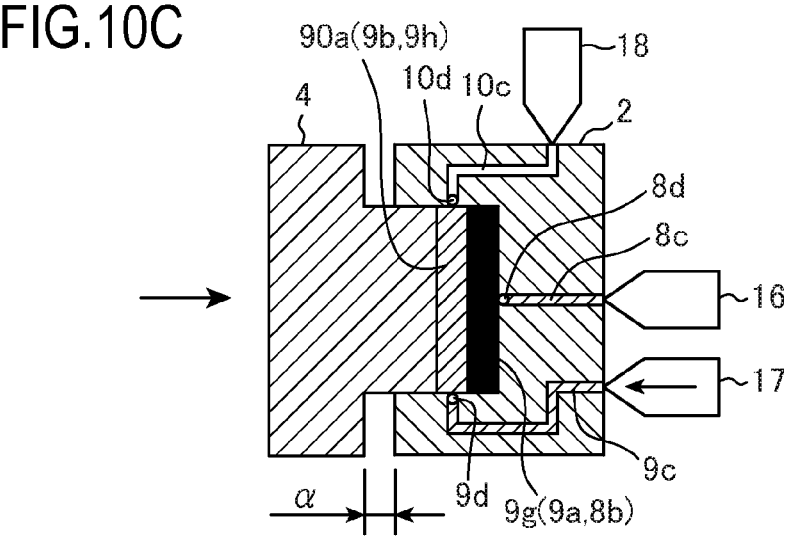
FIG. 10C is a schematic cross-sectional view showing a first injection-filling step of the manufacturing steps according to example 5.
Figure 10D:
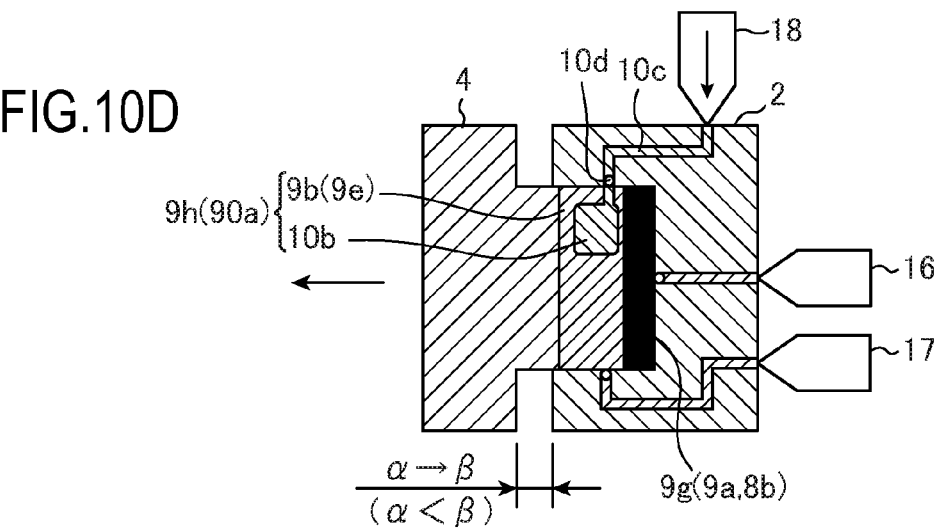
FIG. 10D is a schematic cross-sectional view showing a start time of a second expansion step and a second injection-filling step, of the manufacturing steps according to example 5.
Figure 10E:
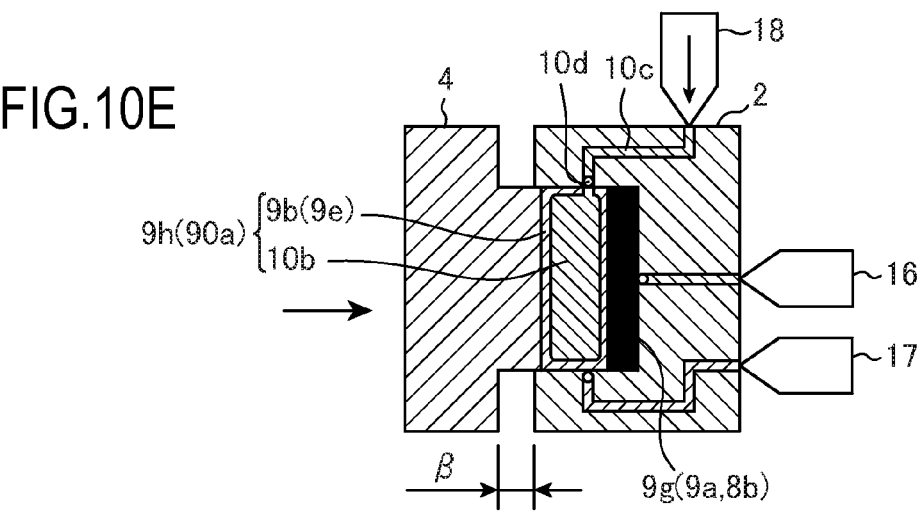
FIG. 10E is a schematic cross-sectional view showing a completion time of the second expansion step and the second injection-filling step, of the manufacturing steps according to example 5.
Figure 10F:
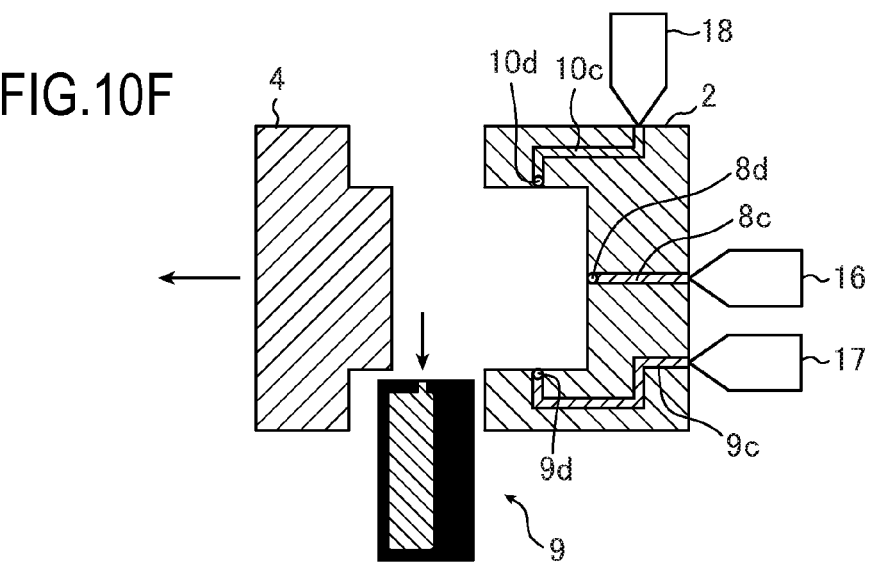
FIG. 10F is a schematic cross-sectional view showing a product removing step of the manufacturing steps according to example 5.

Next, a method of manufacturing according to example 5 performed employing the injection molding machine according to the second embodiment will be described using FIGS. 10A to 10F. FIGS. 10A to 10F are schematic cross-sectional views of a mold showing molding steps of the method of manufacturing (injection molding method) according to example 5. FIG. 10A shows a base layer molding step. FIG. 10B shows a first expansion step. FIG. 10C shows a first injection-filling step. FIG. 10D shows a start time of a second expansion step and a second injection-filling step. FIG. 10E shows a completion time of the second expansion step and the second injection-filling step. FIG. 10F shows a product removing step.

The method of manufacturing according to example 5 is, roughly, a method in which the base layer $9g$ is made of the non-foamable base layer resin $8b$, the outer layer portion of the sandwich molded portion $9h$ is made of the non-foamable first resin 9b, and the inner layer portion of the sandwich molded portion 9h is made of the non-foamable second resin 10b.

In the method of manufacturing according to example 5, first, as shown in FIG. 10A, the inside of the mold cavity 9a formed by mold-clamping the fixed mold 2 and the movable mold 4 is injection-filled with the base layer resin 8b to mold the base layer 9g (base layer molding step). Specifically, the movable mold 4 is mold-closed on the fixed mold 2 by a mold opening/closing mechanism not illustrated, and then a mold clamping force is applied. Next, in a state where the mold clamping force has been applied, the gate valve 8d provided in the base layer resin channel 8c is opened, and the mold cavity 9a is injection-filled with the non-foamable base layer resin 8b, from the base layer injection unit 16, via the base layer resin channel 8c. As it is, the base layer resin 8b inside the mold cavity 9a is cooled and solidified, and the base layer 9g is molded inside the mold cavity 9a. Preferably adopted as the base layer resin 8b is a resin that allows fusibility (adhesiveness) strength between the base layer resin 8b and the first resin 9b that will be the outer layer portion of the sandwich molded portion 9h, to be sufficiently obtained. Molding of the base layer 9g by the base layer molding step is performed in a so-called fully-packed state where the inside of the mold cavity 9a is substantially 100% filled by the base layer resin 8b. Note that molding of the base layer 9g by the base layer molding step is due to a general injection molding method, hence a detailed description thereof will be omitted.

As shown in FIG. 10B, after the base layer molding step, the movable mold 4 is mold-opened from the fixed mold 2 by an extent of a distance α by the mold opening/closing mechanism not illustrated, and the mold cavity expansion portion 90a (certain space) is formed between the outer surface of the base layer 9g held on a fixed mold 2 side and the inner surface of the movable mold 4 (first expansion step). In this first expansion step, the gate valve 9d provided in the first resin channel 9c and the gate valve 10d provided in the second resin channel 10c attain a state of being openable to the inside of the mold cavity expansion portion 90a.

Note that in present example 5, it has been assumed that after the base layer molding step, the first expansion step is performed in a state where the base layer 9g is held to the fixed mold 2, but the first expansion step may be performed in a state where the base layer 9g is held to the movable mold 4. In this case, the mold cavity expansion portion 90a gets formed between the outer surface of the base layer 9g held on a movable mold 4 side and the inner surface of the fixed mold 2. Moreover, in this case, the gate valve 9d provided in the first resin channel 9c and the gate valve 10d provided in the second resin channel 10c are disposed capable of opening to the inside of the mold cavity expansion portion 90a. In addition, if these gate valves are disposed at an overlap position of the mold cavity 9a and the mold cavity expansion portion 90a, then during injection-filling of the base layer resin 8b to the inside of the mold cavity 9a in the base layer molding step, these gate valves are closed and a back flow of the base layer resin 8b to each of the resin channels is prevented.

As shown in FIG. 10C, after the first expansion step, the gate valve 9d provided in the first resin channel 9c is opened, and the inside of the mold cavity expansion portion 90a is injection-filled with the first resin 9b, from the first injection unit 17, via the first resin channel 9c (first injection-filling step). This first injection-filling step is similar to the first injection-filling step described in the method of manufacturing according to example 1, hence a detailed description thereof will be omitted.

The second expansion step, second injection-filling step, and product cooling and solidification step shown in FIGS. 10D to 10E, and the product removing step shown in FIG. 10F are executed after the first injection-filling step, whereby a sandwich molded product 9 is molded. Note that the second expansion step, second injection-filling step, product cooling and solidification step, and product removing step are executed by similar methods to those of the second expansion step, second injection-filling step, product cooling and solidification step, and product removing step described in the method of manufacturing according to example 1, hence descriptions thereof will be omitted.

The method of manufacturing according to example 5 enables the sandwich molded product 9 having different thicknesses of the outer layer on a fixed mold 2 side (base layer 9g+outer layer portion of sandwich molded portion 9h) and the outer layer on a movable mold 4 side (outer layer portion of sandwich molded portion 9h), to be molded successively by repeating the above steps. In addition, the method of manufacturing according to example 5, similarly to the method of manufacturing according to example 1, makes it possible to achieve an improvement in filling ratio of the inner layer second resin with respect to volume of the sandwich molded portion, hence is suitable for controlling the outer layer to be thin. Furthermore, the method of manufacturing according to example 5, similarly to the method of manufacturing according to example 1, has injection-filling in the base layer molding step, the first injection-filling step, and the second injection-filling step performed in a fully-packed state, hence makes it possible for a high transferability to be secured and for occurrence of a resin inversion defect to be prevented. Further still, in the method of manufacturing according to example 5, similarly to in the method of manufacturing according to example 1, there is no need for the likes of a mixing nozzle, or a special gate structure or gate valve, and so on, for the second resin 10b, hence there are few restrictions on arrangement of these gate portions or resin channels communicating with the gate portions, and design of the mold is made easy.

Furthermore, the method of manufacturing according to example 5 makes it possible for the outer layer of the sandwich molded product 9 to be formed by different resins. As a result, it becomes possible for the outer layer configured from the base layer 9g and the outer layer portion of the sandwich molded portion 9h to be given a different property. That is, the method of manufacturing according to example 5 makes it possible to employ a soft resin material as a resin material on a side configuring a design surface of the outer layer (for example, the first resin 9b molding the outer layer portion of the sandwich molded portion 9h) and thereby provide a soft feeling to the design surface, and makes it possible to employ a comparatively hard resin material as a resin material on a side configuring a non-design surface of the outer layer (for example, the base layer resin 8b molding the base layer 9g) and thereby secure a required attachment strength while suppressing thickening of the outer layer on a non-design surface side. Moreover, by configuring the first resin 9b and the base layer resin 8b by resins of different colors, it becomes possible to mold a sandwich molded product whose outside and rear are differently-colored, or, as shown in FIG. 14, a sandwich molded product whose surfaces on any of the outside and rear are partially differently-colored. Furthermore, configuring the first resin 9b and the base layer resin 8b by resins having different functions enables molding of a sandwich molded product in which only a part of the outer layer is provided with various kinds of functions such as a non-slip function or anti-static function, for example.

Method of Manufacturing According to Example 6

Next, a method of manufacturing according to example 6 performed employing the injection molding machine according to the second embodiment will be described using FIGS. 11A to 11C. FIGS. 11A to 11C are schematic cross-sectional views of a mold showing a second expansion step and a second injection-filling step of the method of manufacturing (injection molding method) according to example 6. FIG. 11A shows the second expansion step. FIG. 11B shows a start time of the second injection-filling step. FIG. 11C shows a completion time of the second injection-filling step.

The method of manufacturing according to example 6 is, roughly, a method in which the base layer $9g$ is made of the non-foamable base layer resin $8b$, the outer layer portion of the sandwich molded portion $9h'$ is made of the foamable first resin $9b'$, and the inner layer portion of the sandwich molded portion $9h'$ is made of the non-foamable second resin $10b$.

Points in which the method of manufacturing according to example 6 differs from the method of manufacturing according to example 5 are that the first resin is a foamable resin, and that due to this, an implementation timing of the second expansion step and the second injection-filling step are slightly different. Besides these points, the method of manufacturing according to example 6 is basically the same as the method of manufacturing according to example 5, hence a detailed description thereof will be omitted. Moreover, the second expansion step and the second injection-filling step are basically the same as those in the method of manufacturing according to example 2, hence a detailed description thereof will be omitted. Note that objects distinguished from those in the description of example 5 due to this difference between the non-foamable first resin $9b$ and the foamable first resin $9b'$ are assumed to be distinguished by assigning ' (an apostrophe) to the same reference symbol as in example 5.

In the method of manufacturing according to example 6, first, a base layer molding step is performed and the base layer $9g$ is molded inside the mold cavity $9a$, by a method similar to in the method of manufacturing according to example 5. Moreover, by methods similar to those in example 5, a first expansion step is performed and the mold cavity expansion portion $90a$ is formed between the base layer $9g$ held on the fixed mold 2 side and the movable mold 4. Then, the inside of the mold cavity expansion portion $90a$ is injection-filled with the foamable first resin $9b'$, from the first injection unit 17 (first injection-filling step). Descriptions and illustration of these steps will be omitted.

Then, in the method of manufacturing according to example 6, the second expansion step shown in FIG. 11A, the second injection-filling step and a product cooling and solidification step shown in FIGS. 11B and 11C, and a product removing step not illustrated are executed after the start of the first injection-filling step (that is, in the middle of the first injection-filling step or after completion of the first injection-filling step), whereby a sandwich molded product $9'$ is molded. Note that the second expansion step, second injection-filling step, product cooling and solidification step, and product removing step are executed by similar methods to those of the second expansion step, second injection-filling step, product cooling and solidification step, and product removing step described in the method of manufacturing according to example 2, hence descriptions thereof will be omitted.

The method of manufacturing according to example 6 enables the sandwich molded product $9'$ having different thicknesses of the outer layer on a fixed mold 2 side (base layer $9g$+outer layer portion of sandwich molded portion $9h'$) and the outer layer on a movable mold 4 side (outer layer portion of sandwich molded portion $9h'$), to be molded successively by repeating the above steps.

Moreover, the method of manufacturing according to example 6, similarly to the method of manufacturing according to example 2, makes it possible to achieve a further improvement in filling ratio of the inner layer second resin $10b$ with respect to volume of the sandwich molded portion $9h'$ while preventing a resin inversion defect due to the inner layer second resin $10b$, hence is even more suitable for controlling the outer layer to be thin. Moreover, not only can thickness of the outer layer be molded so as to differ respectively between the front surface and the rear surface of the sandwich molded product, but it is also possible for thicknesses of each of the outer layers to be controlled with a certain precision.

Method of Manufacturing According to Example 7

Next, a method of manufacturing according to example 7 performed employing the injection molding machine according to the second embodiment will be described using FIGS. 12A and 12B. FIGS. 12A and 12B are schematic cross-sectional views of a mold showing a second expansion step, a second injection-filling step, and a third expansion step of the method of manufacturing (injection molding method) according to example 7. FIG. 12A shows a completion time of the second expansion step and the second injection-filling step. FIG. 12B shows the third expansion step.

The method of manufacturing according to example 7 is, roughly, a method in which the base layer $9g$ is made of the non-foamable base layer resin $8b$, the outer layer portion of the sandwich molded portion $9h'$ is made of the non-foamable first resin $9b$, and the inner layer portion of the sandwich molded portion $9h'$ is made of the foamable second resin $10b'$.

Points in which the method of manufacturing according to example 7 differs from the method of manufacturing according to example 5 are that the second resin is a foamable resin, and that due to this, the method of manufacturing according to example 7 comprises the third expansion step in which, after the start of the second injection-filling step, the mold cavity expansion portion is caused to further expand to an extent of a specified quantity. Besides these points, the method of manufacturing according to example 7 is basically the same as the method of manufacturing according to example 5, hence a detailed description thereof will be omitted. Moreover, the second expansion step, the second injection-filling step, and the third expansion step are basically the same as those in the method of manufacturing according to example 3, hence a detailed description thereof will be omitted. Note that objects distinguished from those in the description of example 5 due to this difference between the non-foamable second resin $10b$ and the foamable second resin $10b'$ are assumed to be distinguished by assigning ' (an apostrophe) to the same reference symbol as in example 5.

In the method of manufacturing according to example 7, first, a base layer molding step is performed and the base layer 9g is molded inside the mold cavity 9a, by a method similar to in the method of manufacturing according to example 5. Moreover, by methods similar to those in example 5, a first expansion step and a first injection-filling step are performed, the mold cavity expansion portion 90a is formed between the base layer 9g held on the fixed mold 2 side and the movable mold 4, and the inside of the mold cavity expansion portion 90a is injection-filled with the non-foamable first resin 9b, from the first injection unit 17 (first injection-filling step). Descriptions and illustration of these steps will be omitted.

Then, in the method of manufacturing according to example 7, the second expansion step and second injection-filling step shown in FIG. 12A, the third expansion step shown in FIG. 12B, and a product cooling and solidification step and product removing step not illustrated are executed after completion of the first injection-filling step, whereby a sandwich molded product 9' is molded. Note that the second expansion step, second injection-filling step, third expansion step, product cooling and solidification step, and product removing step are executed by similar methods to those of the second expansion step, second injection-filling step, third expansion step, product cooling and solidification step, and product removing step described in the method of manufacturing according to example 3, hence descriptions thereof will be omitted.

The method of manufacturing according to example 7 enables the sandwich molded product 9' having different thicknesses of the outer layer on a fixed mold 2 side (base layer 9g+outer layer portion of sandwich molded portion 9h') and the outer layer on a movable mold 4 side (outer layer portion of sandwich molded portion 9h') and whose inner layer is configured from the foam layer 10f' (second resin 10b'), to be molded successively by repeating the above steps.

Moreover, the method of manufacturing according to example 7, similarly to the method of manufacturing according to example 3, makes it possible not only for thickness of the outer layer to be molded so as to differ respectively between the front surface and the rear surface of the sandwich molded product, but also for the inner layer to be configured as a foam layer.

Method of Manufacturing According to Example 8

Next, a method of manufacturing according to example 8 performed employing the injection molding machine according to the second embodiment will be described using FIGS. 13A and 13B. FIGS. 13A and 13B are schematic cross-sectional views of a mold showing a second expansion step, a second injection-filling step, and a third expansion step of the method of manufacturing (injection molding method) according to example 8. FIG. 13A shows a completion time of the second expansion step and the second injection-filling step. FIG. 13B shows the third expansion step.

The method of manufacturing according to example 8 is, roughly, a method in which the base layer 9g is made of the non-foamable base layer resin 8b, the outer layer portion of the sandwich molded portion 9h' is made of the foamable first resin 9b', and the inner layer portion of the sandwich molded portion 9h' is made of the foamable second resin 10b'.

Points in which the method of manufacturing according to example 8 differs from the method of manufacturing according to example 5 are that the first resin and the second resin are both a foamable resin, and that due to this, the method of manufacturing according to example 8 comprises the third expansion step in which, after the start of the second injection-filling step, the mold cavity expansion portion is caused to further expand to an extent of a specified quantity. Besides these points, the method of manufacturing according to example 8 is basically the same as the method of manufacturing according to example 5, hence a detailed description thereof will be omitted. Moreover, the first injection-filling step, the second expansion step, the second injection-filling step, and the third expansion step are basically the same as those in the method of manufacturing according to example 4, hence a detailed description thereof will be omitted. Note that objects distinguished from those in the description of example 5 due to this difference between the non-foamable first resin 9b and second resin 10b and the foamable first resin 9b' and second resin 10b' are assumed to be distinguished by assigning ' (an apostrophe) to the same reference symbol as in example 5.

In the method of manufacturing according to example 8, first, a base layer molding step is performed and the base layer 9g is molded inside the mold cavity 9a, by a method similar to in the method of manufacturing according to example 5. Moreover, by methods similar to those in example 5, a first expansion step is performed and the mold cavity expansion portion 90a is formed between the base layer 9g held on the fixed mold 2 side and the movable mold 4. Then, the inside of the mold cavity expansion portion 90a is injection-filled with the foamable first resin 9b', from the first injection unit 17 (first injection-filling step). Descriptions and illustration of these steps will be omitted.

Then, in the method of manufacturing according to example 8, the second expansion step and second injection-filling step shown in FIG. 13A, the third expansion step shown in FIG. 13B, and a product cooling and solidification step and product removing step not illustrated are executed after the start of the first injection-filling step (that is, in the middle of the first injection-filling step or after completion of the first injection-filling step), whereby a sandwich molded product 9' is molded. Note that the first injection-filling step, second expansion step, second injection-filling step, third expansion step, product cooling and solidification step, and product removing step are executed by similar methods to those of the first injection-filling step, second expansion step, second injection-filling step, third expansion step, product cooling and solidification step, and product removing step described in the method of manufacturing according to example 4, hence descriptions thereof will be omitted.

The method of manufacturing according to example 8 enables the sandwich molded product 9' having different thicknesses of the outer layer on a fixed mold 2 side (base layer 9g+outer layer portion of sandwich molded portion 9h') and the outer layer on a movable mold 4 side (outer layer portion of sandwich molded portion 9h') and whose inner layer is configured from the foam layer 10f' (second resin 10b'), to be molded successively by repeating the above steps.

Moreover, the method of manufacturing according to example 8, similarly to the method of manufacturing according to example 4, not only makes it possible for thickness of the outer layer to be molded so as to differ respectively between the front surface and the rear surface of the sandwich molded product, but also, by adopting a foamable resin for the outer layer, makes it possible to achieve a further improvement in filling ratio of the inner layer second resin 10b' with respect to volume of the sandwich molded portion 9h'.

In the above-mentioned examples 5 to 8, in order to simplify description and illustration, the base layer 9g was assumed to be a flat plate type and the sandwich molded portion 9h (9h') was assumed to be stacked on the entirety of one surface of the base layer 9g, but the present invention is not limited to these configurations. For example, the base layer 9g may be of a certain shape including irregularities on at least one of sides of the fixed mold 2 side and the movable mold 4 side. Moreover, as shown in FIG. 14, the base layer 9g may be of a shape such that the base layer 9g becomes a partially thick outer layer of any one of surfaces of a front surface side and a rear surface side of the sandwich molded product, for example, an attaching region, or the like. In this way, the sandwich molded portion has no particular restrictions on arrangement or shape of the base layer, and by configuring the base layer as part of the outer layer of the sandwich molded product, it is possible for thickness of the outer layer to be molded so as to differ partially in an arbitrary way, not only between the outer side and the rear side of the sandwich molded product.

[Injection Molding Machine According to Third Embodiment]

Figure 15:
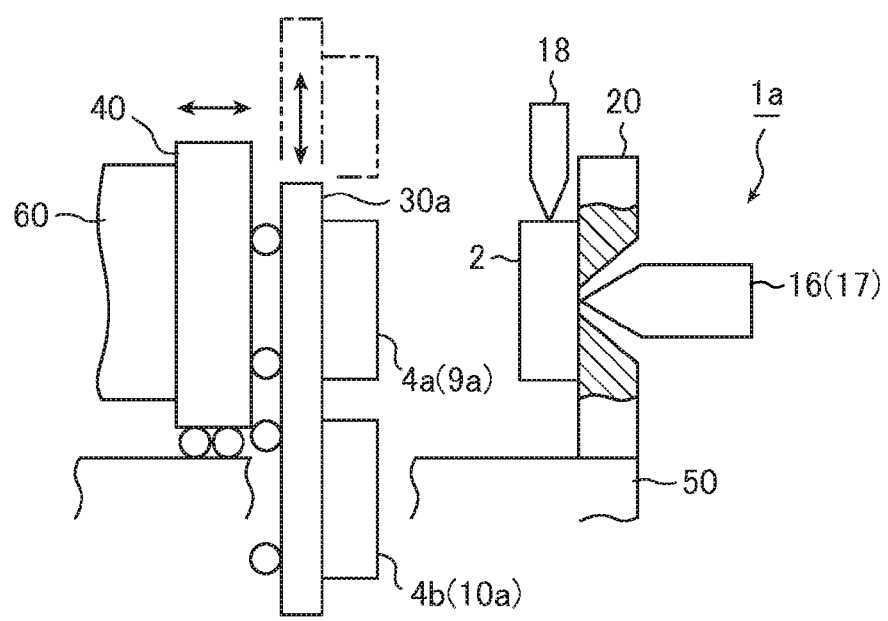
FIG. 15 is a schematic side view showing an injection molding machine according to a third embodiment of the present invention.
Figure 16A:
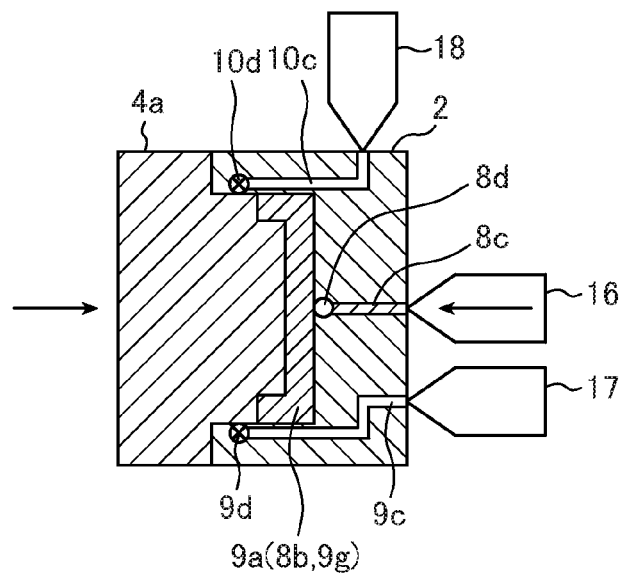
FIG. 16A is a schematic cross-sectional view showing a base layer molding step of manufacturing steps according to example 9 performed employing the injection molding machine according to the third embodiment of the present invention.
Figure 16B:
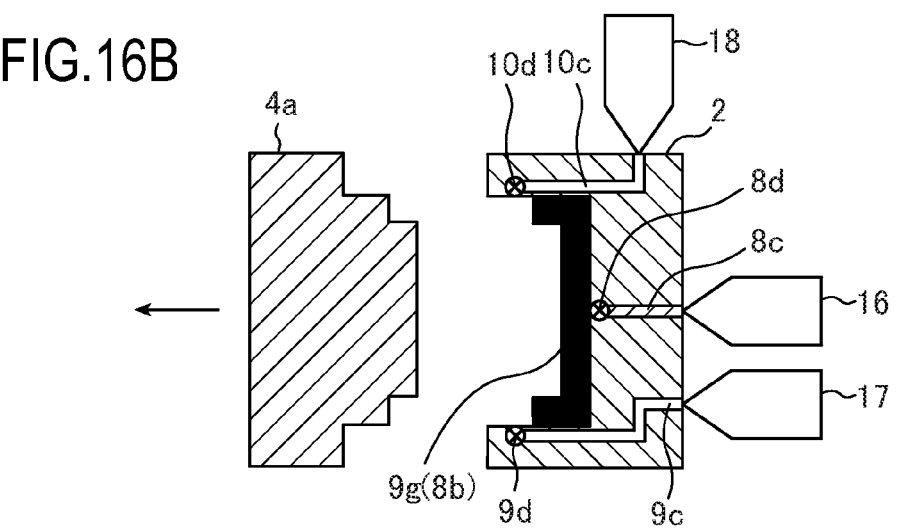
FIG. 16B is a schematic cross-sectional view showing a state where a first movable mold has been mold-opened from a fixed mold, in a mold moving step of the manufacturing steps according to example 9.
Figure 16C:
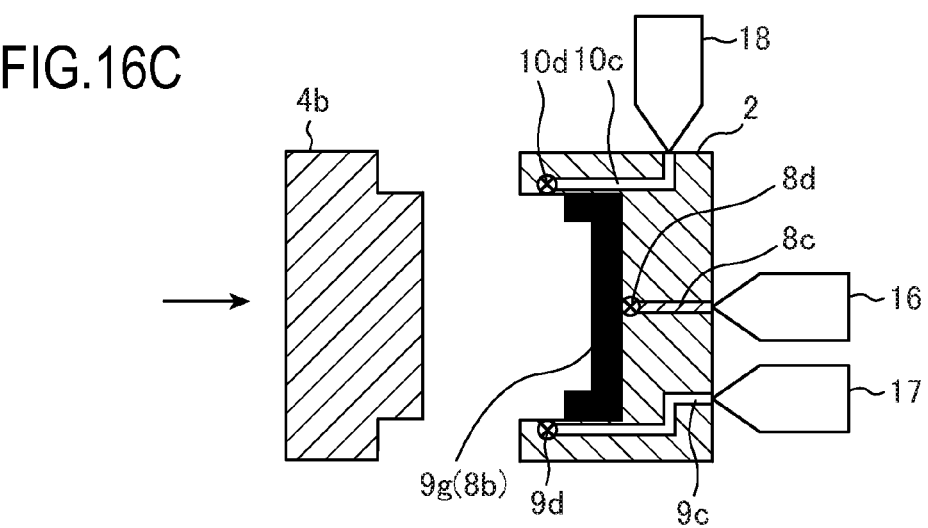
FIG. 16C is a schematic cross-sectional view showing a state where a second movable mold has been moved to a position facing the fixed mold, in the mold moving step of the manufacturing steps according to example 9.
Figure 16D:
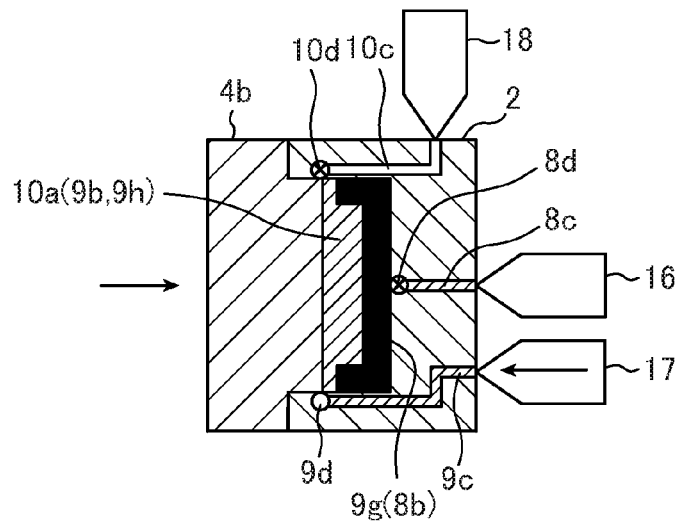
FIG. 16D is a schematic cross-sectional view showing a first injection-filling step after the fixed mold and the second movable mold have been mold-closed, of the manufacturing steps according to example 9.
Figure 16E:
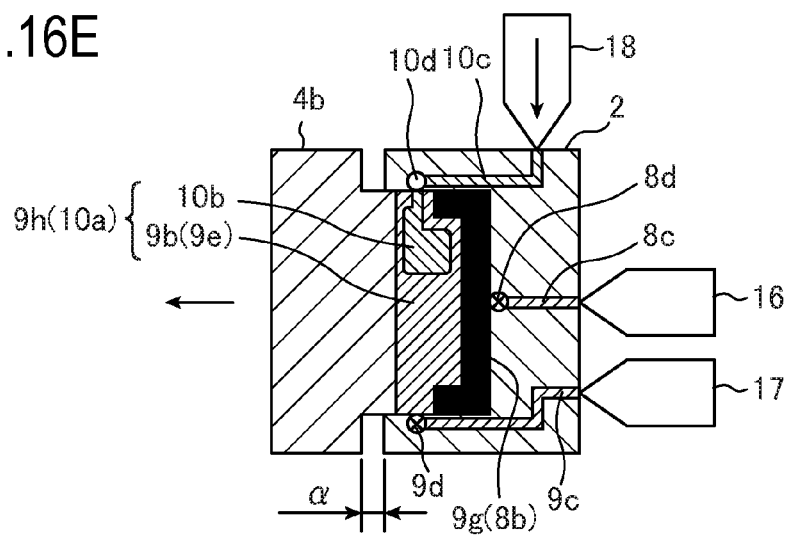
FIG. 16E is a schematic cross-sectional view showing a start time of a second expansion step and a second injection-filling step, of the manufacturing steps according to example 9.
Figure 16F:
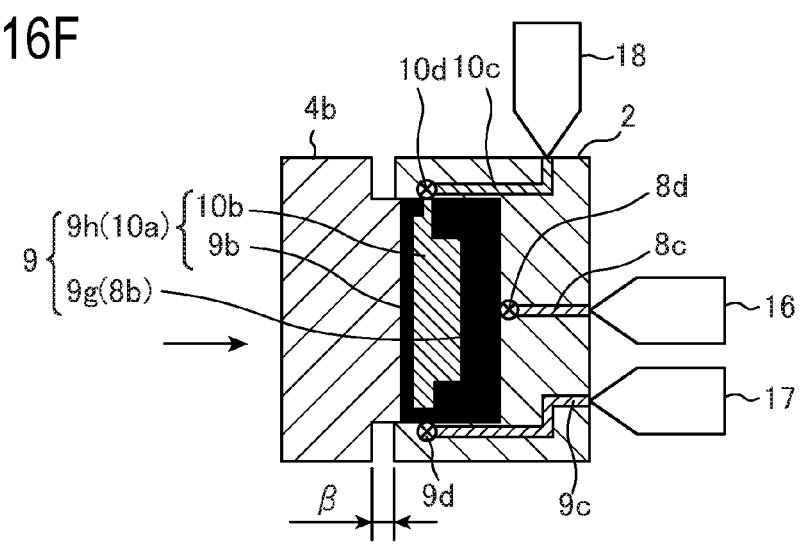
FIG. 16F is a schematic cross-sectional view showing a completion time of the second expansion step and the second injection-filling step, of the manufacturing steps according to example 9.
Figure 17A:
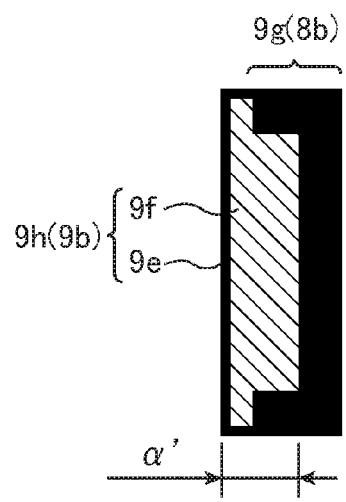
FIG. 17A is a schematic cross-sectional view showing a state of a sandwich molded product after completion of the first injection-filling step.
Figure 17B:
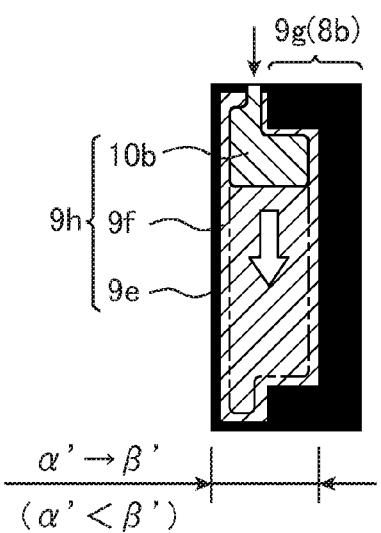
FIG. 17B is a schematic cross-sectional view showing a state of the sandwich molded product at the start time of the second expansion step and the second injection-filling step.
Figure 17C:
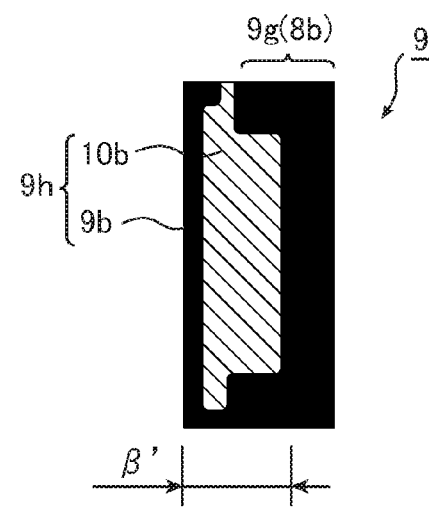
FIG. 17C is a schematic cross-sectional view showing a state of the sandwich molded product after completion of a product cooling step.
Figure 18A:
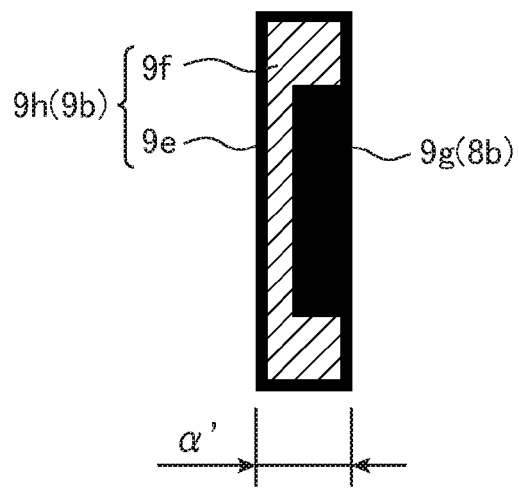
FIG. 18A is a schematic cross-sectional view showing a state of another sandwich molded product after completion of the first injection-filling step.
Figure 18B:
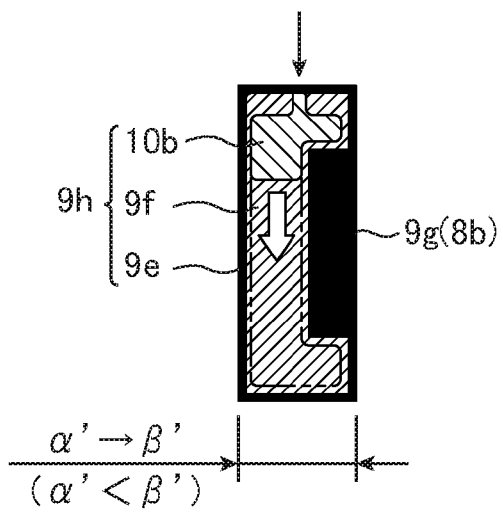
FIG. 18B is a schematic cross-sectional view showing a state of the other sandwich molded product at the start time of the second expansion step and the second injection-filling step.
Figure 18C:
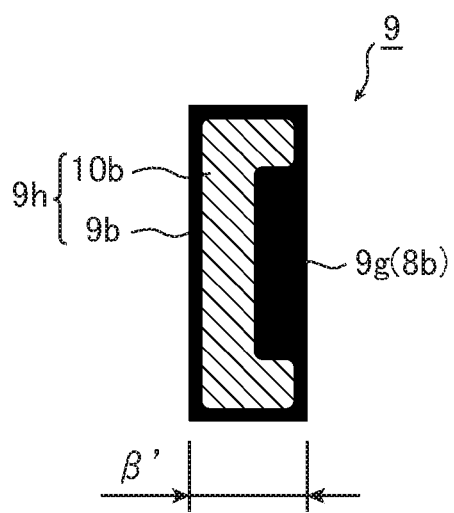
FIG. 18C is a schematic cross-sectional view showing a state of the other sandwich molded product after completion of the product cooling step.

Next, a method in which an injection molding machine according to a third embodiment is employed to manufacture a sandwich molded product will be described using FIGS. 15 to 24B. FIG. 15 is a schematic side view showing the injection molding machine according to the third embodiment. FIGS. 16A to 17C are views showing manufacturing steps according to example 9 performed employing the injection molding machine according to the third embodiment. FIGS. 18A to 18C are views showing another sandwich molded product capable of being molded by the manufacturing steps according to example 9. FIGS. 19A to 20E are views showing manufacturing steps according to example 10 performed employing the injection molding machine according to the third embodiment. FIGS. 21A to 22C are views showing manufacturing steps according to example 11 performed employing the injection molding machine according to the third embodiment. FIGS. 23A to 24B are views showing manufacturing steps according to example 12 performed employing the injection molding machine according to the third embodiment.

Note that in the description of the third embodiment, a first mold cavity 9a is assumed to refer to a space formed between an inner surface of a fixed mold 2 and an inner surface of a first movable mold 4a by the fixed mold 2 and the first movable mold 4a being mold-clamped. Moreover, a second mold cavity 10a is assumed to refer to a space formed between the inner surface of the fixed mold 2 and an inner surface of a second movable mold 4b by the fixed mold 2 and the second movable mold 4b being mold-clamped. Furthermore, a mold cavity expansion portion is assumed to refer to a space formed between an outer surface of a base layer 9g and the inner surface of the second movable mold 4b, of the second mold cavity 10a. Further still, a sandwich molded portion 9h (9h') is assumed to refer to a molded body molded inside the mold cavity expansion portion.

The injection molding machine according to the third embodiment is an injection molding machine for forming the base layer 9g, an outer layer portion of the sandwich molded portion 9h (9h'), and an inner layer portion of the sandwich molded portion 9h (9h') by same or different resins. Specifically, as shown in, for example, FIGS. 15 and 16A to 16F, an injection molding machine 1a according to the third embodiment comprises: a fixed platen 20 capable of having the fixed mold 2 attached thereto; a movable platen 40 capable of having the first movable mold 4a and the second movable mold 4b attached thereto and provided capable of moving closer to or moving away from the fixed platen 20 along a mold opening/closing direction; a mold opening/closing mechanism 60 that causes the movable platen 40 to move in the mold opening/closing direction; a base layer injection unit 16 capable of plasticizing (melting) a base layer resin 8b for forming the base layer to injection-fill the base layer resin 8b inside the first mold cavity 9a formed by the fixed mold 2 and the first movable mold 4a; a first injection unit 17 capable of plasticizing a first resin 9b (9b') for forming the outer layer portion to injection-fill the first resin 9b (9b') inside the second mold cavity 10a (mold cavity expansion portion) formed by the fixed mold 2 and the second movable mold 4b; and a second injection unit 18 capable of plasticizing a second resin 10b (10b') for forming the inner layer portion to injection-fill the second resin 10b (10b') inside the second mold cavity 10a (mold cavity expansion portion).

The fixed platen 20 is fixed on a base 50 of the injection molding machine 1a. The fixed mold 2 is attached to substantially the center of a mold attaching surface (left side surface in FIG. 15) of the fixed platen 20. Formed in the fixed platen 20 is an insertion hole into which the base layer injection unit 16 and the first injection unit 17 can be inserted from a rear surface (right side surface in FIG. 15) through the mold attaching surface.

Formed in the fixed mold 2 are a base layer resin channel 8c, a first resin channel 9c, and a second resin channel 10c in which resins injected from the base layer injection unit 16, the first injection unit 17, and the second injection unit 18 are caused to flow. Moreover, provided respectively in each of the resin channels 8c, 9c, and 10c are gate valves 8d, 9d, and 10d that open or shut off the channels. These resin channels 8c, 9c, and 10c and gate valves 8d, 9d, and 10d are similar to the base layer resin channel 8c, first resin channel 9c, and second resin channel 10c, and the gate valves 8d, 9d, and 10d of the injection molding machine according to the second embodiment, hence descriptions thereof will be omitted.

The movable platen 40 is mounted on the base 50 of the injection molding machine 1a in a state of being movable in the mold opening/closing direction. Attached to the movable platen 40 is a mold sliding means 30a slidable in a direction orthogonal to the mold opening/closing direction. Moreover, the first movable mold 4a and the second movable mold 4b are attached to the movable platen 40 via the mold sliding means 30a.

The mold sliding means 30a includes a mold attaching surface that faces the mold attaching surface of the fixed platen 20, and the first movable mold 4a and the second movable mold 4b are attached on said mold attaching surface with a certain spacing in the direction orthogonal to the mold opening/closing direction. The mold sliding means 30a is configured to slide in the direction orthogonal to the mold opening/closing direction with respect to the movable platen 40, thereby causing the first movable mold 4a and the second movable mold 4b to move in the direction orthogonal to the mold opening/closing direction. Specifically, the mold sliding means 30a is configured to be movable in the direction orthogonal to the mold opening/closing direction at least between a first slide position where the first movable mold 4a faces the fixed mold 2 and a second slide position where the second movable mold 4b faces the fixed mold 2.

The first movable mold 4a is configured capable of forming between itself and the fixed mold 2 the first mold cavity 9a for molding the base layer 9g. The second movable mold 4b is configured capable of forming between itself and the fixed mold 2 the second mold cavity 10a whose volume is larger than that of the first mold cavity 9a. That is, the second movable mold 4b is configured capable of forming between the outer surface of the base layer 9g and the inner surface of the second movable mold 4b the mold cavity expansion portion for molding the sandwich molded portion 9h (9h'), when the second movable mold 4b is paired with (combined with) the fixed mold 2 holding the base layer 9g. These first movable mold 4a and second movable mold 4b are configured to be arbitrarily paired with the fixed mold 2 by the mold opening/closing mechanism 60 and the mold sliding means 30a to respectively form the first mold cavity 9a or the second mold cavity 10a.

The fixed mold 2 and the first movable mold 4a and second movable mold 4b paired therewith each have a dividing surface (sometimes also referred to as a mold dividing surface, a parting surface, and a cut surface) of the mold which has a share edge structure, and are configured such that volume of the mold cavity can be varied by a mold opening/closing operation by the mold opening/closing mechanism of the injection molding machine. Note that even in the case of a mold that is not a mold having a share edge structure and includes a general butting-type mold dividing surface, the molten resin injection-filled inside the mold cavity can be prevented from leaking to the outside of the mold, even if the mold is mold-opened to a specified quantity. However, in order to simplify description, the present embodiment is described assuming the mold to be a mold having a share edge structure.

Configuration and arrangement of the base layer injection unit 16, the first injection unit 17, and the second injection unit 18 are similar to those of the base layer injection unit 16, the first injection unit 17, and the second injection unit 18 according to the second embodiment, hence descriptions thereof will be omitted.

The illustrated example adopts a form in which the first movable mold 4a and the second movable mold 4b are moved in an up-and-down direction (vertical direction) orthogonal to the mold opening/closing direction. However, the present invention is not limited to this form, and it is also possible to adopt a form in which the first movable mold 4a and the second movable mold 4b are moved in a left-right direction (horizontal direction) orthogonal to the mold opening/closing direction. Moreover, the present embodiment adopts a form in which the mold sliding means 30a is attached to a movable platen 40 side, but the present invention is not limited to this form. For example, it is also possible to adopt a form in which the mold sliding means is attached to a fixed platen 20 side, provided that the plurality of injection units are appropriately disposed and resin can be injection-filled to the inside of the formed mold cavity.

Method of Manufacturing According to Example 9

Next, a method of manufacturing according to example 9 performed employing the injection molding machine according to the third embodiment will be described using FIGS. 16A to 18C. FIGS. 16A to 16F are schematic cross-sectional views of a mold showing molding steps of the method of manufacturing (injection molding method) according to example 9. FIG. 16A shows a base layer molding step. FIG. 16B shows a state where the first movable mold 4a has been mold-opened from the fixed mold 2. FIG. 16C shows a state where the second movable mold 4b has been moved to a position facing the fixed mold 2. FIG. 16D shows a first injection-filling step after the fixed mold 2 and the second movable mold 4b have been mold-closed. FIG. 16E shows a start time of a second expansion step and a second injection-filling step. FIG. 16F shows a completion time of the second expansion step and the second injection-filling step. FIGS. 17A to 17C are schematic cross-sectional views showing the sandwich molded product during each of the molding steps. FIG. 17A shows the sandwich molded product after completion of the first injection-filling step. FIG. 17B shows the sandwich molded product at the start time of the second expansion step and the second injection-filling step. FIG. 17C shows the sandwich molded product after completion of a product cooling step. FIGS. 18A to 18C are schematic cross-sectional views showing another sandwich molded product during each of the molding steps. FIG. 18A shows the other sandwich molded product after completion of the first injection-filling step. FIG. 18B shows the other sandwich molded product at the start time of the second expansion step and the second injection-filling step. FIG. 18C shows the other sandwich molded product after completion of the product cooling step.

The method of manufacturing according to example 9 is, roughly, a method in which the base layer 9g is made of the non-foamable base layer resin 8b, the outer layer portion of the sandwich molded portion 9h is made of the non-foamable first resin 9b, and the inner layer portion of the sandwich molded portion 9h is made of the non-foamable second resin 10b.

In the method of manufacturing according to example 9, first, as shown in FIG. 16A, the inside of the first mold cavity 9a formed by mold-clamping the fixed mold 2 and the first movable mold 4a is injection-filled with the base layer resin 8b to mold the base layer 9g (base layer molding step). Specifically, the first movable mold 4a is mold-closed on the fixed mold 2 by the mold opening/closing mechanism 60, and then a mold clamping force is applied. Next, in a state where the mold clamping force has been applied, the gate valve 8d provided in the base layer resin channel 8c is opened, and the first mold cavity 9a is injection-filled with the non-foamable base layer resin 8b, from the base layer injection unit 16, via the base layer resin channel 8c. As it is, the base layer resin 8b inside the first mold cavity 9a is cooled and solidified, and the base layer 9g is molded inside the first mold cavity 9a. Preferably adopted as the base layer resin 8b is a resin that allows fusibility (adhesiveness) strength between the base layer resin 8b and the first resin 9b that will be the outer layer portion of the sandwich molded portion 9h, to be sufficiently obtained. Molding of the base layer 9g by the base layer molding step is performed in a so-called fully-packed state where the inside of the mold cavity 9a is substantially 100% filled by the base layer resin 8b. Note that molding of the base layer 9g by the base layer molding step is due to a general injection molding method, hence a detailed description thereof will be omitted.

Note that in the base layer molding step, the gate valve 9d provided in the first resin channel 9c and the gate valve 10d provided in the second resin channel 10c are not disposed at positions communicating with the first mold cavity 9a, hence the base layer resin 8b never flows back into the first resin channel 9c and the second resin channel 10c via these gate valves.

As shown in FIG. 16B, after the base layer molding step, the first movable mold 4a is mold-opened from the fixed mold 2 by the mold opening/closing mechanism 60, in a state where the base layer 9g is held on the fixed mold 2

(mold opening step). Next, as shown in FIG. 16C, the second movable mold 4b is moved to a position facing the fixed mold 2 by a mold sliding means 30a (mold moving step).

As shown in FIG. 16D, after completion of the mold moving step, the second movable mold 4b is mold-closed on the fixed mold 2 by the mold opening/closing mechanism 60, and the second mold cavity 10a (mold cavity expansion portion) is formed between the fixed mold 2 on which the base layer 9g is held and the second movable mold 4b, and then a mold clamping force is applied (first expansion step). In this first expansion step, the gate valve 9d provided in the first resin channel 9c and the gate valve 10d provided in the second resin channel 10c attain a state of being openable to (communicable with) the inside of the mold cavity expansion portion of the second mold cavity 10a.

Next, in a state where the mold clamping force has been applied, the gate valve 9d provided in the first resin channel 9c is opened, and the second mold cavity 10a (mold cavity expansion portion) is injection-filled with the first resin 9b, from the first injection unit 17, via the first resin channel 9c (first injection-filling step). At this time, the gate valve 10d provided in the second resin channel 10c is closed, and the first resin 9b injection-filled inside the second mold cavity 10a (mold cavity expansion portion) never flows back into the second resin channel 10c.

Note that the first injection-filling step is preferably performed in a fully-packed state where the inside of the mold cavity expansion portion of the second mold cavity 10a is substantially 100% filled by the first resin 9b. Specifically, it is preferable that the volume of the second mold cavity 10a (mold cavity expansion portion) is determined to match an amount (volume) of the first resin 9b or the amount (volume) of the first resin 9b is determined to match the volume of the second mold cavity 10a (mold cavity expansion portion), such that the mold cavity expansion portion of the second mold cavity 10a is substantially 100% filled. As a result, as shown in FIG. 17A, the first resin 9b injection-filled in the second mold cavity 10a (mold cavity expansion portion) attains a state of being configured by: a skin layer 9e formed on a contact surface (outer peripheral surface) with a design (mold inner surface) of the second mold cavity 10a and a contact surface with the base layer 9g; and a molten layer 9f where the inside of the first resin 9b is still in a molten state. A distance in the mold opening/closing direction of the second mold cavity 10a at this time is set to α'.

The first injection-filling step adopts the base layer resin 8b that allows fusibility (adhesiveness) strength between itself and the first resin 9b to be sufficiently obtained, hence there is no problem with fusibility (adhesiveness) between the base layer 9g and the sandwich molded portion 9h. Furthermore, in view of cooling solidification contraction of the sandwich molded portion 9h after the first injection-filling step, it is more preferable that in the first injection-filling step, an amount of the first resin 9b greater than the volume of the mold cavity expansion portion of the second mold cavity 10a by at least an extent of a cooling solidification contraction portion is injection-filled, in terms of securing fusibility (adhesiveness) strength between the base layer 9g and the skin layer 9e of the sandwich molded portion 9h, and a high transferability to the skin layer 9e of the sandwich molded portion 9h.

Next, as shown in FIGS. 16E and 16F, after completion of the first injection-filling step, the volume of the second mold cavity 10a (mold cavity expansion portion) is expanded until it attains a product volume in conjunction with the volume of the first mold cavity 9a (second expansion step). Specifically, the second movable mold 4b is mold-opened by the mold opening/closing mechanism 60, from a state shown in FIG. 16D (mold-opening amount: distance 0: zero) to a position separated from the fixed mold 2 by an extent of a distance β (mold-opening amount: distance β). Note that the mold-opening amount α (α<β) shown in FIG. 16E is a mold-opening amount in the middle of movement to the mold-opening amount β at which the product volume is attained.

Then, after the start of this second expansion step, the gate valve 10d provided in the second resin channel 10c is opened, and the inside of the sandwich molded portion 9h is injection-filled with the non-foamable second resin 10b forming the inner layer, from the second injection unit 18, via the second resin channel 10c (second injection-filling step). A flow state of the inner layer second resin 10b at a start time of this second injection-filling step is shown in FIG. 17B. The distance in the mold opening/closing direction of the second mold cavity 10a at this time is a distance in the middle of movement from α' to β' (α'<β'), corresponding to the mold opening operation from the mold-opening amount 0 to β of the fixed mold 2 and the second movable mold 4b.

In the second expansion step and the second injection-filling step, injection-filling of the second resin 10b by the second injection-filling step should be performed in a fully-packed state, similarly to in the second expansion step and the second injection-filling step in the method of manufacturing according to example 1. Note that the second expansion step and the second injection-filling step are largely similar to the second expansion step and the second injection-filling step described in the method of manufacturing according to example 1, hence a detailed description thereof will be omitted.

As shown in FIG. 16F, after completion of the second expansion step and the second injection-filling step, the gate valve 10d provided in the second resin channel 10c is closed, and the base layer 9g and sandwich molded portion 9h inside the first mold cavity 9a and second mold cavity 10a are cooled and solidified in a state of being applied with a certain mold clamping force (product cooling and solidification step). As a result, the sandwich molded product 9 whose thickness of its outer layer differs partially, is molded. Specifically, the sandwich molded product 9 including a thick outer layer on a fixed mold 2 side (base layer 9g+outer layer portion of sandwich molded portion 9h) and including a thin outer layer on a second movable mold 4b side (outer layer portion of sandwich molded portion 9h), is molded. The sandwich molded product 9 after completion of this product cooling and solidification step is shown in FIG. 17C. In relation to FIG. 17C, the inner layer second resin 10b in a cooled and solidified state is shown by the same slanting lines as that in a molten state.

After cooling and solidification of the sandwich molded product 9 has been completed, the second movable mold 4b is mold-opened from the fixed mold 2 by the mold opening/closing mechanism 60, the sandwich molded product 9 is carried out to outside of the injection molding machine by a product removing means not illustrated, and a molding cycle finishes. If, subsequently, the mold facing the fixed mold 2 is switched from the second movable mold 4b to the first movable mold 4a, then it becomes possible for the next molding cycle to start.

The method of manufacturing according to example 9 enables the sandwich molded product 9 whose thickness of its outer layer differs partially, to be molded successively by repeating the above steps.

Figure 27A:
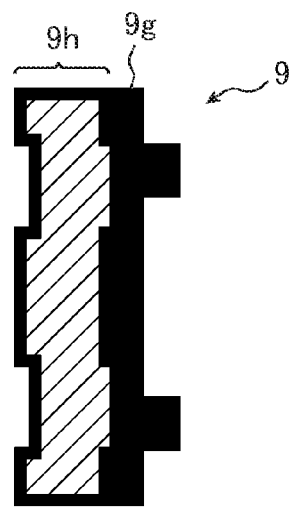
FIG. 27A is a schematic cross-sectional view showing an example of a sandwich molded product capable of being manufactured by the manufacturing steps according to examples 1 through 8.
Figure 27B:
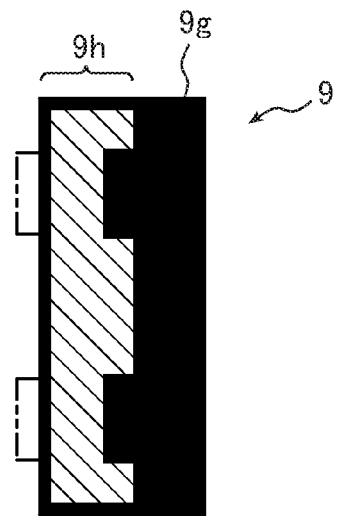
FIG. 27B is a schematic cross-sectional view showing an example of a sandwich molded product capable of being manufactured by the manufacturing steps according to examples 9 through 12.

Moreover, in the method of manufacturing according to example 9, the mold forming the mold cavity (second mold cavity 10a) when the sandwich molded portion 9h is stacked on the base layer 9g can be switched from the first movable mold 4a to the second movable mold 4b by the mold moving step, hence, as shown, for example, by the solid line in FIG. 27B, even when a design on a mold opening direction side of the base layer 9g (thick portion) has a distinctive feature, a design on a mold opening direction side of the sandwich molded portion 9h can be formed without being restricted by the design of the base layer 9g. In addition, even when the base layer 9g (thick portion) is formed not only on a surface substantially orthogonal to the mold opening/closing direction (for example, a design surface or non-design surface of the sandwich molded product 9) but also, as shown, for example, by the solid line in FIG. 27C, on a surface substantially parallel to the mold opening/closing direction and continuous with such a surface (for example, a side surface of the sandwich molded product 9), a design on a mold opening direction side of the sandwich molded portion 9h can be formed without being restricted by the design of the base layer 9g. That is, in the method of manufacturing according to example 9, the mold forming the design (shape) on the mold opening direction side of the base layer 9g (first movable mold 4a) and the mold forming the design (shape) on the mold opening direction side of the sandwich molded portion 9h (second movable mold 4b) are different, hence the method of manufacturing according to example 9 makes it possible to mold a sandwich molded product 9 in which the design (shape) on the mold opening direction side of the base layer 9g and the design (shape) on the mold opening direction side of the sandwich molded portion 9h are different.

Note that FIGS. 16A to 17C illustrated a sandwich molded product 9 in which the base layer 9g is stacked on the whole of one surface (surface on the fixed mold 2 side) of the sandwich molded portion 9h, but the present invention is not limited to this configuration. For example, changing the shapes of the fixed mold 2, the first movable mold 4a, and the second movable mold 4b makes it possible also to adopt a configuration in which the base layer 9g is stacked on part of one surface (surface on the fixed mold 2 side) of the sandwich molded portion 9h, as shown in FIGS. 18A to 18C. Such a sandwich molded product 9 also makes it possible for the design on the mold opening direction side (movable platen 40 side) of the sandwich molded portion 9h to be molded flush, for example, without being restricted by the design on the mold opening direction side of the base layer 9g.

Method of Manufacturing According to Example 10

Figure 19A:
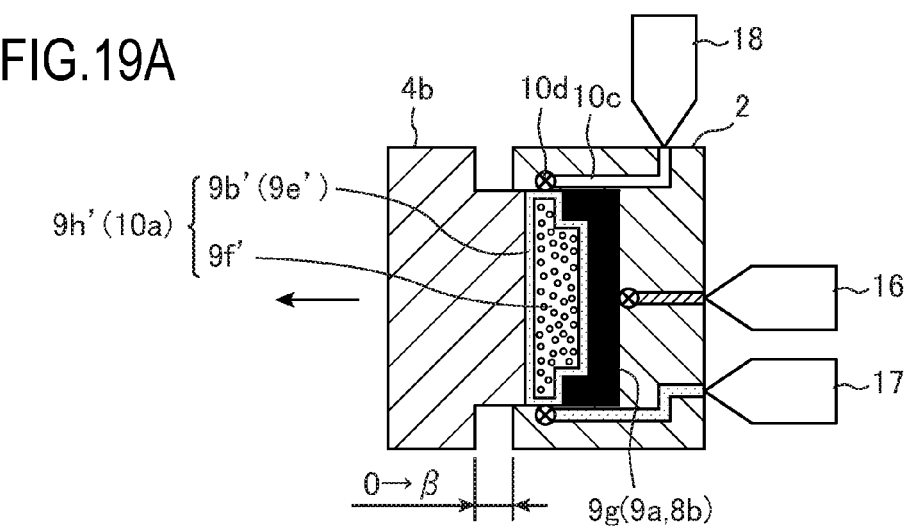
FIG. 19A is a schematic cross-sectional view showing a second expansion step of manufacturing steps according to example 10 performed employing the injection molding machine according to the third embodiment.
Figure 19B:
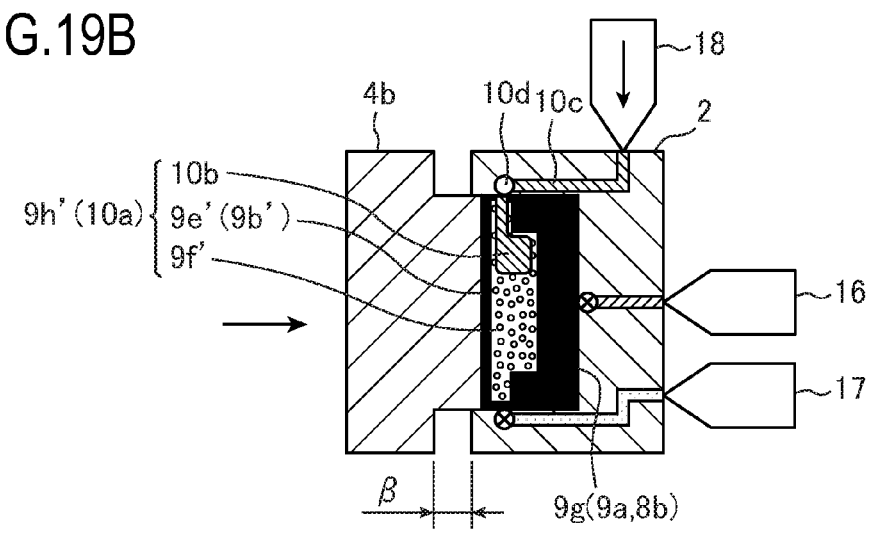
FIG. 19B is a schematic cross-sectional view showing a start time of a second injection-filling step of the manufacturing steps according to example 10.
Figure 19C:
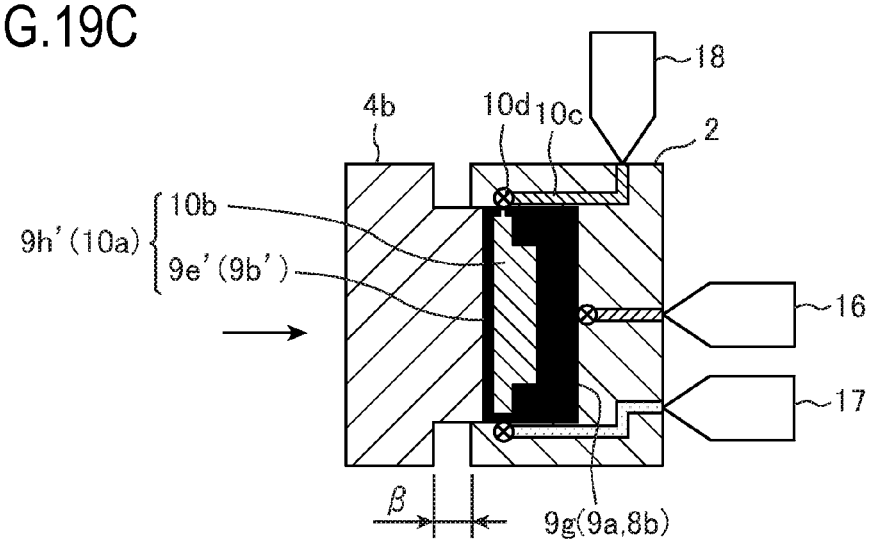
FIG. 19C is a schematic cross-sectional view showing a completion time of the second injection-filling step of the manufacturing steps according to example 10.
Figure 20A:
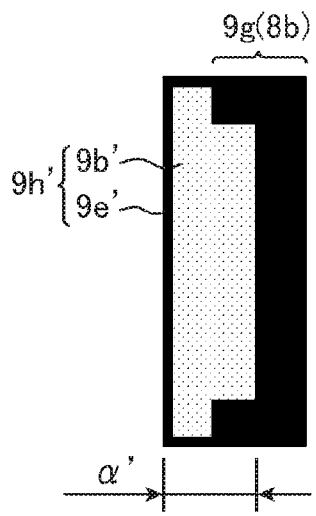
FIG. 20A is a schematic cross-sectional view showing a state of a sandwich molded product after completion of a first injection-filling step.
Figure 20B:
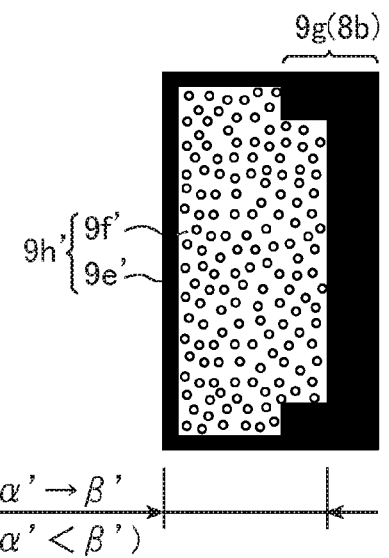
FIG. 20B is a schematic cross-sectional view showing a state of the sandwich molded product during the second expansion step.
Figure 20C:
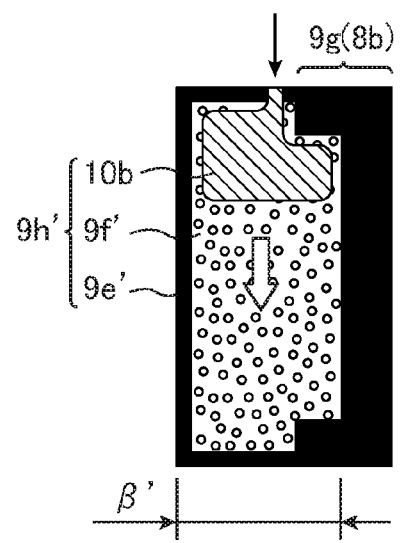
FIG. 20C is a schematic cross-sectional view showing a state of the sandwich molded product at the start time of the second injection-filling step.
Figure 20D:
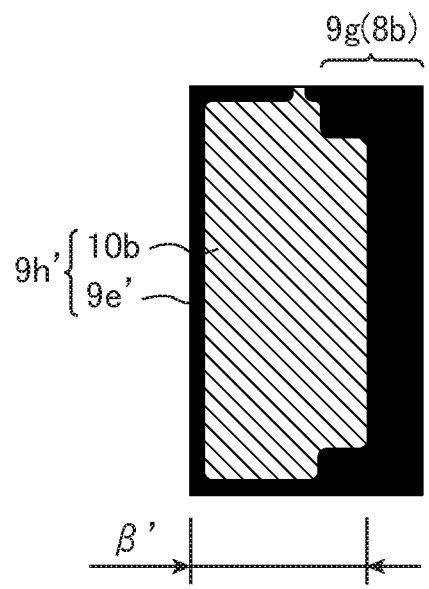
FIG. 20D is a schematic cross-sectional view showing a state of the sandwich molded product at the completion time of the second injection-filling step.
Figure 20E:
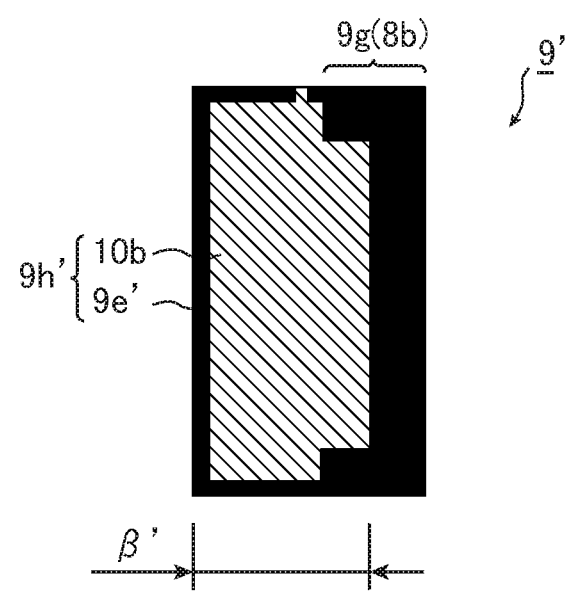
FIG. 20E is a schematic cross-sectional view showing a state of the sandwich molded product after completion of a product cooling step.

Next, a method of manufacturing according to example 10 performed employing the injection molding machine according to the third embodiment will be described using FIGS. 19A to 20E. FIGS. 19A to 19C are schematic cross-sectional views of a mold showing a second expansion step and a second injection-filling step of the method of manufacturing (injection molding method) according to example 10. FIG. 19A shows the second expansion step. FIG. 19B shows a start time of the second injection-filling step. FIG. 19C shows a completion time of the second injection-filling step. FIGS. 20A to 20E are schematic cross-sectional views showing the sandwich molded product during each of the molding steps. FIG. 20A shows the sandwich molded product after completion of a first injection-filling step. FIG. 20B shows the sandwich molded product during the second expansion step. FIG. 20C shows the sandwich molded product at the start time of the second injection-filling step. FIG. 20D shows the sandwich molded product at the completion time of the second injection-filling step. FIG. 20E shows the sandwich molded product after completion of a product cooling step.

The method of manufacturing according to example 10 is, roughly, a method in which the base layer 9g is made of the non-foamable base layer resin 8b, the outer layer portion of the sandwich molded portion 9h' is made of the foamable first resin 9b', and the inner layer portion of the sandwich molded portion 9h' is made of the non-foamable second resin 10b.

Points in which the method of manufacturing according to example 10 differs from the method of manufacturing according to example 9 are that the first resin is a foamable resin, and that due to this, an implementation timing of the second expansion step and the second injection-filling step are different. Besides these points, the method of manufacturing according to example 10 is basically the same as the method of manufacturing according to example 9, hence a detailed description thereof will be omitted. Moreover, the second expansion step and the second injection-filling step are basically the same as those in the methods of manufacturing according to examples 2 and 6, hence a detailed description thereof will be omitted. Note that objects distinguished from those in the description of example 9 due to this difference between the non-foamable first resin 9b and the foamable first resin 9b' are assumed to be distinguished by assigning ' (an apostrophe) to the same reference symbol as in example 9.

In the method of manufacturing according to example 10, first, a base layer molding step is performed and the base layer 9g is molded inside the first mold cavity 9a, by a method similar to in the method of manufacturing according to example 9. Moreover, by methods similar to those in example 9, a mold moving step and a first expansion step are performed and the second mold cavity 10a (mold cavity expansion portion) is formed between the outer surface of the base layer 9g held on the fixed mold 2 side and the inner surface of the second movable mold 4b. Then, the inside of the mold cavity expansion portion of the second mold cavity 10a is injection-filled with the foamable first resin 9b', from the first injection unit 17 (first injection-filling step). Descriptions and illustration of these steps will be omitted.

Then, in the method of manufacturing according to example 10, the second expansion step shown in FIGS. 19A, 20A, and 20B, the second injection-filling step and a product cooling and solidification step shown in FIGS. 19B, 19C, and 20C to 20E, and a product removing step not illustrated are executed after the start of the first injection-filling step (that is, in the middle of the first injection-filling step or after completion of the first injection-filling step), whereby a sandwich molded product 9' is molded. Note that the second expansion step, second injection-filling step, product cooling and solidification step, and product removing step are executed by similar methods to those of the second expansion step, second injection-filling step, product cooling and solidification step, and product removing step described in the methods of manufacturing according to examples 2 and 6, hence descriptions thereof will be omitted.

The method of manufacturing according to example 10 enables the sandwich molded product 9' whose thickness of its outer layer differs partially and in which the design (shape) on the mold opening direction side of the base layer 9g and the design (shape) on the mold opening direction side of the sandwich molded portion 9h' are different, to be molded successively by repeating the above steps.

Moreover, in the second injection-filling step of the method of manufacturing according to example 10, the inner layer second resin 10b is injection-filled in the foam layer 9f' of the sandwich molded portion 9h' whose strength and density are low, hence the method of manufacturing according to example 10 makes it possible for injection-filling resistance of the inner layer second resin 10b to be lowered even more than when the non-foamable first resin 9b has been adopted for the outer layer. As a result, the method of manufacturing according to example 10 makes it possible to achieve a further improvement in filling ratio of the inner layer second resin 10b with respect to volume of the sandwich molded portion 9h' while preventing a resin inversion defect due to the inner layer second resin 10b. Note that also in the method of manufacturing according to example 10, it is possible to adopt a configuration of the kind shown in FIGS. 18A to 18C of example 9, in which the base layer 9g is stacked on part of one surface (surface on the fixed mold 2 side) of the sandwich molded portion 9h'.

Method of Manufacturing According to Example 11

Figure 21A:
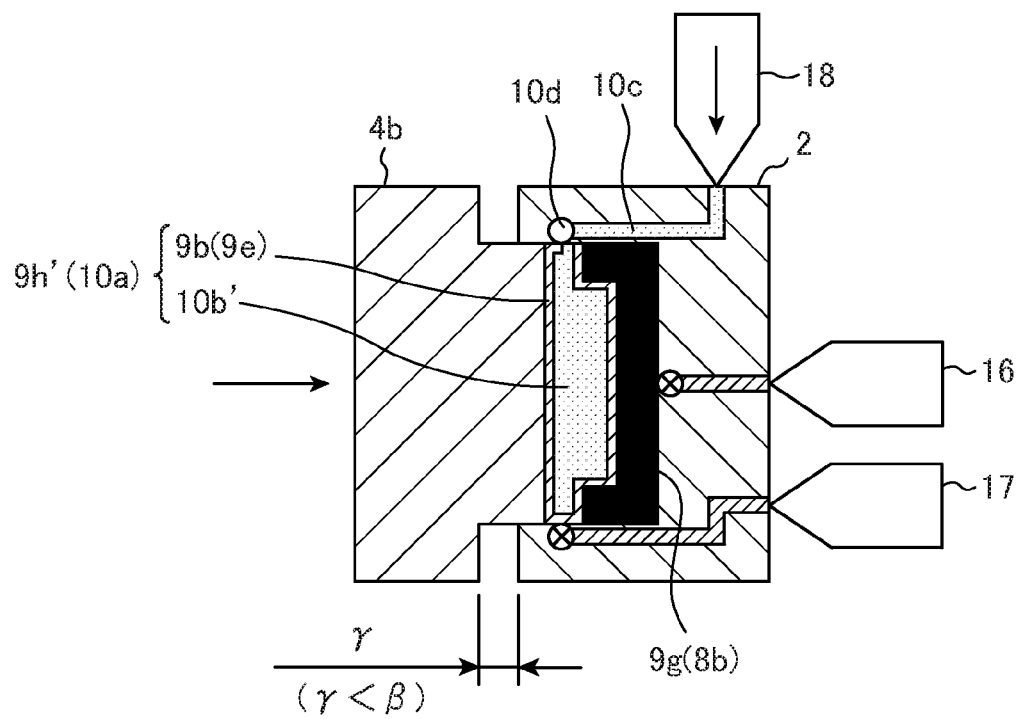
FIG. 21A is a schematic cross-sectional view showing a completion time of a second expansion step and a second injection-filling step, of manufacturing steps according to example 11 performed employing the injection molding machine according to the third embodiment.
Figure 21B:
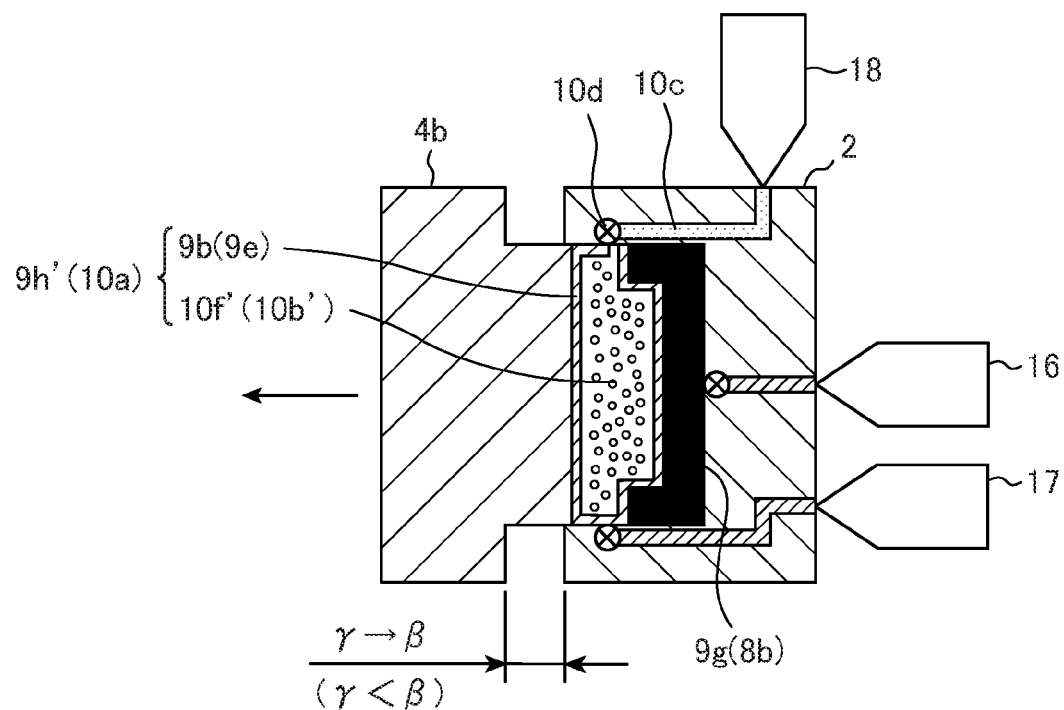
FIG. 21B is a schematic cross-sectional view showing a third expansion step of the manufacturing steps according to example 11.
Figure 22A:
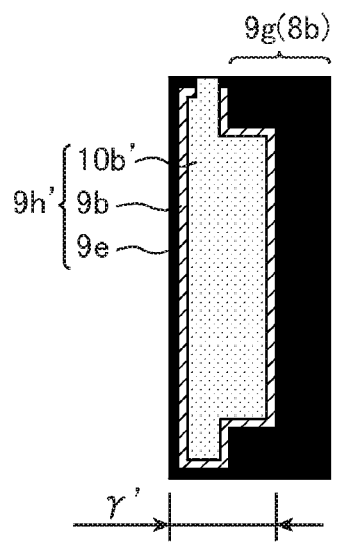
FIG. 22A is a schematic cross-sectional view showing a state of a sandwich molded product at the completion time of the second expansion step and the second injection-filling step.
Figure 22B:
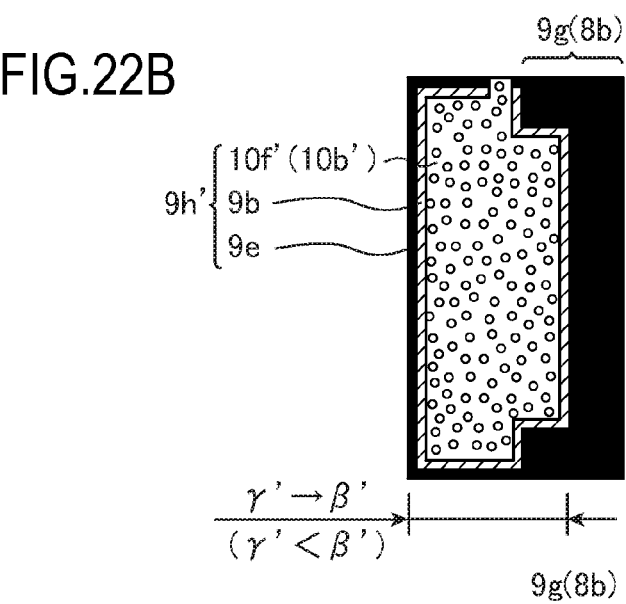
FIG. 22B is a schematic cross-sectional view showing a state of the sandwich molded product during the third expansion step.
Figure 22C:
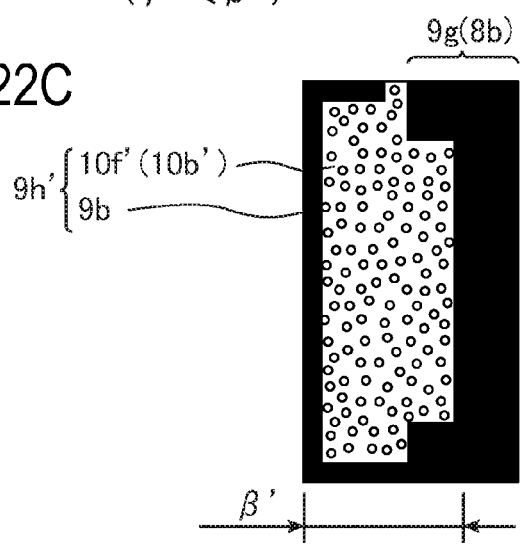
FIG. 22C is a schematic cross-sectional view showing a state of the sandwich molded product after completion of a product cooling step.

Next, a method of manufacturing according to example 11 performed employing the injection molding machine according to the third embodiment will be described using FIGS. 21A to 22C. FIGS. 21A and 21B are schematic cross-sectional views of a mold showing a second expansion step, a second injection-filling step, and a third expansion step (second mold cavity re-expansion step) of the method of manufacturing (injection molding method) according to example 11. FIG. 21A shows a completion time of the second expansion step and the second injection-filling step. FIG. 21B shows the third expansion step. FIGS. 22A to 22C are schematic cross-sectional views showing the sandwich molded product during each of the molding steps. FIG. 22A shows the sandwich molded product at the completion time of the second expansion step and the second injection-filling step. FIG. 22B shows the sandwich molded product during the third expansion step. FIG. 22C shows the sandwich molded product after completion of a product cooling step.

The method of manufacturing according to example 11 is, roughly, a method in which the base layer 9g is made of the non-foamable base layer resin 8b, the outer layer portion of the sandwich molded portion 9h' is made of the non-foamable first resin 9b, and the inner layer portion of the sandwich molded portion 9h' is made of the foamable second resin 10b'.

Points in which the method of manufacturing according to example 11 differs from the method of manufacturing according to example 9 are that the second resin is a foamable resin, and that due to this, the method of manufacturing according to example 11 comprises the third expansion step (second mold cavity re-expansion step) in which, after the start of the second injection-filling step, the second mold cavity (mold cavity expansion portion) is caused to further expand to an extent of a specified quantity. Besides these points, the method of manufacturing according to example 11 is basically the same as the method of manufacturing according to example 9, hence a detailed description thereof will be omitted. Moreover, the second expansion step, the second injection-filling step, and the third expansion step are basically the same as those in the methods of manufacturing according to examples 3 and 7, hence a detailed description thereof will be omitted. Note that objects distinguished from those in the description of example 9 due to this difference between the non-foamable second resin 10b and the foamable second resin 10b' are assumed to be distinguished by assigning ' (an apostrophe) to the same reference symbol as in example 9.

In the method of manufacturing according to example 11, first, a base layer molding step is performed and the base layer 9g is molded inside the first mold cavity 9a, by a method similar to in the method of manufacturing according to example 9. Moreover, by methods similar to those in example 9, a mold moving step and a first expansion step are performed, and the second mold cavity 10a (mold cavity expansion portion) is formed between the outer surface of the base layer 9g held on the fixed mold 2 side and the inner surface of the second movable mold 4b. Then, the inside of the mold cavity expansion portion of the second mold cavity 10a is injection-filled with the non-foamable first resin 9b, from the first injection unit 17 (first injection-filling step). Descriptions and illustration of these steps will be omitted.

Next, the second expansion step and the second injection-filling step are performed by coordinated control, by a method similar to that in example 9. Now, in the second expansion step of example 11, the volume of the second mold cavity 10a (mold cavity expansion portion) is not expanded until it attains a product volume in conjunction with the volume of the first mold cavity 9a, and is kept to an expansion to less than the product volume. A mold-opening amount at this time is set to γ (gamma/γ<β). In this way, as shown in FIG. 21A, the second expansion step and the second injection-filling step are completed.

Note that similarly to in example 9, the second expansion step and the second injection-filling step are coordination-controlled and injection-filling of the second resin 10b' by the second injection-filling step is performed in a fully-packed state, hence the inner layer second resin 10b' injection-filled inside the sandwich molded portion 9h' is in an unfoamed state at this stage. The sandwich molded product 9' (base layer 9g+sandwich molded portion 9h') at the completion time of the second expansion step and the second injection-filling step is shown in FIG. 22A. FIG. 22A corresponds to a state in present example 11 where a start state of the second injection-filling step in which the inside of the sandwich molded portion is injection-filled with the inner layer second resin 10b, shown in FIG. 17B of example 9, has progressed and the same step has been completed. A distance in the mold opening/closing direction of the second mold cavity 10a at this time is set to γ' (γ'<β).

Next, as shown in FIG. 21B, after the start of the second injection-filling step (that is, in the middle of the second injection-filling step or after completion of the second injection-filling step), the volume of the second mold cavity 10a (mold cavity expansion portion) is expanded until it attains the product volume in conjunction with the volume of the first mold cavity 9a, and the foamable second resin 10b' inside the sandwich molded portion 9h' is foamed (third expansion step). Specifically, the movable mold 4 is mold-opened by the mold opening/closing mechanism 60, from the state shown in FIG. 21A (mold-opening amount: distance γ) to a position separated from the fixed mold 2 by an extent of the distance β (beta). As a result, as shown in FIG. 22B, the sandwich molded portion 9h' attains a state of being configured by: the skin layer 9e formed on a contact surface with a design (mold inner surface) of the second mold cavity 10a (mold cavity expansion portion) and with the base layer 9g; the first resin 9b continuous with the skin layer 9e and including a molten state portion whose cooling and solidification is in progress; and a foam layer 10f' including foam cells. The distance in the mold opening/closing direction of the second mold cavity 10a at this time is in a state of movement from γ' to β', corresponding to the mold opening operation from the mold-opening amount 0 to β of the fixed mold 2 and the second movable mold 4b.

Then, after completion of the third expansion step, the method of manufacturing according to example 11 executes a product cooling and solidification step and a product removing step not illustrated, whereby the sandwich molded product 9' is molded. Note that the second expansion step, second injection-filling step, third expansion step, product cooling and solidification step, and product removing step are similar to those of the methods of manufacturing according to examples 3 and 7, hence detailed descriptions thereof will be omitted.

The method of manufacturing according to example 11 enables the sandwich molded product 9' having different thicknesses of the outer layer on a fixed mold 2 side (base layer 9g+outer layer portion of sandwich molded portion 9h') and the outer layer on a second movable mold 4b side (outer layer portion of sandwich molded portion 9h') and whose inner layer is configured from the foam layer 10f' (second resin 10b'), to be molded successively by repeating the above steps.

Moreover, the method of manufacturing according to example 11, similarly to the methods of manufacturing according to examples 9 and 10, enables the sandwich molded product 9' in which the design (shape) on the mold opening direction side of the base layer 9g and the design (shape) on the mold opening direction side of the sandwich molded portion 9h' are different, to be molded successively.

Furthermore, the method of manufacturing according to example 11, similarly to the methods of manufacturing according to examples 3 and 7, makes it possible not only for thickness of the outer layer to be molded so as to differ respectively between the front surface and the rear surface of the sandwich molded product, but also for the inner layer to be configured as a foam layer.

Method of Manufacturing According to Example 12

Figure 23A:
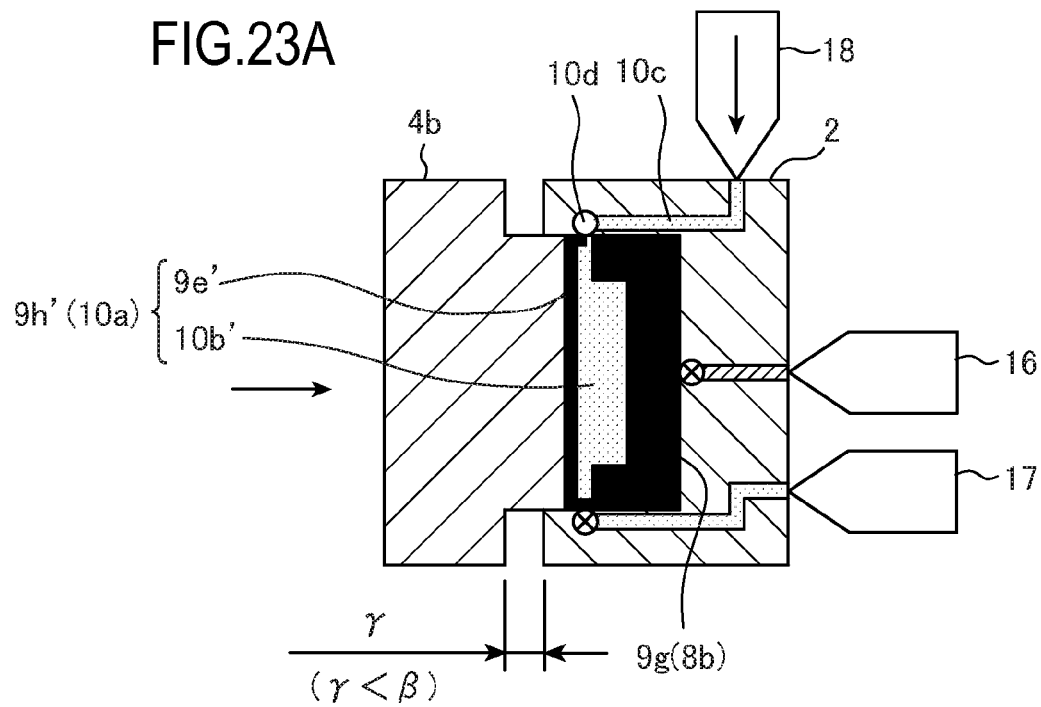
FIG. 23A is a schematic cross-sectional view showing a completion time of a second expansion step and a second injection-filling step, of manufacturing steps according to example 12 performed employing the injection molding machine according to the third embodiment.
Figure 23B:
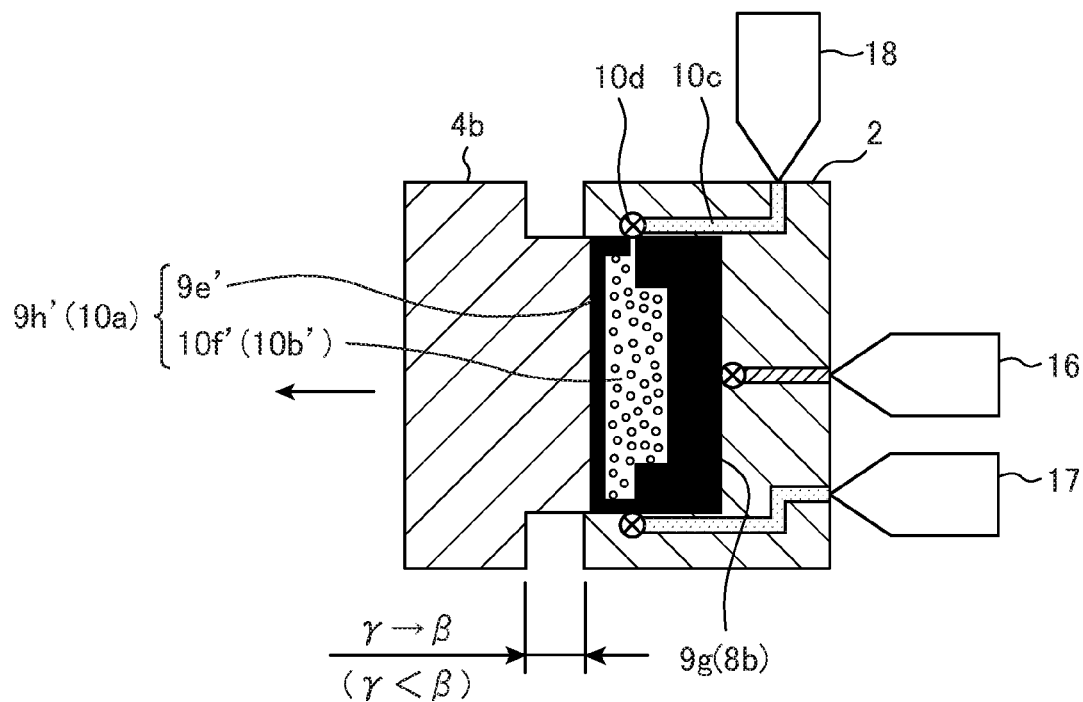
FIG. 23B is a schematic cross-sectional view showing a third expansion step of the manufacturing steps according to example 12.
Figure 24A:
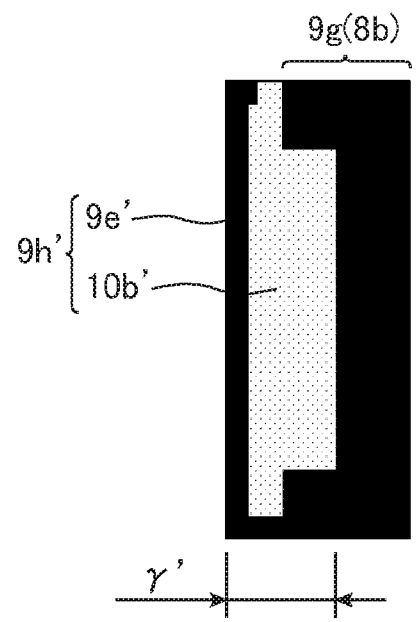
FIG. 24A is a schematic cross-sectional view showing a state of a sandwich molded product at the completion time of the second expansion step and the second injection-filling step.
Figure 24B:
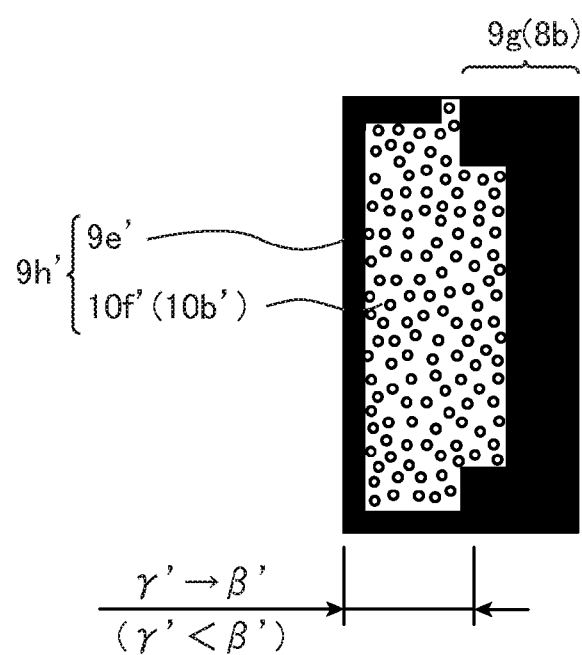
FIG. 24B is a schematic cross-sectional view showing a state of the sandwich molded product during the third expansion step.

Next, a method of manufacturing according to example 12 performed employing the injection molding machine according to the third embodiment will be described using FIGS. 23A to 24B. FIGS. 23A and 23B are schematic cross-sectional views of a mold showing a second expansion step, a second injection-filling step, and a third expansion step of the method of manufacturing (injection molding method) according to example 12. FIG. 23A shows a completion time of the second expansion step and the second injection-filling step. FIG. 23B shows the third expansion step. FIGS. 24A and 24B are schematic cross-sectional views showing the sandwich molded product during each of the molding steps. FIG. 24A shows the sandwich molded product at the completion time of the second expansion step and the second injection-filling step. FIG. 24B shows the sandwich molded product during the third expansion step.

The method of manufacturing according to example 12 is, roughly, a method in which the base layer 9g is made of the non-foamable base layer resin 8b, the outer layer portion of the sandwich molded portion 9h' is made of the foamable first resin 9b', and the inner layer portion of the sandwich molded portion 9h' is made of the foamable second resin 10b'.

Points in which the method of manufacturing according to example 12 differs from the method of manufacturing according to example 9 are that the first resin and the second resin are both a foamable resin, and that due to this, the method of manufacturing according to example 12 comprises the third expansion step (second mold cavity re-expansion step) in which, after the start of the second injection-filling step, the second mold cavity (mold cavity expansion portion) is caused to further expand to an extent of a specified quantity. Besides these points, the method of manufacturing according to example 12 is basically the same as the method of manufacturing according to example 9, hence a detailed description thereof will be omitted. Moreover, the first injection-filling step, the second expansion step, the second injection-filling step, and the third expansion step are basically the same as those in the methods of manufacturing according to examples 4 and 8, hence a detailed description thereof will be omitted. Note that objects distinguished from those in the description of example 9 due to this difference between the non-foamable first resin 9b and second resin 10b and the foamable first resin 9b' and second resin 10b' are assumed to be distinguished by assigning ' (an apostrophe) to the same reference symbol as in example 9.

In the method of manufacturing according to example 12, first, a base layer molding step is performed and the base layer 9g is molded inside the first mold cavity 9a, by a method similar to in the method of manufacturing according to example 9. Moreover, by methods similar to those in example 9, a mold moving step and a first expansion step are performed and the second mold cavity 10a (mold cavity expansion portion) is formed between the base layer 9g held on the fixed mold 2 side and the second movable mold 4b. Then, the inside of the mold cavity expansion portion of the second mold cavity 10a is injection-filled with the foamable first resin 9b', from the first injection unit 17 (first injection-filling step). Descriptions and illustration of these steps will be omitted.

Then, in the method of manufacturing according to example 12, the second expansion step and second injection-filling step shown in FIGS. 23A and 24A, the third expansion step shown in FIGS. 23B and 24B, and a product cooling and solidification step and product removing step not illustrated are executed after the start of the first injection-filling step (that is, in the middle of the first injection-filling step or after completion of the first injection-filling step), whereby a sandwich molded product 9' is molded. Note that the first injection-filling step, second expansion step, second injection-filling step, third expansion step, product cooling and solidification step, and product removing step are executed by similar methods to those of the first injection-filling step, second expansion step, second injection-filling step, third expansion step, product cooling and solidification step, and product removing step described in the methods of manufacturing according to examples 4 and 8, hence descriptions thereof will be omitted.

The method of manufacturing according to example 12 enables the sandwich molded product 9' having different thicknesses of the outer layer on a fixed mold 2 side (base layer 9g+outer layer portion of sandwich molded portion 9h') and the outer layer on a second movable mold 4b side (outer layer portion of sandwich molded portion 9h') and whose inner layer is configured from the foam layer 10f' (second resin 10b'), to be molded successively by repeating the above steps.

Moreover, the method of manufacturing according to example 12, similarly to the methods of manufacturing according to examples 9 to 11, enables the sandwich molded product 9' in which the design (shape) on the mold opening direction side of the base layer 9g and the design (shape) on the mold opening direction side of the sandwich molded portion 9h' are different, to be molded successively.

Furthermore, the method of manufacturing according to example 12, similarly to the methods of manufacturing according to examples 4 and 8, not only makes it possible for thickness of the outer layer to be molded so as to differ respectively between the front surface and the rear surface of the sandwich molded product, but also, by adopting a foamable resin for the outer layer, makes it possible to achieve a further improvement in filling ratio of the inner layer second resin 10b' with respect to volume of the sandwich molded portion 9h'.

The above-mentioned injection molding machine according to the third embodiment was described as being respectively provided with the base layer injection unit 16 injecting the base layer resin 8b and the first injection unit 17 injecting the first resin 9b (9b'), but the present invention is not limited to this configuration. That is, the injection molding machine according to the third embodiment may be configured so as to have provided between the base layer resin channel 8c and the first resin channel 9c a connecting resin channel communicating between these resin channels and a resin channel switching valve, and to perform injection-filling in the base layer molding step and the first injection-filling step using either one of the base layer injection unit 16 and the first injection unit 17 only. Moreover, the injection molding machine according to the third embodiment, in the case of being configured as a special purpose machine using the same resin (non-foamable resin or foamable resin) for the base layer resin 8b and the first resin 9b (9b') like the injection molding machine according to the first embodiment, may adopt a configuration in which, from the start, two injection units are adopted and molten resin injection-filled from one injection unit is filled into the first mold cavity 9a in the base layer molding step and into the second mold cavity 10a (mold cavity expansion portion) in the first injection-filling step, by switching of resin channels inside the mold.

[Injection Molding Machine According to Fourth Embodiment]

Figure 25:
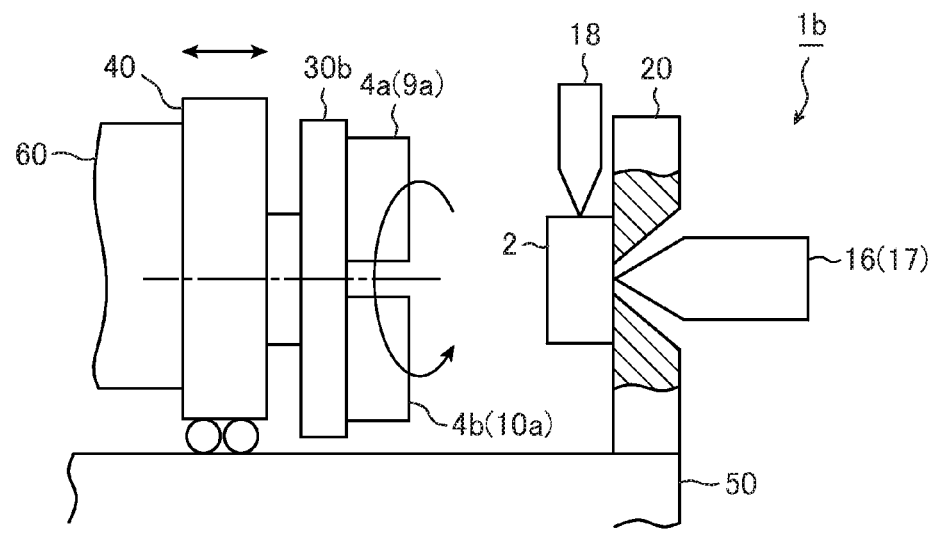
FIG. 25 is a schematic side view showing an injection molding machine according to a fourth embodiment of the present invention.

Next, an injection molding machine according to a fourth embodiment will be described using FIG. 25. FIG. 25 is a schematic side view showing the injection molding machine according to the fourth embodiment. The injection molding machine according to the fourth embodiment, similarly to the injection molding machine according to the third embodiment, is an injection molding machine for forming the base layer 9g, an outer layer portion of the sandwich molded portion 9h (9h'), and an inner layer portion of the sandwich molded portion 9h (9h') by same or different resins.

Specifically, as shown in, for example, FIG. 25, an injection molding machine 1b according to the fourth embodiment comprises: a fixed platen 20 capable of having a fixed mold 2 attached thereto; a movable platen 40 capable of having a first movable mold 4a and a second movable mold 4b attached thereto and provided capable of moving closer to or moving away from the fixed platen 20 along a mold opening/closing direction; a mold opening/closing mechanism 60 that causes the movable platen 40 to move in the mold opening/closing direction; a base layer injection unit 16 capable of plasticizing (melting) a base layer resin 8b for forming the base layer to injection-fill the base layer resin 8b inside a first mold cavity 9a formed by the fixed mold 2 and the first movable mold 4a; a first injection unit 17 capable of plasticizing a first resin 9b (9b') for forming the outer layer portion to injection-fill the first resin 9b (9b') inside a second mold cavity 10a (mold cavity expansion portion) formed by the fixed mold 2 and the second movable mold 4b; and a second injection unit 18 capable of plasticizing a second resin 10b (10b') for forming the inner layer portion to injection-fill the second resin 10b (10b') inside the second mold cavity 10a (mold cavity expansion portion).

The movable platen 40 is mounted on a base 50 of the injection molding machine 1b in a state of being movable in the mold opening/closing direction. Attached to the movable platen 40 is a mold rotating means 30b that causes the first movable mold 4a and the second movable mold 4b to move rotationally around a rotation axis parallel to the mold opening/closing direction. Moreover, the first movable mold 4a and the second movable mold 4b are attached to the movable platen 40 via the mold rotating means 30b.

The mold rotating means 30b includes a mold attaching surface that faces a mold attaching surface of the fixed platen 20, and the first movable mold 4a and the second movable mold 4b are attached on said mold attaching surface with a certain spacing in a direction orthogonal to the mold opening/closing direction. The mold rotating means 30b is configured to rotate around the rotation axis parallel to the mold opening/closing direction and thereby switch the movable mold facing the fixed mold 2 from the first movable mold 4a to the second movable mold 4b or from the second movable mold 4b to the first movable mold 4a. Specifically, the mold rotating means 30b is configured capable of angular displacement at least between a first rotation position where the first movable mold 4a faces the fixed mold 2 and a second rotation position where the second movable mold 4b faces the fixed mold 2.

Note that the injection molding machine 1b according to the fourth embodiment has commonness with the injection molding machine 1a according to the third embodiment, excluding the fact that a moving means of the first movable mold 4a and the second movable mold 4b is the mold rotating means 30b, not a mold sliding means. Therefore, in the injection molding machine 1b according to the fourth embodiment, identical reference symbols are employed for configurations shared with the injection molding machine 1a according to the third embodiment, hence detailed descriptions thereof will be omitted. Moreover, the injection molding machine 1b according to the fourth embodiment is capable of manufacturing a sandwich molded product by methods similar to the methods of manufacturing according to examples 9 to 12 performed employing the injection molding machine 1a according to the third embodiment. Therefore, descriptions of methods of manufacturing a sandwich molded product performed employing the injection molding machine 1b according to the fourth embodiment will be omitted.

[Injection Molding Machine According to Fifth Embodiment]

Figure 26:
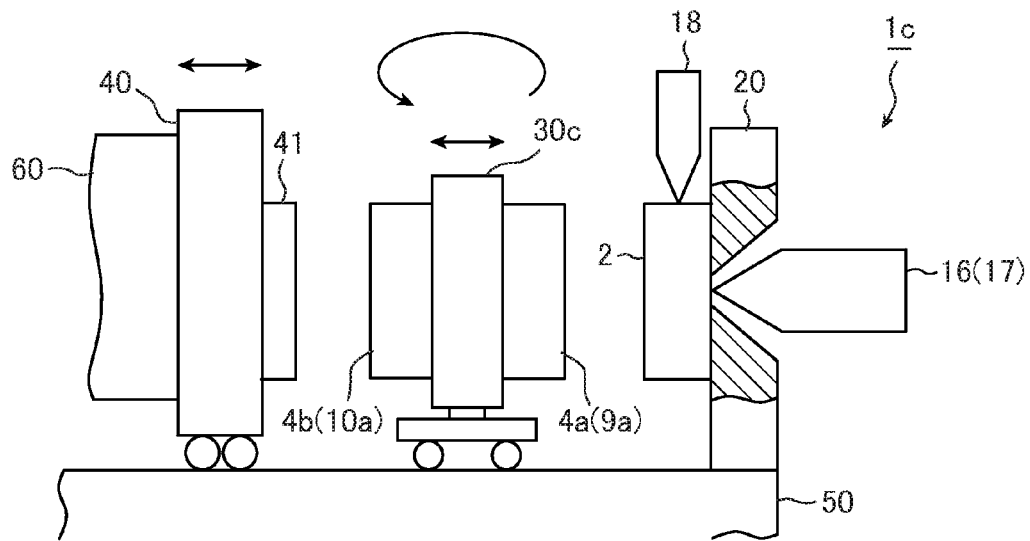
FIG. 26 is a schematic side view showing an injection molding machine according to a fifth embodiment of the present invention.

Next, an injection molding machine according to a fifth embodiment will be described using FIG. 26. FIG. 26 is a schematic side view showing the injection molding machine according to the fifth embodiment. The injection molding machine according to the fifth embodiment, similarly to the injection molding machines according to the third and fourth embodiments, is an injection molding machine for forming the base layer 9g, an outer layer portion of the sandwich molded portion 9h (9h'), and an inner layer portion of the sandwich molded portion 9h (9h') by same or different resins.

Specifically, as shown in, for example, FIG. 26, an injection molding machine 1c according to the fifth embodiment comprises: a fixed platen 20 capable of having a fixed mold 2 attached thereto; a movable platen 40 provided capable of moving closer to or moving away from the fixed platen 20 along a mold opening/closing direction; a rotating platen 30c provided between the fixed platen 20 and the movable platen 40 and provided capable of moving closer to or moving away from the fixed platen 20 along the mold opening/closing direction; a mold opening/closing mechanism 60 that causes the movable platen 40 and the rotating platen 30c to move in the mold opening/closing direction; a base layer injection unit 16 capable of plasticizing (melting) a base layer resin 8b for forming the base layer to injection-fill the base layer resin 8b inside a first mold cavity 9a formed by the fixed mold 2 and a first movable mold 4a; a first injection unit 17 capable of plasticizing a first resin 9b (9b') for forming the outer layer portion to injection-fill the first resin 9b (9b') inside a second mold cavity 10a (mold cavity expansion portion) formed by the fixed mold 2 and a second movable mold 4b; and a second injection unit 18 capable of plasticizing a second resin 10b (10b') for forming the inner layer portion to injection-fill the second resin 10b (10b') inside the second mold cavity 10a (mold cavity expansion portion).

The rotating platen 30c is mounted on a base 50 of the injection molding machine 1c in a state of being movable in the mold opening/closing direction. The rotating platen 30c includes at least a first mold attaching surface capable of having the first movable mold 4a attached thereto and a second mold attaching surface capable of having the second movable mold 4b attached thereto. This rotating platen 30c is configured capable of rotating around a rotation axis extending in a direction orthogonal to the mold opening/closing direction. That is, the rotating platen 30c is configured to rotate around the rotation axis orthogonal to the mold opening/closing direction and thereby switch the movable mold facing the fixed mold 2 from the first movable mold 4a to the second movable mold 4b or from the second movable mold 4b to the first movable mold 4a. Note that FIG. 26 illustrated a rotating platen 30c that rotates around a rotation axis extending in a vertical direction, but the present invention is not limited to this configuration, and the rotating platen 30c may adopt a configuration of rotating around a rotation axis extending in a horizontal direction.

The movable platen 40 is mounted on the base 50 of the injection molding machine 1c in a state of being movable in the mold opening/closing direction. The movable platen 40 has attached thereto the likes of a mold or device capable of being paired with the first movable mold 4a and the second movable mold 4b, or has attached thereto a protective member such as a protective plate (dummy plate) 41. In the case where the movable platen 40 has attached thereto the likes of the mold or device capable of being paired with the first movable mold 4a and the second movable mold 4b, it is possible to perform between the movable platen 40 and the rotating platen 30c an injection molding or post-processing and so on different from an injection molding performed between the fixed platen 20 and the rotating platen 30c. Moreover, in the case where the movable platen 40 has attached thereto the protective member such as the protective plate 41, it is possible to protect a mold dividing surface of the movable mold (first movable mold 4a or second movable mold 4b) positioned on a movable platen 40 side, during mold clamping.

Note that the injection molding machine 1c according to the fifth embodiment basically has commonness with the injection molding machines 1a and 1b according to the third and fourth embodiments, excluding the fact that a moving means of the first movable mold 4a and the second movable mold 4b is the rotating platen 30c. Therefore, in the injection molding machine 1c according to the fifth embodiment, identical reference symbols are employed for configurations shared with the injection molding machines 1a and 1b according to the third and fourth embodiments, hence detailed descriptions thereof will be omitted. Moreover, the injection molding machine 1c according to the fifth embodiment is capable of manufacturing a sandwich molded product by methods similar to the methods of manufacturing according to examples 9 to 12 performed employing the injection molding machine 1a according to the third embodiment. Therefore, descriptions of methods of manufacturing a sandwich molded product performed employing the injection molding machine 1c according to the fifth embodiment will be omitted. Note that the injection molding machine 1c according to the fifth embodiment is also capable of implementing the methods of manufacturing according to examples 9 to 12 between the rotating platen 30c and the movable platen 40, by having the fixed mold 2 attached to the movable platen 40.

As described above, the injection molding machines according to the first through fifth embodiments and the methods of manufacturing of examples 1 to 12 have an advantage of being able to manufacture a sandwich molded product whose thickness of its outer layer differs partially.

Moreover, in the conventional injection molding methods described in Patent Documents 1 and 2, there is a risk of a resin inversion defect occurring, and moreover there is a problem that in order to prevent this occurrence of a resin inversion defect, filling ratio of the inner layer resin with respect to volume of the sandwich molded product has to be kept low. In contrast, as mentioned above, the injection molding machines according to the first through fifth embodiments and the methods of manufacturing of examples 1 to 12 not only enable thickness of the outer layer to be molded so as to differ partially, but also have an excellent advantage of being able to significantly improve filling ratio of the inner layer resin with respect to volume of the sandwich molded product while preventing a resin inversion defect.

Moreover, the injection molding machines according to the first through fifth embodiments and the methods of manufacturing of examples 1 to 12, by employing a foamable resin or a resin that has functionality of, for example, an electromagnetic wave shielding property, a vibration-damping property, sound absorbency, incombustibility, and so on (a functional resin), can achieve weight saving or addition of various functions. Note that such a resin molded product having a plurality of functionalities may be obtained also by a laminated molded product, not a sandwich molded product. For example, by adopting a laminated molded product that has laminate-molded therein a layer where a soft resin has been foam-expanded, on a front surface side, and a layer where a hard resin providing strength by the likes of a reinforcing additive agent has been thickly molded, on a rear surface side, it is possible to provide the resin molded product with different functionalities of softness (soft feeling and design property) and hardness (product rigidity). However, since the layer on the front surface side of such a laminated molded product is a soft resin, it is difficult to provide the laminated molded product with scratch resistance unless in a post-processing (later step) after molding. Moreover, in a laminated molded product adopting a functional resin in the layer on the front surface side and a cheap resin in the layer on the rear surface side, it is sometimes difficult to provide a sufficient design property to the layer on the rear surface side and the layer on the front surface side, although this differs according to a type of resin. Therefore, there are problems that it is difficult to secure quality of a design surface, or that in a member such as a cover component, and so on, where a non-design surface side also comes into view or a member of the kind where both front and rear surfaces of the product are substantially design surfaces, there is a large drop in quality due to a difference in outer appearance or touch sensation of the outside and rear of the product.

Moreover, in addition to the above-mentioned advantages, the injection molding machines according to the third through fifth embodiments and the methods of manufacturing according to examples 9 to 12 also have an advantage that when thickness of the outer layer in the sandwich molded product is molded so as to differ partially, design of the sandwich molded product is not restricted to design of a thick portion of the outer layer of the sandwich molded product.

Figure 27C:
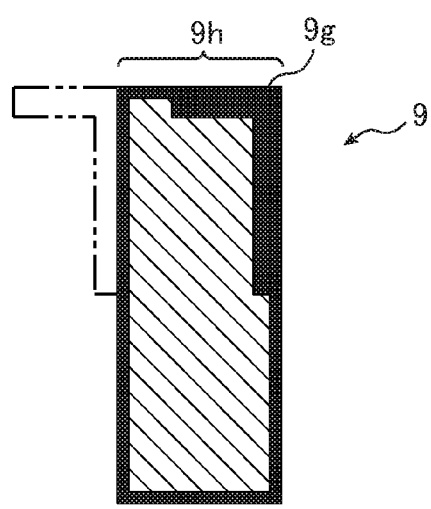
FIG. 27C is a schematic cross-sectional view showing another example of a sandwich molded product capable of being manufactured by the manufacturing steps according to examples 9 through 12.

That is, in the above-mentioned methods of examples 1 to 8, a common movable mold is used in molding of the base layer and in molding of the sandwich molded portion, hence a design (shape) of a surface on a mold opening direction side of the sandwich molded portion and a design of a surface (contact surface between the sandwich molded portion and the base layer) on the mold opening direction side of the base layer are identical. As a result, although it is possible to mold a sandwich molded product of the kind shown in FIG. 27A in which a design on a front surface (surface on right side in FIG. 27A) side and a design on a back surface (surface on left side in FIG. 27A) side are different, it is difficult to achieve a state of the kind shown by the solid lines in FIGS. 27B and 27C in which a design of a surface (surface on left side in FIGS. 27B and 27C) on the mold opening direction side of the sandwich molded portion and a design of a surface (contact surface between the sandwich molded product and the base layer) on the mold opening direction side of the base layer are made different. That is, in the above-mentioned methods of examples 1 to 8, in the case that, as shown in FIG. 27B, the design on the mold opening direction side of the base layer 9g (thick portion) has a distinctive feature, a design on the mold opening direction side of the base layer 9g (thick portion) of the kind shown by the two dot chain line in FIG. 27B is molded, even if it is desired that the mold opening direction side of the sandwich molded portion 9h is molded flush, for example. Moreover, as shown in FIG. 27C, also in the case of a design of the kind where the base layer 9g (thick portion) is continuous from a surface substantially orthogonal to the mold opening/closing direction to a surface substantially parallel thereto, that is, to a side surface, the design on the mold opening direction side of the base layer 9g (thick portion) of the kind shown by the two dot chain line in FIG. 27C is molded on the mold opening direction side of the sandwich molded portion 9h, even if it is desired that the mold opening direction side of the sandwich molded portion 9h is molded flush. Note that even in the methods of examples 1 to 8, there is a possibility of being able to configure such that the design of the sandwich molded product is not restricted to the design of the thick portion of the outer layer of the sandwich molded product, by a means such as providing a movable portion inside the mold. However, in this case, there is a risk that a structure of the mold movable portion becomes complicated, and a division line of the mold internal movable portion is transferred to the design surface whereby a design property is lowered.

In contrast, the methods of manufacturing according to examples 9 to 12 switch the first movable mold 4a and the second movable mold 4b, and use different movable molds in molding of the base layer 9g and in molding of the sandwich molded portion 9h (9h'). As a result, the methods of manufacturing according to examples 9 to 12, by changing the mold forming a design (shape) on the mold opening direction side of the base layer 9g (first movable mold 4a) to the mold forming a design (shape) on the mold opening direction side of the sandwich molded portion 9h (second movable mold 4b), make it possible to mold a sandwich molded product 9 in which the design (shape) on the mold opening direction side of the base layer 9g and the design (shape) on the mold opening direction side of the sandwich molded portion 9h are different. Moreover, the methods of manufacturing according to examples 9 to 12 do not require a movable portion to be provided inside the mold, and enable structure of the mold to be simplified.

The present invention is not limited to the above-described embodiments and may be implemented by a variety of methods.

For example, in order to simplify description and illustration, in the above-mentioned examples 1 to 12, the volume of the mold cavity was expanded by a mold opening/closing operation by a mold opening/closing mechanism of the injection molding machine, assuming a mold having a share edge structure. However, the means of expanding the volume of the mold cavity is not limited to this means, and need only be a means capable of arbitrarily controlling the likes of a moving operation of the mold internal movable portion, and the likes of its volume, expansion speed, and volume expansion position holding force opposing a resin pressure inside the mold cavity.

Moreover, in the base layer molding step of the above-mentioned examples 1 to 12, an injection compression method or an injection press molding method may be performed, if required. Moreover, an expansion foaming molding method may be performed, the expansion foaming molding method being a method in which a base layer resin (the first resin in examples 1 to 4 and the base layer resin in examples 5 to 12) is configured as a foamable resin, and a movable mold (the movable mold 4 in examples 1 to 8 and the first movable mold 4a in examples 9 to 12) is minutely mold-opened to foam the base layer resin injection-filled inside the mold cavity.

Furthermore, in the above-mentioned examples 1 to 12, expansion was performed by the second expansion step or the third expansion step until the volume of the mold cavity expansion portion (volume of the second mold cavity) in conjunction with that of the mold cavity (first mold cavity) attained a product volume. However, the present invention is not limited to this configuration, and it is possible to configure such that the volume of the mold cavity expansion portion (second mold cavity) is expanded to greater than the originally set volume whereby a larger amount of resin is injection-filled or foamed, and then the volume of the mold cavity expansion portion (second mold cavity) is contracted to the originally set volume, whereby eventually a desired product is obtained (mold cavity contraction step). This mold cavity contraction step can be performed in the second expansion step in the case that the method of manufacturing is performed up to the second expansion step as in the methods of manufacturing according to examples 1, 2, 5, 6, 9, and 10. Moreover, it can be performed in at least one expansion step of the second expansion step and the third expansion step in the case that the method of manufacturing is performed up to the third expansion step as in the methods of manufacturing according to examples 3, 4, 7, 8, 11, and 12. Performing such a mold cavity contraction step makes it possible to further improve transferability of design of the mold cavity to the skin layer of the base layer which will be one of the outer layers of the sandwich molded product and the skin layer of the sandwich molded portion which will be the other of the outer layers of the sandwich molded product, and to further improve filling ratio of the inner layer second resin with respect to volume of the sandwich molded portion.

Further still, in the above-mentioned examples 1 to 12, a foamable resin can be employed even in the case of a resin described as a non-foamable resin. That is, in the above-mentioned examples 1 to 12, the inside of the mold cavity is injection-filled with resin in a fully-packed state in each of the base layer molding step, first injection-filling step, and second injection-filling step, hence by cooling and solidifying the resin unchanged in an unfoamed state, in a state of being applied with a certain mold clamping force, even a foamable resin can be employed similarly to an unfoamed resin.

REFERENCE SIGNS LIST 1a, 1b, 1c injection molding machine
2 fixed mold
4 movable mold
4a first movable mold
4b second movable mold
8b base layer resin
9, 9' sandwich molded product
9a mold cavity (first mold cavity)
9b, 9b' first resin
9g, 9g' base layer
10a second mold cavity
10b, 10b' second resin
20 fixed platen
30a mold sliding means
30b mold rotating means
30c rotating platen
40 movable platen
90a mold cavity expansion portion (certain space)

The invention claimed is:

1. A method of manufacturing a sandwich molded product, the method employing at least two molds capable of forming a mold cavity to mold the sandwich molded product, the method comprising:
a base layer molding step that injection-fills the mold cavity with a base layer resin to mold a base layer;
a first expansion step that causes the volume of the mold cavity to expand to a specified quantity such that a certain space is formed between an outer surface of the base layer molded by the base layer molding step and an inner surface of the mold;
a first injection-filling step that injection-fills the space formed by the first expansion step with a first resin which is a foamable resin to fill the space with the first resin;
a second expansion step that, after the start of the first injection-filling step, causes the mold cavity to expand to a specified quantity such that the space is further expanded, thereby foaming the first resin and molding a foam molded product which has a skin layer and a foamed layer formed within the skin layer; and
a second injection-filling step that, after completion of the first injection-filling step and after the completion of the second expansion step, injection-fills a second resin into the foamed layer of the foam molded product by penetrating the skin layer.

2. The method of manufacturing a sandwich molded product according to claim 1, wherein in the second injection-filling step, foam cells of the foamed layer are substituted by the second resin.

3. The method of manufacturing a sandwich molded product according to claim 1, wherein
the base layer resin and the first resin are same resins, and
the first resin and the second resin are different resins.

4. The method of manufacturing a sandwich molded product according to claim 1, wherein
the base layer resin and the first resin are different resins, and
the first resin and the second resin are different resins.

5. The method of manufacturing a sandwich molded product according to claim 1, wherein
the second resin is a foamable resin, and
the method further comprises:
a third expansion step that, after the start of the second injection-filling step, causes the space to further expand to a specified quantity and causes the second resin injection-filled inside the first resin to foam.

6. The method of manufacturing a sandwich molded product according to claim 1, wherein
the first expansion step and the second expansion step are performed by at least one operation of a mold opening/closing operation by a mold opening/closing mechanism of an injection molding machine and a moving operation of a mold internal movable portion.

7. The method of manufacturing a sandwich molded product according to claim 1, wherein
the mold comprises: a fixed mold; a first movable mold capable of forming a first mold cavity between the first movable mold and said fixed mold; and a second movable mold capable of forming a second mold cavity between the second movable mold and said fixed mold, the second mold cavity having a volume which is larger than that of the first mold cavity,
the base layer molding step is a step that injection-fills the first mold cavity formed by the fixed mold and the first movable mold with the base layer resin to mold the base layer,
the first expansion step is a step that forms the space between the outer surface of the base layer molded by the base layer molding step and an inner surface of the second movable mold, by changing a mold paired with the fixed mold from the first movable mold to the second movable mold, and
the second expansion step is a step that causes the second mold cavity to expand to a specified quantity such that the space is expanded, by at least one operation of a mold opening/closing operation by a mold opening/closing mechanism of an injection molding machine and a moving operation of a mold internal movable portion.

8. A method of manufacturing a sandwich molded product, the method employing at least two molds capable of forming a mold cavity to mold the sandwich molded product, the method comprising:
a base layer molding step that injection-fills the mold cavity with a base layer resin to mold a base layer;
a first expansion step that causes the volume of the mold cavity to expand to a specified quantity such that a certain space is formed between an outer surface of the base layer molded by the base layer molding step and an inner surface of the mold;

a first injection-filling step that injection-fills the space formed by the first expansion step with a first resin which is a non-foamable resin to fill the space with the first resin;

a second expansion step that, after the completion of the first injection-filling step, causes the mold cavity to expand to a specified quantity such that the space is further expanded; and a second injection-filling step that, after the start of the second expansion step, injection-fills a second resin into the first resin.

9. The method of manufacturing a sandwich molded product according to claim 8, wherein the second expansion step and the second injection-filling step are controlled to be coordinated so as to maintain a state of the space being filled by the first resin and the second resin.

10. The method of manufacturing a sandwich molded product according to claim 8, wherein the base layer resin and the first resin are same resins, and the first resin and the second resin are different resins.

11. The method of manufacturing a sandwich molded product according to claim 8, wherein the base layer resin and the first resin are different resins, and the first resin and the second resin are different resins.

12. The method of manufacturing a sandwich molded product according to claim 8, wherein the second resin is a foamable resin, and the method further comprises:

a third expansion step that, after the start of the second injection-filling step, causes the space to further expand to a specified quantity and causes the second resin injection-filled inside the first resin to foam.

13. The method of manufacturing a sandwich molded product according to claim 8, wherein the first expansion step and the second expansion step are performed by at least one operation of a mold opening/closing operation by a mold opening/closing mechanism of an injection molding machine and a moving operation of a mold internal movable portion.

* * * * *